United States Patent
Yoshida et al.

(10) Patent No.: US 6,822,711 B1
(45) Date of Patent: Nov. 23, 2004

(54) LIQUID CRYSTAL DISPLAY APPARATUS USING POLARIZING ELEMENT TRANSMITTING ONE OF TWO POLARIZING COMPONENTS CROSSING AT RIGHT ANGLES AND REFLECTING THE OTHER COMPONENT

(75) Inventors: Tetsushi Yoshida, Kanagawa-ken (JP); Toshiharu Nishino, Hamura (JP); Tomoko Tano, Musashino (JP); Kazuhito Sato, Fussa (JP); Yoshiaki Sawano, Fussa (JP); Keiichi Ishida, Hachioji (JP)

(73) Assignee: Casio Computer Co., Ltd., Tokyo (JP)

(*) Notice: Subject to any disclaimer, the term of this patent is extended or adjusted under 35 U.S.C. 154(b) by 389 days.

(21) Appl. No.: 09/669,946

(22) Filed: Sep. 26, 2000

(30) Foreign Application Priority Data

| Sep. 30, 1999 | (JP) | .......................................... 11-279209 |
| Oct. 29, 1999 | (JP) | .......................................... 11-309062 |
| Jul. 14, 2000 | (JP) | ...................................... 2000-214589 |
| Jul. 14, 2000 | (JP) | ...................................... 2000-214590 |
| Jul. 25, 2000 | (JP) | ...................................... 2000-224316 |
| Aug. 2, 2000 | (JP) | ...................................... 2000-234378 |

(51) Int. Cl.[7] ........................................ G02F 1/1335
(52) U.S. Cl. .................. 349/115; 349/112; 349/95; 349/102
(58) Field of Search ................... 349/115, 112–113, 349/117, 96, 95

(56) References Cited

U.S. PATENT DOCUMENTS

| 4,909,601 A | * | 3/1990 | Yajima et al. .................. 349/8 |
| 5,561,539 A | * | 10/1996 | Funahata et al. .............. 349/70 |
| 5,578,241 A | * | 11/1996 | Plach et al. ............. 252/299.01 |
| 5,808,713 A | * | 9/1998 | Broer et al. ................... 349/98 |
| 5,856,855 A | * | 1/1999 | Mol et al. ...................... 349/65 |
| 6,359,670 B1 | * | 3/2002 | Broer et al. ................. 349/115 |
| 6,507,380 B1 | * | 1/2003 | Iijima .......................... 349/96 |

FOREIGN PATENT DOCUMENTS

WO     WO 97/01789     1/1997

* cited by examiner

Primary Examiner—Toan Ton
(74) Attorney, Agent, or Firm—Frishauf, Holtz, Goodman & Chick, P.C.

(57) ABSTRACT

A liquid crystal display apparatus includes a liquid crystal element including a front substrate positioned on the side of an observer and having a first electrode mounted to one surface, a rear substrate having a second electrode arranged to face said first electrode, and a liquid crystal layer interposed between these substrates, said liquid crystal layer controlling the polarized state of the transmitted light in accordance with the electric field applied between the first and the second electrodes. A first reflection polarizing plate is arranged on the front side of the liquid crystal element and reflects the light of one of the two polarized components of the incident light. Two polarized components are perpendicular to each other, and transmit the light of the other polarized component.

48 Claims, 35 Drawing Sheets

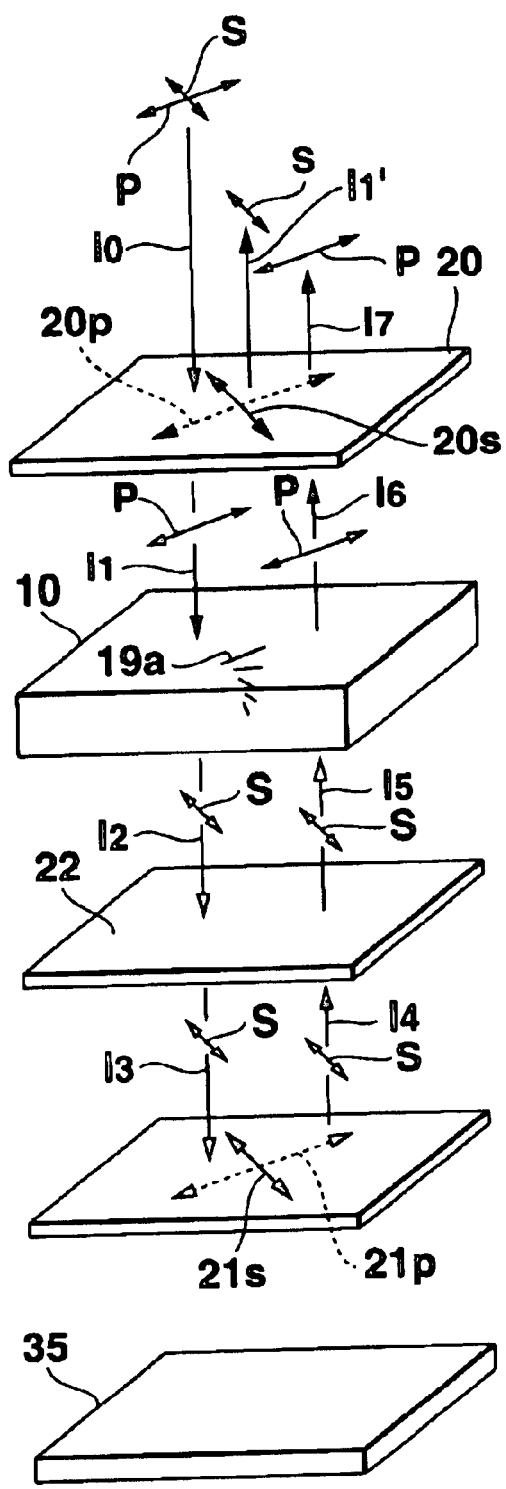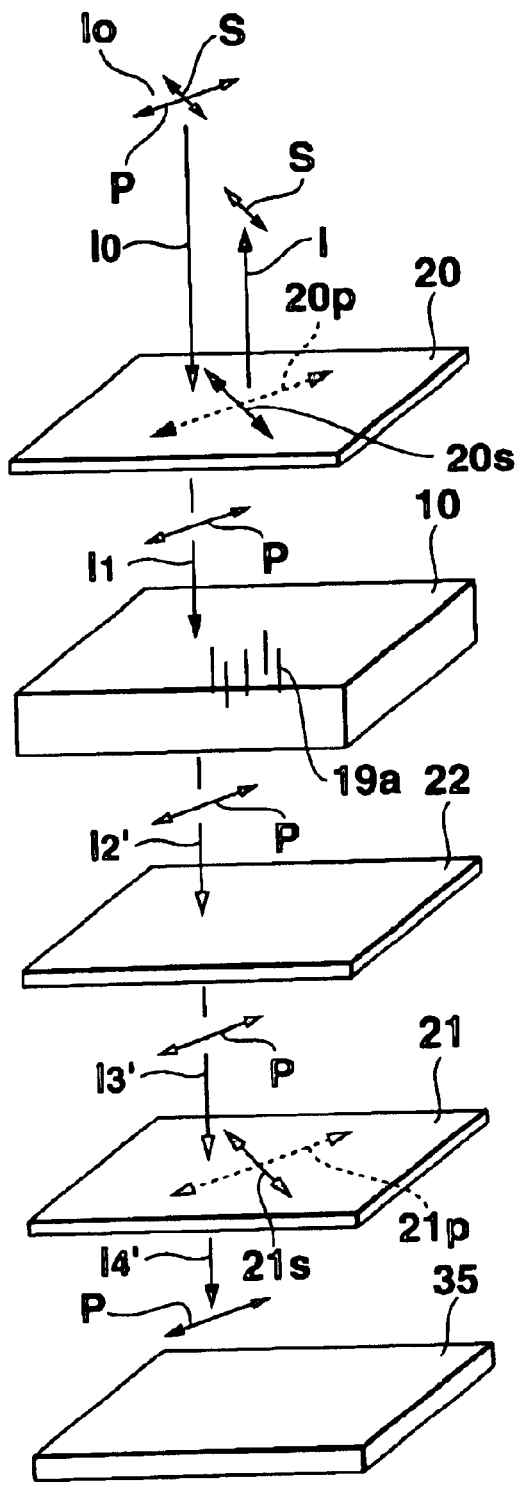
FIG.4A  FIG.4B

LIQUID CRYSTAL DISPLAY APPARATUS USING POLARIZING ELEMENT TRANSMITTING ONE OF TWO POLARIZING COMPONENTS CROSSING AT RIGHT ANGLES AND REFLECTING THE OTHER COMPONENT

CROSS-REFERENCE TO RELATED APPLICATIONS

This application is based upon and claims the benefit of priority from the prior Japanese Patent Applications No. 11-279209, filed Sep. 30, 1999; No. 11-309062, filed Oct. 29, 1999; No. 2000-214589, filed Jul. 14, 2000; No. 2000-214590, filed Jul. 14, 2000; No. 2000-224316, filed Jul. 25, 2000; and No. 2000-234378, filed Aug. 2, 2000, the entire contents of which are incorporated herein by reference.

BACKGROUND OF THE INVENTION

The present invention relates to a liquid crystal display apparatus performing a reflection display by utilizing an external light.

A liquid crystal display apparatus comprises a liquid crystal element and a pair of polarizing plates arranged to have the liquid crystal element sandwiched therebetween. The liquid crystal element comprises a front transparent substrate on the side of the observation of the display, a rear transparent substrate positioned to face the front transparent substrate, two electrodes mounted to the inner surfaces of the front and rear transparent substrates, respectively, and a liquid crystal layer interposed between these two electrodes. The polarizing state of the transmitting light is controlled by the liquid crystal layer in accordance with the electric field applied between the two electrodes.

A TN (twisted nematic) type is widely used as such a liquid crystal display apparatus. The TN type liquid crystal display apparatus is constructed such that the liquid crystal molecules of the liquid crystal layer included in the liquid crystal element are aligned under the state free from an electric field in a twisted manner with a twisting angle of about 90°. Also, the paired polarizing plates are arranged such that the transmitting axes thereof are substantially parallel to each other or substantially perpendicular to each other.

The liquid crystal display apparatus includes a transmission type in which a transmission display is performed by utilizing an illuminating light emitted from a back light and a reflection type in which a reflection display is performed by utilizing the external light in the environment of use of the liquid crystal display apparatus. The transmission type liquid crystal display apparatus consumes a large amount of an electric power for lighting the back light and, thus, the reflection type liquid crystal display apparatus performing the reflection display by utilizing an external light is advantageous in terms of the power saving.

The conventional reflection type liquid crystal display apparatus is constructed such that a reflecting plate is arranged behind the rear polarizing plate that is arranged behind the liquid crystal element.

In the conventional reflection type liquid crystal display apparatus, the external light incident on the front transparent substrate on the side of observation of the display is allowed to be incident as a linear polarized light on the liquid crystal element by the polarizing function of the front polarizing plate arranged in front of the liquid crystal element. The polarized state of the light incident on the liquid crystal element is controlled by the liquid crystal layer and, then, emitted to the rear side of the liquid crystal element. Among the light emitted to the rear side of the liquid crystal element, the light component transmitted through the rear polarizing plate is reflected by the reflecting plate, and the reflected light is allowed to be transmitted through the rear polarizing plate, the liquid crystal element and the front polarizing plate so as to be emitted to the front side of the display apparatus.

In the conventional reflection type liquid crystal display apparatus, the light of the polarized component along the transmission axis of the front polarizing plate, which is contained in the light incident from the front side, is transmitted through the front polarizing plate so as to be incident on the liquid crystal element, and the light of the polarized component along the absorption axis of the front polarizing plate is absorbed by the front polarizing plate. It follows that about half the light incident from the front side is absorbed by the front polarizing plate and, thus, is made useless. As a result, the conventional reflection type liquid crystal display apparatus is poor in its utilization rate of the incident light, and the light reflected by the reflecting plate so as to be emitted to the front side has a high intensity, resulting in failure to obtain a bright screen.

BRIEF SUMMARY OF THE INVENTION

An object of the present invention is to provide a liquid crystal display apparatus that permits increasing the brightness of the screen by effectively utilizing the external light incident from the front side and also permits obtaining a good contrast.

According to an aspect of the present invention, which has been accomplished in an attempt to achieve the above-noted object, there is provided a liquid crystal display apparatus, comprising:

a liquid crystal element including a front substrate positioned on the side of an observer and having a first electrode mounted to one surface, a rear substrate having a second electrode arranged to face the first electrode, and a liquid crystal layer interposed between these substrates, the liquid crystal layer controlling the polarized state of the transmitted light in accordance with the electric field applied between the first and the second electrodes;

a first reflection polarizing plate arranged on the front side of the liquid crystal element and reflecting the light of one of the two polarized components of the incident light, the two polarized components being perpendicular to each other, and transmitting the light of the other polarized component; and a rear member arranged behind the liquid crystal element and reflecting at least a part of the light transmitted through the liquid crystal element so as to be emitted to the rear side.

The liquid crystal display apparatus further comprises a diffusion means arranged on the front side of the reflection polarizing plate and a diffusion layer arranged between the reflection polarizing plate and the liquid crystal element and/or between the liquid crystal element and the rear member. It is desirable for the diffusion layer to be formed of a lens film having micro lenses arranged on one surface.

In the liquid crystal display apparatus of the present invention, another reflection polarizing plate, which transmits the light of one of the two polarized components, which are perpendicular to each other, of the incident light and reflects the light of the other polarized component, is used as the rear member. When the liquid crystal element is of a TN type in which the liquid crystal molecules are twist-aligned with a twisting angle of 90°, the first reflection polarizing plate arranged on the front side of the liquid crystal element is arranged such that the transmission axis of the first reflection polarizing plate is substantially parallel to perpendicular to the aligning direction of the liquid crystal molecules in the vicinity of the front substrate of the liquid crystal element. On the other hand, the second reflection polarizing plate constituting the rear member is arranged such that the transmission axis of the second reflection polarizing plate is substantially parallel or perpendicular to the transmission axis of the first reflection polarizing plate. Further, it is possible to arrange a back light on the front side of the rear member.

The rear member is constructed by a reflection polarizing plate and a light absorbing means. The light absorbing means is formed of a light absorbing film or an absorption polarizing plate that absorbs the light of one the two polarized components, which are perpendicular to each other, of the incident light and transmits the light of the other polarized component. Also, the rear member is constructed by the absorption polarizing plate and a reflection plate arranged on the rear side of the absorption polarizing plate.

According to the liquid crystal display apparatus of present invention, the reflection polarizing plate that does not absorb the light and has a high transmittance is arranged on the front side, i.e., the observing side, of the liquid crystal element, making it possible to increase the intensity of the light incident on the liquid crystal element from the front side. Naturally, the light returned to the observing side has a high intensity so as to obtain a bright display. It should also be noted that the light of one polarized component of the incident light from the front side is reflected by the reflection polarizing plate so as to be emitted to the front side. Since the reflected light increases the brightness of the entire screen, the incident light from the front side can be effectively utilized so as to obtain a bright screen.

It should also be noted that, in the liquid crystal display apparatus of the present invention, an optical element, which transmits the light incident from the front side so as to be incident on the reflection polarizing plate and which permits the light of one polarized component reflected from the reflection polarizing plate to be incident again on the reflection polarizing plate with the polarized state changed, is arranged on the front side of the reflection polarizing plate arranged on the observing side of the liquid crystal element. As a result, the external light can be utilized more efficiently so as to achieve a bright display. In this case, the optical element is constructed by a transparent film or a retardation plate. Preferably, it is desirable for the optical element to be formed of a quarter wavelength plate having a phase difference of 1/4 wavelength, which is arranged such that the retarded phase axis of the quarter wavelength plate crosses both the reflection axis and the transmission axis of the reflection polarizing plate arranged on the front side of the liquid crystal element with a crossing angle of about 45°.

When it comes to the liquid crystal display apparatus having the optical element arranged on the front side of the reflection polarizing plate, it is desirable to arrange a means, which allows the light of one polarized component reflected from the reflection polarizing plate to be incident on the optical element arranged on the front side of the reflection polarizing plate at an angle of incidence at which the incident light is subjected to the inner surface reflection by the optical element, between the reflection polarizing plate and the optical means. It is possible for the particular means to be formed by applying a surface treatment to the reflection polarizing plate. Alternatively, a diffusion layer arranged between the reflection polarizing plate and the optical means can be used as the particular means. The particular means has a directivity in a direction inclined from a line normal to the reflection polarizing plate arranged on the front side of the liquid crystal means.

It is desirable to apply the surface treatment to the reflection polarizing plate in a manner to form a fine irregularity that diffuses and reflects the light of one polarized component and transmits the light of the other polarized component without diffusing the light.

A diffusion means is arranged on the front side or rear side of the liquid crystal element of the liquid crystal display apparatus. The diffusion means arranged on the rear side of the liquid crystal element has a directivity in a direction parallel to a line normal to the reflection polarizing plate. The directivity can be obtained by a lens film having micro lenses arranged on surface.

The rear member of the liquid crystal display apparatus is constructed by a reflection polarizing plate or a means for reflecting the light of one of the two polarized components, which are perpendicular to each other, of the incident light and for absorbing the light of the other polarized component. The particular means is constructed by a reflection polarizing plate and a light absorption means. It is possible for the light absorption means to be formed of a light absorbing layer, an absorption polarizing plate, or a colored film absorbing light having a predetermined wavelength. Also, the rear member is constructed by a reflection film, a combination of an absorption polarizing plate and a reflection film, or two reflection polarizing plates arranged with a diffusion layer interposed therebetween and having a light absorption means arranged on the rear side of the reflection polarizing plate. It is desirable for the rear member to exhibit diffusion-reflection characteristics.

In the liquid crystal display apparatus of the present invention, it is desirable for the liquid crystal element to be formed such that, in the case of a simple matrix type, the liquid crystal molecules are twist-aligned with a twisting angle of about 1000°, and the product $\Delta$nd between the refractive index anisotropy $\Delta$n of the liquid crystal layer and the thickness d of the liquid crystal layer falls within a range of between 115 nm and 130 nm.

According to the liquid crystal display apparatus of the present invention, a reflection polarizing plate is used as a polarizing element arranged on the front side of the liquid crystal element, and the optical element is arranged on the front side of the reflection polarizing plate. The particular construction makes it possible to allow both the light of one of the two polarized components, which are perpendicular to each other, of the external light incident from the front side, the one polarized component being transmitted through the reflection polarizing plate, and the light of the polarized component of the light reflected from the reflection polarizing plate and also reflected from the inner surface of the optical element, the polarized component being transmitted through the reflection polarizing plate, to be transmitted through the reflection polarizing plate so as to be incident on the liquid crystal element. It follows that the external light incident from the front side can be utilized with a high efficiency so as to achieve a bright display of a high brightness.

In addition, since a retardation plate is used as the optical element, the polarized state of the light of one polarized component reflected from the reflection polarizing plate can be changed into the light of a polarized state that can be transmitted through the reflection polarizing plate so as to permit the light to be incident again on the reflection polarizing plate. It follows that the amount of the light incident on the liquid crystal element is increased. It is also possible to decrease the light leakage that the light reflected from the reflection polarizing plate is transmitted through the optical means so as to be emitted to the front side. It follows that the amount of the light transmitted through the liquid crystal element so as to be emitted to the observing side is increased so as to suppress the "floating" of darkness of the dark display caused by the light leakage. As a result, it is possible to obtain a bright screen having a good contrast.

Further, in the liquid crystal display apparatus of the present invention, it is possible to use as the liquid crystal element a so-called "STN type" liquid crystal element having a liquid crystal layer in which light crystal molecules are twist-aligned between a pair of substrates with a twisting angle of 180° to 270°.

In this case, the incident light can be effectively utilized by arranging a transparent film that permits the light reflected from the reflection polarizing plate to be subjected to the inner surface reflection so as to be incident again on the reflection polarizing plate. It is desirable for the transparent film to exhibit optical characteristics of changing the polarized state of the transmitted light. The particular optical characteristics can be achieved by using a quarter wavelength plate. The quarter wavelength plate should be arranged such that the retarded phase axis thereof crosses the transmission axis of the reflection polarizing plate arranged on the front side of the liquid crystal element with a crossing angle of about 45°. It is possible to further improve the efficiency of utilizing the external light by arranging a diffusion means between the transparent film and the reflection polarizing plate.

Also, in the liquid crystal display apparatus of the present invention, an absorption polarizing plate and/or a diffusion layer, which has a transmission axis transmitting one of the two polarized components, which are perpendicular to each other, of the incident light and an absorption axis absorbing the light of the other polarized component, is arranged on at least one of the front side (or observing side) and the rear side of the STN type liquid crystal element. Further, a reflection polarizing plate or a reflection film is arranged on the rear side of the STN type liquid crystal element.

According to the liquid crystal display apparatus of the present invention, the light of one of the two polarized components, which are perpendicular to each other, of the incident light, the polarized component being transmitted through the reflection polarizing plate, is transmitted through the reflection polarizing plate so as to be incident on the STN type liquid crystal element. Also, the light reflected from the reflection polarizing plate is subjected to the inner surface reflection by the transparent film so as to be incident again on the reflection polarizing plate. Further, the light of the polarized component transmitted through the reflection polarizing plate is transmitted through the reflection polarizing plate so as to be incident on the liquid crystal element. It follows that a large amount of light is incident on the liquid crystal element, making it possible to utilize effectively the incident light from the front side and, thus, to obtain a bright screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is an oblique view showing in a broken fashion the operation of the reflection type display when an electric field is not applied to the liquid crystal layer;

FIG. 4B is an oblique view showing in a broken fashion the operation of the reflection type display when an electric field is applied to the liquid crystal layer;

DETAILED DESCRIPTION OF THE INVENTION

First Embodiment

Figure 1:
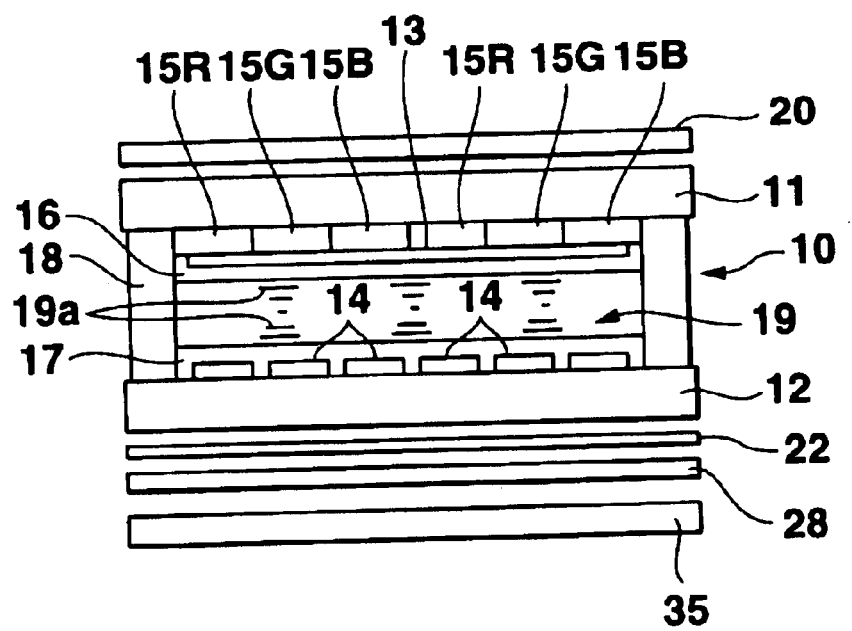
FIG. 1 is a cross sectional view showing the construction of a liquid crystal display apparatus according to a first embodiment of the present invention.

A first embodiment of the present invention will now be described with reference to the accompanying drawings.

Specifically, FIGS. 1 to 5 collectively show a liquid crystal display apparatus according to the first embodiment of the present invention. The liquid crystal display apparatus of this embodiment comprises a liquid crystal element 10, a reflection polarizing plate 20 arranged in front of the liquid crystal element 10, a rear member 28 arranged behind the liquid crystal element 10, a diffusion layer 22 arranged between the liquid crystal element 10 and the rear member 28, and a back light 35 arranged behind the rear member 28.

The liquid crystal element 10 comprises a front transparent substrate 11 on the side of the observation of the display and a rear transparent substrate 12 disposed to face the front transparent substrate 11. Transparent electrodes 13 and 14 are mounted to the inner surfaces of these transparent substrates 11 and 12, respectively. Also, a liquid crystal layer 19 is arranged between the transparent electrodes 13 and 14. The polarized state of the transmitted light is controlled in accordance with the electric field applied between the transparent electrodes 13 and 14. Liquid crystal molecules 19a of the liquid crystal layer 19 have an initial aligned state twisted at an twisting angle of about 90°.

The liquid crystal element 10 is of, for example, an active matrix type. The electrode 14 mounted to the inner surface of the rear transparent substrate 12 includes a plurality of pixel electrodes arranged in row and column directions to form a matrix. On the other hand, the electrode 13 mounted to the inner surface of the front transparent substrate 11 is a single film-like counter electrode positioned to face the plural pixel electrodes 14.

Mounted to the inner surface of the rear transparent substrate 12 are a plurality of TFT's (thin film transistors) connected to the plural pixel electrodes 14 and arranged to form a matrix, a plurality of gate wirings for supplying gate signals to the TFT'S, and a plurality of data wirings for supplying data signals to the TFT's, though these TFT, etc. are not shown in the drawing.

Color filters of a plurality of colors, e.g., color filters 15R, 15G and 15B for red, green and blue, are mounted to the inner surface of the front transparent substrate 11 of the liquid crystal element 10 in a manner to corresponds to a plurality of pixel regions formed between the plural pixel electrode 14 and the counter electrode 13. The counter electrode 13 is formed on the color filters 15R, 15G and 15B.

The pair of the substrates 11 and 12 are bonded to each other in the peripheral region via a frame-like sealing material 18, and the liquid crystal layer 19 consisting of nematic liquid crystal molecules having a positive dielectric anisotropy is arranged in the region surrounded by the seal member 18 between the substrates 11 and 12.

The aligning direction of the liquid crystal molecules 19a of the liquid crystal layer 19 is regulated in the vicinity of the substrates 11, 12 by aligning films 16, 17 arranged to cover the electrodes 13, 14 mounted to the inner surfaces of the pair of the substrates 11, 12, respectively, and are aligned in a twisted fashion in a predetermined twisting angle between the pair of the substrates 11, 12.

Figure 2:
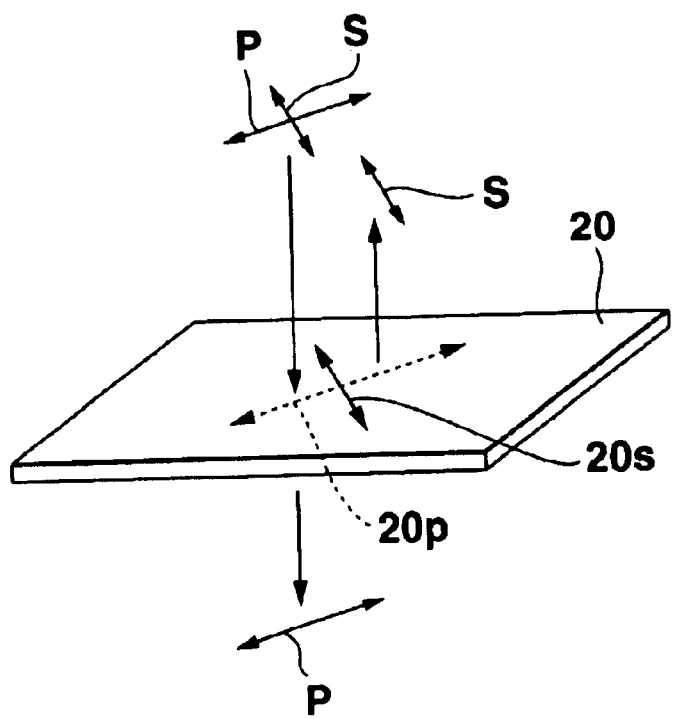
FIG. 2 is an oblique view showing the function of a reflection polarizing plate used in the first embodiment of the present invention.

The reflection polarizing plate 20 arranged on the front side of the liquid crystal element 10 reflects one of the two polarized components of the incident light, said two polarized components being perpendicular to each other, and transmits the other polarized component of the incident light. As shown in FIG. 2, the reflection polarizing plate has a reflection axis 20s and a transmission axis 20p substantially perpendicular to the reflection axis 20s. The reflection polarizing plate 20 is of a laminate structure constructed by a plurality of isotropic thin films (optically isotropic thin films) made of, for example, a polyethylene-naphthalate copolymer and a plurality of anisotropic thin films (optically anisotropic thin film). These isotropic thin films and anisotropic thin films are alternately superposed one upon the other a plurality of times such that all the superposed anisotropic thin films have the maximum refractive index in the same direction. It should be noted that the reflection polarizing plate 20 has the reflection axis 20s in a direction in which the refractive index of the anisotropic thin film differs from the refractive index of the isotropic thin film, and the transmission axis 20p in a direction perpendicular to the reflection axis 20s, i.e., in a direction in which the refractive index of the anisotropic thin film is equal to the refractive index of the isotropic thin film.

The reflection polarizing plate 20 reflects the polarized component of the light having a vibrating plane along the reflection axis 20s at the interface between the isotropic thin film and the anisotropic thin film which are laminated one upon the other and transmits the polarized component of the light having a vibrating plane along the transmission axis 20p at the interface noted above without reflecting the particular polarized component of the light. In other words, a polarized component S of the two polarized components S and P of the light incident on the reflection polarizing plate 20, said components S and P being perpendicular to each other and said component S having a vibrating plane along the reflection axis 20s, is reflected, and the polarized component P having a vibrating plane along the transmission axis 20p is transmitted. The reflection polarizing plate 20 transmits the polarized component P of the light having a vibrating plane along the transmission axis 20p with a high transmittance, compared with an absorption polarizing plate. To be more specific, the absorption polarizing plate contains a substance, i.e., a dichroic substance such as an iodine, capable of absorbing the polarized component of the light having a vibrating plane in one direction. It is possible to allow the absorption polarizing plate to absorb one polarized component of the light having a vibrating plane along the absorption axis and to transmit the polarized component of the light having a vibrating plane along the transmission axis by allowing the absorbing substance such as iodine to be aligned in one direction. However, since there is a disturbance in the aligned state of the absorbing material, the polarized component of the light having a vibrating plane along the transmission axis is also absorbed to some extent. On the other hand, the reflection polarizing plate 20 does not contain the substance capable of absorbing the light and, thus, the polarized component P of the light having a vibrating plane along the transmission axis 20p is not absorbed but is transmitted at a high transmittance. The reflection polarizing plate 20 exhibits the same characteristics in respect of the light incident on the front side and the light incident on the rear side so as to reflect the polarized component of the light having a vibrating plane along the reflection axis 20s and to transmit the polarized component of the light having a vibrating plane along the transmission axis 20P.

The rear member 28 arranged behind the liquid crystal element 10 reflects at least partially the light transmitted through the liquid crystal element 10 so as to be emitted to the rear side. In this embodiment, a reflection polarizing plate having the characteristics equal to those of the reflection polarizing plate 20 arranged in front of the liquid crystal element 10 is used as the rear member 28. The rear member 28 is hereinafter referred to as a "rear reflection polarizing plate 21".

The reflection polarizing plate 20 in front of the liquid crystal element 20, hereinafter referred to as a "front reflection polarizing plate", is arranged such that the transmission axis 20p thereof is substantially parallel or substantially perpendicular to the aligning direction of the liquid crystal molecules 19a in the vicinity of the front substrate 11, and the rear reflection polarizing plate 21, which is the rear member, is arranged such that the transmission axis thereof is substantially parallel or substantially perpendicular to the transmission axis 20p of the front reflection polarizing plate 20.

Figure 3:
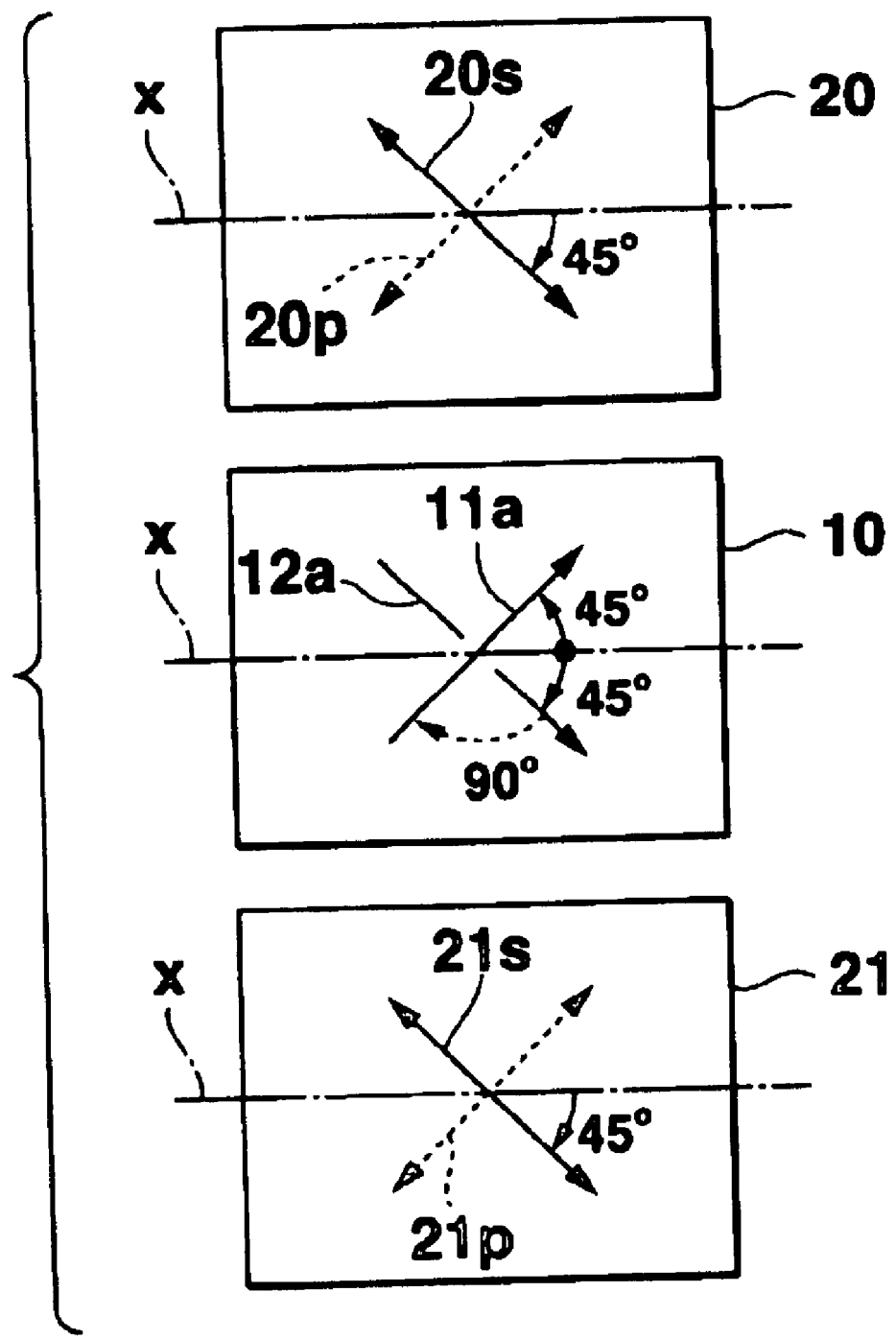
FIG. 3 is a plan view showing the arrangement of the optical axes of the optical elements included in the first embodiment of the present invention.

FIG. 3 shows the aligning directions of the liquid crystal molecules 19a in the vicinity of the substrates 11 and 12 arranged to have the liquid crystal element 10 sandwiched therebetween, the senses of the reflection axis 20s and the transmission axis 20p of the front reflection polarizing plate 20, and the senses of the reflection axis 21s and the transmission axis 21p of the rear reflection polarizing plate 21. As shown in the drawing, in this embodiment, the aligning direction 11a of the liquid crystal molecules in the vicinity of the front substrate 11 of the liquid crystal element 10 is deviated by about 45° in the counterclockwise direction from the lateral axis x of the screen as viewed from the front surface of the liquid crystal display apparatus. On the other hand, the aligning direction 12a of the liquid crystal molecules in the vicinity of the rear substrate 12 is deviated by about 45° in the clockwise direction as viewed from the front surface of the liquid crystal display apparatus. It follows that the liquid crystal molecules 19a of the liquid crystal layer 19 included in the liquid crystal element 10 are aligned in a twisted fashion from the rear substrate 12 toward the front substrate 11 in a twisting angle of about 90° in the clockwise direction as viewed from the front surface of the liquid crystal display apparatus, the twisting direction being denoted by a broken line in the figure.

In this embodiment, the front reflection polarizing plate 20 is arranged such that the transmission axis 20p thereof is substantially parallel to the aligning direction 11a of the liquid crystal molecules in the vicinity of the front substrate 11 of the liquid crystal element. On the other hand, the rear reflection polarizing plate 21 is arranged such that the transmission axis 21p thereof is substantially parallel to the transmission axis 20p of the front reflection polarizing plate 20.

The diffusion layer 22 arranged between the liquid crystal element 10 and the rear reflection polarizing plate 21 serves to diffuse the transmitted light. The diffusion layer 22 is formed of an optical film having a good diffusion capability and a good transmission capability. For example, the diffusion layer 22 is formed of a transparent film having the surface coarsened, a transparent film having light scattering particles dispersed therein, or a lens film having a large number of micro lenses formed on one surface. The diffusion layer 22 is attached to the front surface of the rear reflection polarizing plate 21 or to the outer surface of the rear substrate 12 of the liquid crystal element 10.

The back light 35 is a light source for emitting an illuminating light having a uniform brightness distribution toward the entire rear surface of the rear reflection polarizing plate 21. The back light 35 is lit when the liquid crystal display apparatus is used under an environment in which an external light having a sufficient brightness cannot be obtained. The back light 35, which is shown in a simplified fashion in FIG. 1, comprises, for example, a light guide plate for taking in the light from the edge plane so as to emit the light from the entire front surface and a light source such as a fluorescent lamp arranged to face the edge plane of the light guide plate.

In the liquid crystal display apparatus of the first embodiment, a reflection display is carried out by utilizing the external light incident on the front surface under an environment in which an external light having a sufficiently high brightness cannot be obtained, and the back light 35 is lit when an external light having a sufficiently high brightness cannot be obtained so as to carry out a transmission display by utilizing the illuminating light emitted from the back light 35.

In the liquid crystal display apparatus in this embodiment, the reflection display utilizing the external light is a display of a so-called "normally white mode", in which the display when voltage is not applied between the electrodes 13 and 14 of the liquid crystal element 10 is bright display.

FIGS. 4A and 4B show the transmission routes of the incident light during the reflection display of the liquid crystal display apparatus for the first embodiment of the present invention. Specifically, FIG. 4A shows the transmission route in the case where voltage is not applied between the electrodes 13 and 14 of the liquid crystal element 10. On the other hand, FIG. 4B shows the transmission route in the case where an electric field is formed between the electrodes 13 and 14 of the liquid crystal display apparatus, said electric field having an intensity such that the liquid crystal molecules 19a are aligned in a rising fashion in a direction substantially perpendicular to the surfaces of the substrates 11 and 12. As shown in FIGS. 4A and 4B, during the reflection display, among the two polarized components S and P, which are perpendicular to each other, of the external light (non-polarized light) $I_o$ incident on the front surface, the light $I_1'$ of the polarized component S along the reflection axis 20s of the front reflection polarizing plate 20 is reflected to the front side by the front reflection polarizing plate 20. On the other hand, the light $I_1$ of the polarized component P along the transmission axis 20p of the front reflection polarizing plate 20 is transmitted through the front reflection polarizing plate 20 to form a linear polarized light that is incident on the front surface of the liquid crystal element 10. The light $I_1$ incident on the liquid crystal element 10 is subjected to a birefringence function of the liquid crystal layer 19 in accordance with the aligned state of the liquid crystal molecules 19a, said aligned state being changed by the electric field applied between the electrodes 13 and 14 of the liquid crystal element 10, so as to be emitted to the rear side. To be more specific, the aligned state of the liquid crystal molecules 19a, when an electric field is not formed between the electrodes 13 and 14 of the liquid crystal element 10, is in an initially aligned state in a twisted fashion. In this case, the light $I_1$ (the light of polarized component P along the transmission axis 20p of the front reflection polarizing plate 20) that has passed through the front reflection polarizing plate 20 so as to be incident on the front surface of the liquid crystal element 10 is optically rotated by substantially 90° by the birefringence function of the liquid crystal layer 19 in which the liquid crystal molecules 19a are twist-aligned so as to form a light $I_2$ that is to be emitted to the rear side of the liquid crystal element 10, as shown in FIG. 4A. The light $I_2$ thus formed is diffused by the diffusion layer 22, and the diffused light $I_3$ is incident on the rear reflection polarizing plate 21. Therefore, when an electric field is not formed between the electrodes 13 and 14 of the liquid crystal element 10, the light $I_3$ incident from the front side on the rear reflection polarizing plate 21 constitutes the diffused light of the polarized component S along the reflection axis 21s of the rear reflection polarizing light 21. It follows that the light $I_3$ is reflected substantially completely by the rear reflection polarizing plate 21. The reflected light $I_4$ (the light of the polarized component S along the reflection axis 21s of the rear reflection polarizing plate 21) reflected from the rear reflection polarizing plate 21 is diffused again by the diffusion layer 22 to form a diffused light $I_5$ that is incident from the rear side on the liquid crystal element 10. The light $I_5$ incident from the rear side on the liquid crystal element 10 is optically rotated again by substantially 90° by the birefringence function of the liquid crystal layer 10 in which the liquid crystal molecules 19a are twist-aligned so as to form a light $I_6$ of the polarized component P along the transmission axis 20p of the front reflection polarizing plate 20, said light $I_6$ being emitted to the front side of the liquid crystal element 10. Then, the light $I_6$ is transmitted through the front reflection polarizing plate 20 so as to form a light $I_7$ that is be emitted to the front side. The bright display is achieved by the light $I_7$ emitted to the front side.

On the other hand, when an electric field having an intensity high enough to permit the liquid crystal molecules 19a to rise in a direction substantially perpendicular to the surfaces of the substrates 11 and 12 so as to be aligned is applied between the electrodes 13 and 14 of the liquid crystal element 10, the liquid crystal layer 19 substantially ceases to perform its birefringence function. As a result, the light $I_1$ (the light of the polarized component P along the transmission axis 20p of the front reflection polarizing plate 20) transmitted through the front reflection polarizing plate 20 so as to be incident on the front surface of the liquid crystal element 10 is emitted to the rear side of the liquid crystal element 10, with the polarized state left substantially unchanged, and the light $I_2'$ is transmitted through the diffusion layer 22 so as to be diffused, and the diffused light $I_3'$ is incident on the rear reflection polarizing plate 21. It follows that, while an electric field is formed between the electrodes 13 and 14, the light $I_3'$ incident on the rear reflection polarizing plate 12 constitutes the diffused light of the light of the polarized component P along the transmission axis 21p of the rear reflection polarizing plate 21. Therefore, the light $I_3'$ is transmitted through the rear reflection polarizing plate 21 so as to be emitted to the rear side and absorbed inside the back light 3, thereby performing a dark display. In this case, the light $I_4'$ transmitted through the rear reflection polarizing plate 21 so as to be emitted to the rear side is incident on the back light 35. Since the intensity of the light is lowered while the light is repeatedly reflected many times within the back light, the amount of the light reflected by the back light so as to be emitted to the front side is very small. It follows that it is possible to obtain a sufficient dark display.

In the liquid crystal display apparatus of this embodiment, the reflection polarizing plate 20 is arranged on the front side of the liquid crystal element 10, and the reflection polarizing plate 20 does not absorb but transmits with a high transmittance the light of the polarized component P having a vibrating plane along the transmission axis 20p, with the result that a large amount of light is allowed to be incident on the liquid crystal element 10 so as to increase the amount of the emitted light and, thus, obtain a bright display.

In the liquid crystal display apparatus of this embodiment, the reflection polarizing plate 21, which reflects the light of one of the two polarized components of the incident light, said two polarized components being perpendicular to each other, and transmits the light of the other polarized component, is arranged on the rear side of the liquid crystal element 10. Since the reflection polarizing plate 21 does not absorb but reflects the light of the one of the polarized components of the incident light, the light is not absorbed by the absorption polarizing plate unlike the conventional reflection type liquid crystal display apparatus in which the absorption polarizing plate is arranged on the rear side of the liquid crystal element and the reflection plate is arranged behind the absorption polarizing plate. It follows that the light incident on the front side can be emitted to the front side with a high efficiency in the liquid crystal display apparatus for the first embodiment of the present invention.

What should also be noted is that, in the liquid crystal display apparatus of this embodiment, among the external light $I_o$ incident on the front side, the light $I_1'$ of the polarized component S along the reflection axis 20 of the reflection polarizing plate 20 is reflected by the reflection polarizing plate 20 arranged on the front side of the liquid crystal element 10, making it possible for the reflected light $I_1'$ to increase the brightness of the entire screen.

In FIGS. 4A and 4B, the external light $I_o$ is depicted to be incident in a direction parallel to a line normal to the front reflection polarizing plate 20 for the sake of simplicity. However, the reflection type liquid crystal display apparatus is used in general such that the brightest direction during use of the liquid crystal display apparatus is somewhat inclined from a line normal to the screen toward the upper periphery of the screen. Therefore, the external light $I_o$ is incident on the front reflection polarizing plate in a direction somewhat inclined from the normal line, and, among the incident light, the light $I_1'$ of the polarized component S along the reflection axis 20s of the front reflection polarizing plate 20 is reflected toward the front side in accordance with the angle of incidence on the front reflection polarizing plate 20.

On the other hand, the display of the liquid crystal display apparatus is observed in the front direction of the screen (along the line substantially normal to the screen). Therefore, among the reflected light $I_1'$ of the external light reflected by the front reflection polarizing plate 20 toward the front side, the light contributing to the enhancement of the brightness of the screen, i.e., the light recognized by observer of the display, is a reflected light emitted toward the front side. In other words, the reflected light emitted in an inclined direction deviant from the front direction cannot be recognized by the observer of the display.

As described above, in the liquid crystal display apparatus for the first embodiment of the present invention, the brightness of the entire screen is enhanced by the reflected light $I_1'$ of the external light reflected by the front reflection polarizing plate 20 toward the front side. However, the "floating" of the darkness in the dark display caused by the reflected light $I_1'$ is mall, making it possible to obtain a sufficient contrast and prevent substantially completely the glittering of the screen caused by the reflected light $I_1'$.

A transmission display, which is performed by lighting the back light 35, will now be described. As described previously, in the liquid crystal display apparatus for the first embodiment of the present invention, the transmission axis 21p of the rear reflection polarizing plate 21 is substantially parallel to the transmission axis 20p of the front reflection polarizing plate 20. Therefore, the transmission display utilizing the illuminating light emitted from the back light 35 is a display of a so-called "normally black mode" in which the display is a dark display when an electric field is not formed between the electrodes 13 and 14 of the liquid crystal element 10.

Figure 5A:
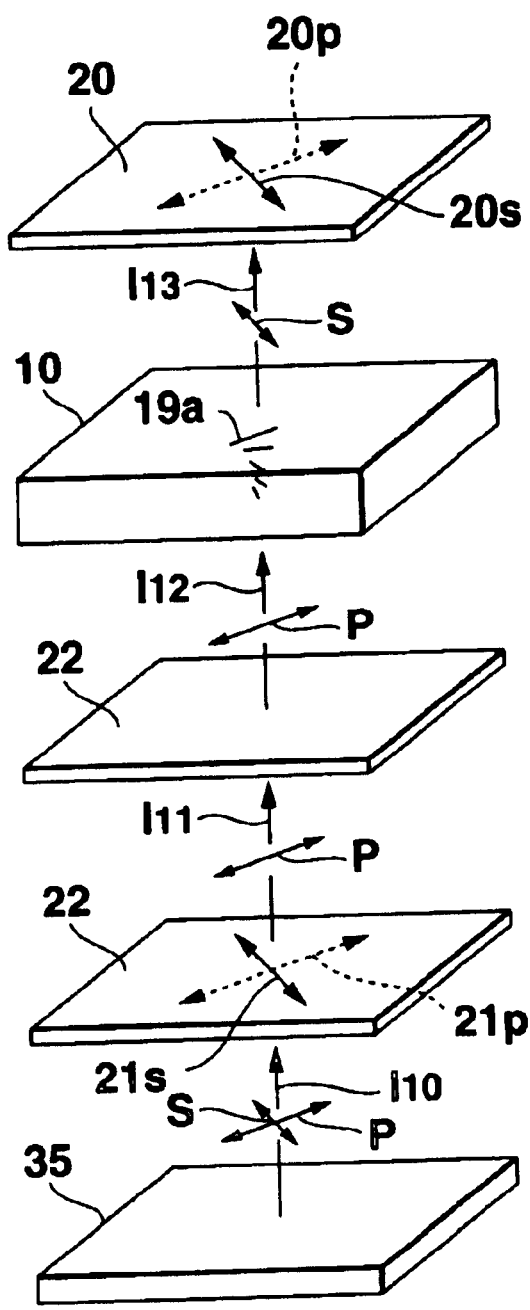
FIG. 5A is an oblique view showing in a broken fashion the operation of the transmission type display when an electric field is not applied to the liquid crystal layer.
Figure 5B:
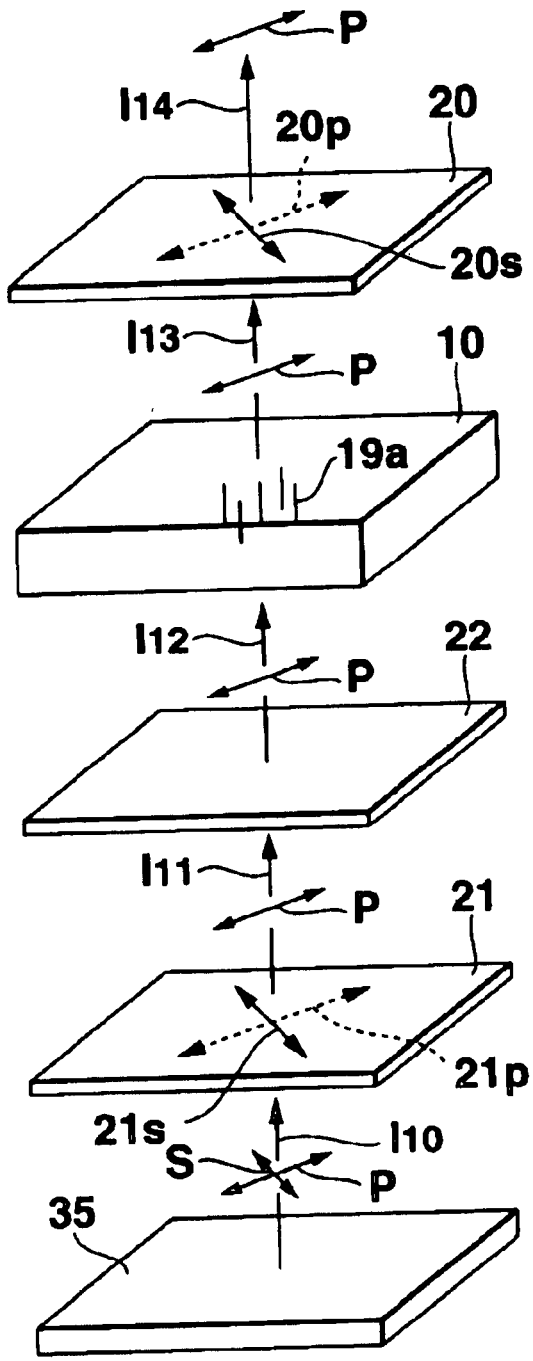
FIG. 5B is an oblique view showing in a broken fashion the operation of the transmission type display when an electric field is applied to the liquid crystal layer.

FIGS. 5A and 5B show the transmission routes of the incident light during the transmission display of the liquid crystal display apparatus. Specifically, FIG. 5A shows the transmission route when an electric field is not applied between the electrodes 13 and 14 of the liquid crystal element. On the other hand, FIG. 5B shows the transmission route in the case where an electric field having an intensity high enough to permit the liquid crystal molecules 19a to rise in a direction substantially perpendicular to the surfaces of the substrates 11 and 12 so as to be aligned is applied between the electrodes 13 and 14 of the liquid crystal element 10. As shown in FIGS. 5A and 5B, among the two polarized components S and P of the illuminating light $I_{10}$ emitted from the back light 35, said components S and P being perpendicular to each other, the light of the polarized component S along the reflection axis 21s of the rear reflection polarizing plate 21 is reflected by the rear reflection polarizing plate 21 toward the back side during the transmission display (the reflected light being not shown). Also, the light of the polarized component P along the transmission axis 21p of rear reflection polarizing plate 21 is transmitted through the rear reflection polarizing plate 21 so as to form a linear polarized light $I_{11}$. The linear polarized light $I_{11}$ thus formed is diffused by the diffusion layer 22 so as to form a light $I_{12}$ that is to be incident on the back side of the liquid crystal element 10. The light $I_{12}$ incident on the liquid crystal element 10 is subjected to a birefringence function of the liquid crystal layer 19 in accordance with the aligned state of the liquid crystal molecules 19a that is changed by the electric field applied between the electrodes 13 and 14 of the crystal element 10. To be more specific, when an electric field is not applied between the electrodes 13 and 14 of the liquid crystal element 10, the aligned state of the liquid crystal molecules 19a is in the state of the initial twisted alignment. In this case, the light $I_{12}$ (diffused light of the polarized component P along the transmission axis 21p of the rear reflection polarizing plate 21), which has been transmitted through the rear reflection polarizing plate 21 and diffused by the diffusion layer 22 so as to be incident on the back side of the liquid crystal element 10, is optically rotated by substantially 90° by the birefringence function of the liquid crystal layer 19 in which the liquid crystal molecules are twist-aligned so as to form a light $I_{13}n$ that is to be emitted to the front side of the liquid crystal element 10. The light $I_{13}$ thus formed is incident on the front reflection polarizing plate 20. Therefore, when an electric field is not applied between the electrodes 13 and 14 of the liquid crystal element 10, the $I_{13}$ incident from the back side on the front reflection polarizing plate 20 constitutes the diffused light of the polarized component S along the reflection axis 20s of the front reflection polarizing plate 20. It follows that the light $I_{13}$ is reflected substantially completely toward the back side by the front reflection polarizing plate 20, with the result that the display is a dark display. Also, when an electric field having an intensity high enough to permit the liquid crystal molecules 19a to rise in a direction substantially perpendicular to the surfaces of the substrates 11 and 12 so as to be aligned is applied between the electrodes 13 and 14 of the liquid crystal element 10, the light $I_{12}$ (diffused light of the polarized component P along the transmission axis 21p of the rear reflection polarizing plate 21), which has been transmitted through the rear reflection polarizing plate 10 and the diffusion layer 22 so as to be incident from the back side on the liquid crystal element 10, is emitted to the front side of the liquid crystal element 10 to form a light $I_{13}'$ with the polarized state left substantially unchanged. The light $I_{13}'$ thus formed is incident on the front reflection polarizing plate 20.

It follows that, when an electric field is formed between the electrodes 13 and 14 of the liquid crystal element 10, the light $I_{13}'$ emitted to the front side of the liquid crystal element 10 consists of the diffused light of the polarized component P along the transmission axis 20p of the front reflection polarizing plate 20, and the light $I_{13}'$ is transmitted substantially completely through the front reflection polarizing plate 20 so as to form a light $I_{14}$ that is to be emitted to the front side, with the result that a bright display is achieved by the emitted light $I_{14}$. During the transmission display, among the illuminating light $I_{10}$ incident on the back side, the light of the polarized component along the transmission axis 21 of the rear reflection polarizing plate 21 is transmitted through the rear reflection polarizing plate 21 so as to be incident on the liquid crystal element 10. Therefore, the incident rate of the light is substantially half the illuminating light $I_{10}$ incident from the back side. However, since the loss of the light of the route in which the incident light transmitted through the rear reflection polarizing plate 21 so as to be emitted to the front side is small, it is possible to utilize with a high efficiency the illuminating light incident from the back side so as to obtain a bright screen in the case of the transmission display, too, utilizing the illuminating light emitted from the back light 35.

It should also be noted that, in the first embodiment of the present invention, the diffusion plate 22 is arranged between the liquid crystal element 10 and the rear reflection polarizing plate 21 arranged behind the liquid crystal element 10. It follows that it is possible to permit the diffused light to be emitted to the front side in the case of any of the reflection display and the transmission display described above, making it possible to obtain a display of a uniform brightness distribution. What should also be noted is that it is possible to eliminate the reflection of the back ground scene, i.e., the difficulty that the back ground scene such as the face of the observer of the display and the back ground scene are reflected on the rear reflection polarizing plate 21.

In the first embodiment of the present invention described above, the diffusion layer 22 is arranged between the liquid crystal element 10 and the rear reflection polarizing plate 21. However, it is also possible to apply a coarsening treatment to the front surface of the rear reflection polarizing plate 21, in place of arranging the diffusion layer 22, so as to permit the rear reflection polarizing plate 21 to diffuse the light.

Further, it is possible to arrange the front reflection polarizing plate 20 to permit the transmission axis 20p thereof to be substantially perpendicular to the aligning direction 11a of the liquid crystal molecules in the vicinity of the front substrate 11 of the liquid crystal element 10. In this case, it is possible to perform a display of the normally white mode during the reflection display utilizing the external light and to perform a display of the normally black mode during the transmission display utilizing the illuminating light emitted from the back light 35 as in the embodiment described above by arranging the rear reflection polarizing plate 21 such that the transmission axis 21p is substantially parallel to the transmission axis 20p of the front reflection polarizing plate.

Also, it is possible to arrange the rear reflection polarizing plate 21 such that the transmission axis 21p is substantially perpendicular to the transmission axis 20p of the front reflection polarizing plate 20. In the case of arranging the rear reflection polarizing plate 21 in this fashion, it is possible to perform a display of the normally black mode during the reflection display utilizing the external light, and to perform a display of the normally white mode during the transmission display utilizing the illuminating light emitted from the back light 35.

As described above, in the liquid crystal display apparatus according to the first embodiment of the present invention, the reflection display utilizing the external light and the transmission display utilizing the illuminating light emitted from the back light 35 are opposite to each other in the brightness-darkness relationship. In other words, the brightness-darkness relationship is reversed. However, it is possible to eliminate the reversed brightness-darkness relationship by performing a reversed driving when the back light 35 is lit such that the brightness-darkness relationship is reversed.

It should also be noted that it is desirable to control step-wise the electric field applied between the electrodes 13 and 14 of the liquid crystal element 10 within the range that the liquid crystal molecules 19 are allowed to rise in a direction substantially perpendicular to the surfaces of the substrates 11 and 12 from the initial twist-aligned state so as to be aligned. In this case, it is possible to change step-wise the intensity of the light emitted to the front side both during the reflection display and during the transmission display so as to display images having a gradation in the brightness.

In the first embodiment of the present invention described above, the color filters 15R, 15G and 15B are arranged in the pixel region of the liquid crystal element 10. Therefore, the light components having wavelengths of the absorption wavelength band are absorbed by these color filters 15R, 15G and 15B, with the result that the light passing through each of these color filters 15R, 15G and 15B is colored in the color of each of these color filters 15R, 15G and 15B, i.e., colored red, green or blue. In other words, the light emitted from each of these pixel regions is colored red, green or blue, making it possible to display a multi-colored image such as a full color image by gradually changing the intensity of the emitted light of red, green and blue.

Figure 6:
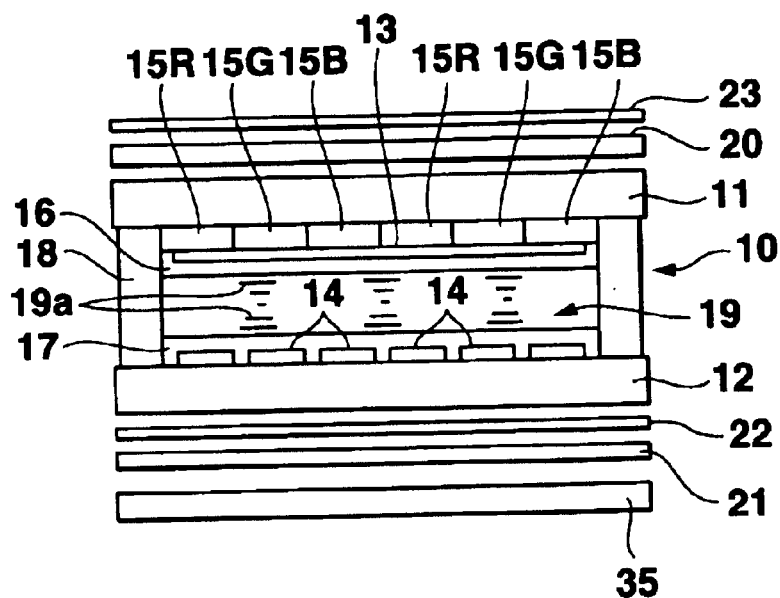
FIG. 6 is a cross sectional view showing a first modification of the first embodiment of the present invention.

FIG. 6 is a cross sectional view showing a liquid crystal display apparatus according to a first modification of the first embodiment of the present invention. In the first modification, a diffusion layer 23 acting as a diffusion means for diffusing the light reflected by the front reflection polarizing plate 20 is arranged in front of the liquid crystal display apparatus of the first embodiment, i.e., in front of the front reflection polarizing plate 20. Since the liquid crystal display apparatus according to the first modification is equal in construction to the liquid crystal display apparatus according to the first embodiment of the present invention, except that the diffusion layer 23 is arranged in front of the front reflection polarizing plate 20 in the first modification, the same constituents of the liquid crystal display apparatus are denoted by the same reference numerals so as to avoid the overlapping description.

The diffusion layer 23 arranged in front of the front reflection polarizing plate 20 is constructed by, for example, a transparent film having a coarsened surface, a transparent film having light scattering particles dispersed therein, or a lens film having micro lenses arranged on one surface like the diffusion layer 22 arranged between the liquid crystal element 10 and the rear reflection polarizing plate 21 arranged as a rear member behind the liquid crystal element 10. The diffusion layer 23 of the particular construction is attached to the front surface of the front reflection polarizing plate 20.

According to the liquid crystal display apparatus according to the first modification of the first embodiment, the external light incident on the front side and reflected by the front reflection polarizing plate 20 is diffused by the diffusion layer 23 arranged in front of the front reflection polarizing plate 20 during the reflection display, with the result that it is possible to eliminate the glittering of the screen caused by the light reflected by the front reflection polarizing plate 20.

It should also be noted that, in the liquid crystal display apparatus according to the first modification of the first embodiment, the light leaking from the dark display region to the front side is diffused by the diffusion layer 23 arranged in front of the front reflection polarizing plate 20 both during the reflection display and during the transmission display. As a result, it is possible to decrease the light leakage in the front direction in which the display is observed (along the line normal to the screen) so as to make the dark display darker and, thus, to further improve the contrast.

Further, in the liquid crystal display apparatus according to the first modification of the first embodiment, the transmitted light diffused by the diffusion layer 22 arranged between the liquid crystal element 10 and the rear reflection polarizing plate 21 is further diffused when emitted to the front side by the diffusion layer 23 arranged in front of the front reflection polarizing plate 20 both during the reflection display and during the transmission display, making it possible to obtain display of a more uniform brightness distribution. In addition, it is possible to eliminate effectively the reflection of the back ground scene on the rear reflection polarizing plate 21 during the reflection display.

Incidentally, in the case of using a film having the coarsened surface or a film having light scattering particles dispersed herein as the diffusion layer 23 arranged in front of the front reflection polarizing plate, it is desirable to set the haze value at about 30 to 32. In this case, it is possible to obtain a display having a high front brightness.

It is more desirable for the diffusion layer 23 to be formed of a lens film having micro lenses arranged on one surface. In the case of using the particular lens film, it is possible to obtain a higher front brightness.

In the first modification of the first embodiment, the rear diffusion layer 22 is arranged between the liquid crystal element 10 and the rear reflection polarizing plate 21, and the front diffusion layer is arranged in front of the front reflection polarizing plate 20. However, it is possible to omit the rear diffusion layer 22 in the case of arranging the front diffusion layer 23 in front of the front reflection polarizing plate 20.

Figure 7:
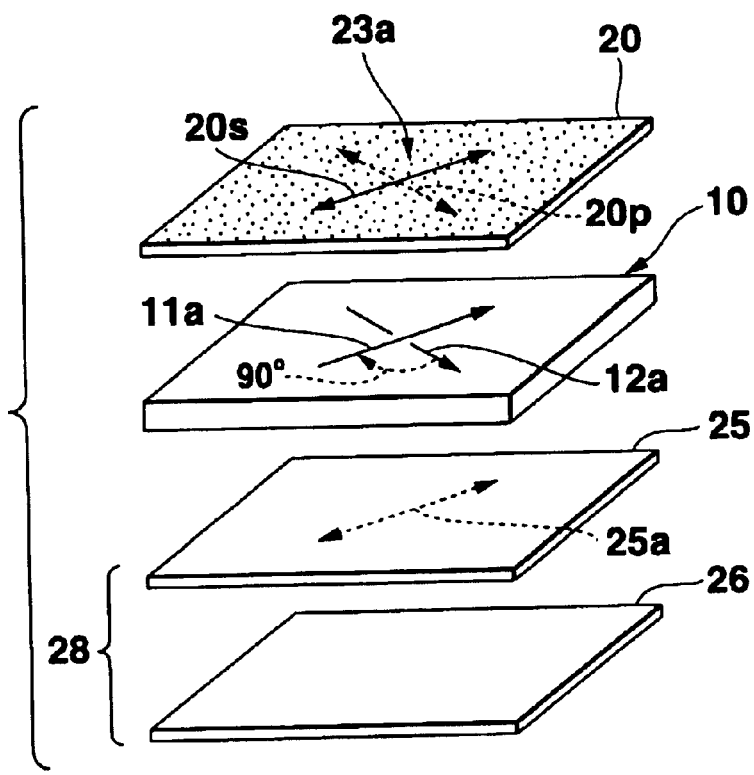
FIG. 7 is an oblique view showing in a dismantled fashion a liquid crystal display apparatus according to a second modification of the first embodiment of the present invention.

FIG. 7 is an oblique view showing in a dismantled fashion a liquid crystal display apparatus according to a second modification of the first embodiment of the present invention. In the liquid crystal display apparatus according to the second modification of the first embodiment, the front reflection polarizing plate 20 is arranged on the front side of the liquid crystal element 20, and a rear member 28 is arranged on the rear side of the liquid crystal element 10. The rear member 28 is constructed by an absorption reflection plate 25 absorbing the light of one of the two polarized components of the incident light, said two polarized components being perpendicular to each other, and transmitting the light of the other polarized component, and a reflection plate 26 arranged behind the absorption polarizing plate 25.

The liquid crystal element 10 and the front reflection polarizing plate 20 included in the liquid crystal display apparatus according to the second modification of the first embodiment of the present invention are equal to those included in the first embodiment of the present invention, the same reference numerals are used for denoting these liquid crystal member and the front reflection polarizing plate for avoiding the overlapping description.

In the liquid crystal element 10, the liquid crystal molecules are twist-aligned with a twisting angle of substantially 90° as denoted by a broken line. In the second modification, the front reflection polarizing plate 20 of the liquid crystal element 10 is arranged such that the transmission axis 20p is substantially parallel or substantially perpendicular (substantially perpendicular in the drawing) to the aligning direction 11a of the liquid crystal molecules in the vicinity of the front substrate of the liquid crystal element 10. Also, the absorption reflecting plate 25 included in the rear member 28 is arranged such that the transmission axis 25a is substantially parallel to the transmission axis 20p of the front reflection polarizing plate 20.

It should also be noted that, in the second modification of the first embodiment, a coarsening treatment is applied to the front surface of the front reflection polarizing plate 20 so as to permit the coarsened front surface to act as a diffusion plane 23a for diffusing the light reflected by the front reflection polarizing plate 20.

Figure 8:
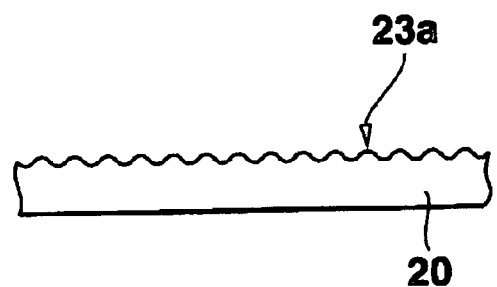
FIG. 8 is a cross sectional view showing in a magnified fashion a part of the reflection polarizing plate 20 used in the first embodiment of the present invention.

FIG. 8 is a cross sectional view showing in a magnified fashion a part of the front reflection polarizing plate 20. As shown in the drawing, the front diffusion surface 23a of the front reflection polarizing plate 20 is constructed by a roughened surface formed by densely arranging fine groove-like recesses or dot-like recesses.

The liquid crystal display apparatus according to the second modification of the first embodiment is for performing the reflection display alone utilizing the external light. In the second modification, the rear member 28 arranged behind the liquid crystal member 10 is constructed by the absorption polarizing plate 25 and the reflection plate 26 arranged behind the absorption polarizing plate 24. Since the absorption polarizing plate is arranged such that the transmission axis 25a is substantially parallel to the transmission axis 20a of the front reflection polarizing plate 20, the liquid crystal display apparatus performs a display of a normally white mode. To be more specific, when an electric field is not applied between the electrodes 13 and 14 of the liquid crystal element 10 (i.e., when the aligned state of the liquid crystal molecules is in the initial twisted alignment), the light transmitted through the front reflection polarizing plate 20 so as to be incident on the liquid crystal element 10 and optically rotated by substantially 90° by the birefringence function of the liquid crystal layer so as to be emitted to the rear side of the liquid crystal element 10 is transmitted through the absorption polarizing plate 25 and, then, reflected by the reflection plate 26. Further, the reflected light is transmitted through the absorption polarizing plate 25, the liquid crystal element 10 and the front reflection polarizing plate 20 so as to be emitted to the front side, thereby achieving a bright display.

On the other hand, when an electric field having an intensity high enough to permit the liquid crystal molecules to rise in a direction substantially perpendicular to the surfaces of the substrates 11, 12, the liquid crystal layer substantially ceases to perform the birefringence function. As a result, the light transmitted through the front reflection polarizing plate 20 so as to be incident on the liquid crystal element 10 is emitted to the rear side of the liquid crystal element 10, with the polarized state left substantially unchanged, and the light emitted to the rear side of the liquid crystal element 10 is absorbed by the absorption polarizing plate 25 so as to perform a dark display.

In the liquid crystal display apparatus according to the second modification of the first embodiment, the rear member 28 is constructed by the absorption polarizing plate 25 and the reflection plate 26 arranged behind the absorption polarizing plate 25, with the result that the dark display is made darker so as to improve the contrast.

In the liquid crystal display apparatus according to the second modification of the first embodiment, the transmission axis 25*a* of the absorption polarizing plate 25 included in the rear member 28 is substantially perpendicular to the transmission axis 20*p* of the front reflection polarizing plate 20. However, it is also possible to arrange the absorption polarizing plate 25 such that the transmission axis 25*a* is substantially parallel to the transmission axis 20*p* of the front reflection polarizing plate 20. Where the absorption polarizing plate 25 is arranged in this fashion, it is possible to perform a display of the normally black mode.

Figure 9:
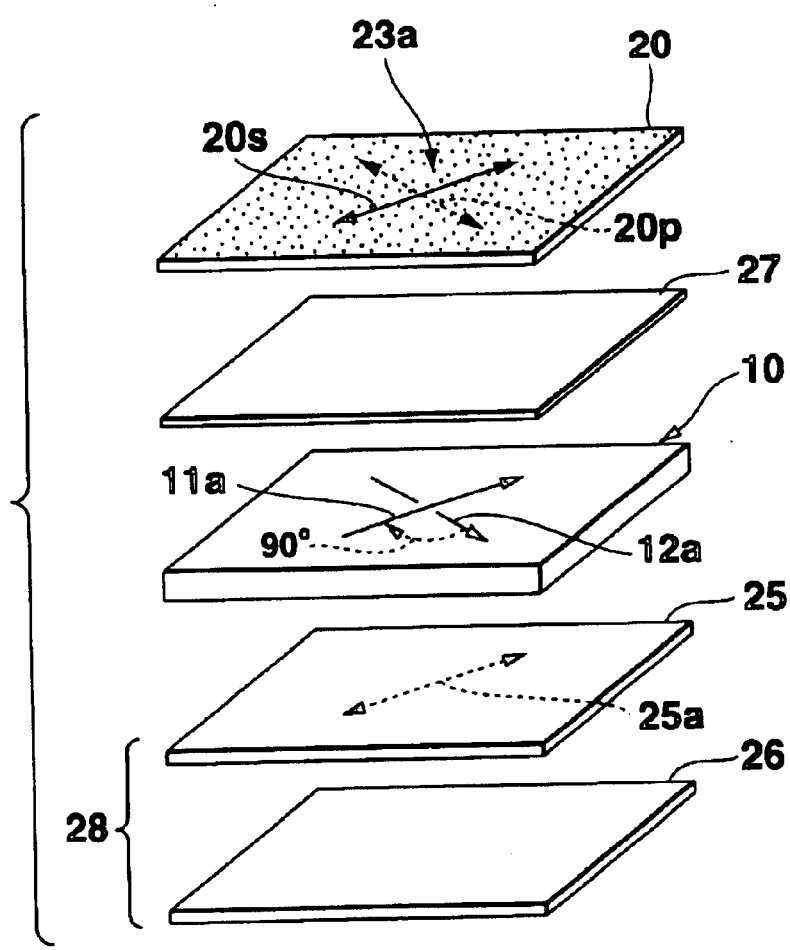
FIG. 9 is an oblique view showing in a dismantled fashion a liquid crystal display apparatus according to a third modification of the first embodiment of the present invention.

FIG. 9 is an oblique view showing in a dismantled fashion a liquid crystal display apparatus according to a third modification of the first embodiment of the present invention. In the liquid crystal display apparatus of the third modification of the first embodiment, the front reflection polarizing plate 20 is arranged in front of the liquid crystal element 10, and the rear member 28 constructed by the absorption polarizing plate 25 and the reflection plate 26 arranged behind the absorption polarizing plate 25 is arranged on the rear side of the liquid crystal element 10. In addition, a diffusion layer 27 for diffusing the transmitted light is arranged between the liquid crystal element 10 and the reflection polarizing plate 20 arranged in front of the liquid crystal element 10.

The liquid crystal display apparatus according to the third modification of the first embodiment is substantially equal to the second modification shown in FIG. 7, except that, in the liquid crystal display apparatus for the third modification, the diffusion layer 27 is arranged between the liquid crystal element 10 and the front reflection polarizing plate 20 in the liquid crystal display apparatus for the second modification of the first embodiment. Therefore, the same members of the display apparatus are denoted by the same reference numerals so as to avoid an overlapping description.

In the liquid crystal display apparatus according to the third modification of the first embodiment, the diffusion layer 27 is arranged between the liquid crystal element 10 and the front reflection plate 20. Therefore, the light reflected by the reflecting plate 26 arranged behind the absorption polarizing plate 25 so as to be emitted to the front side is diffused double by the diffusion layer 27 and the diffusing plane 23*a* on the front surface of the front reflection polarizing plate 20, making it possible to obtain a display of a more uniform brightness distribution and to eliminate without fail the reflection of the back scene on the reflection plate 26.

Figure 10:
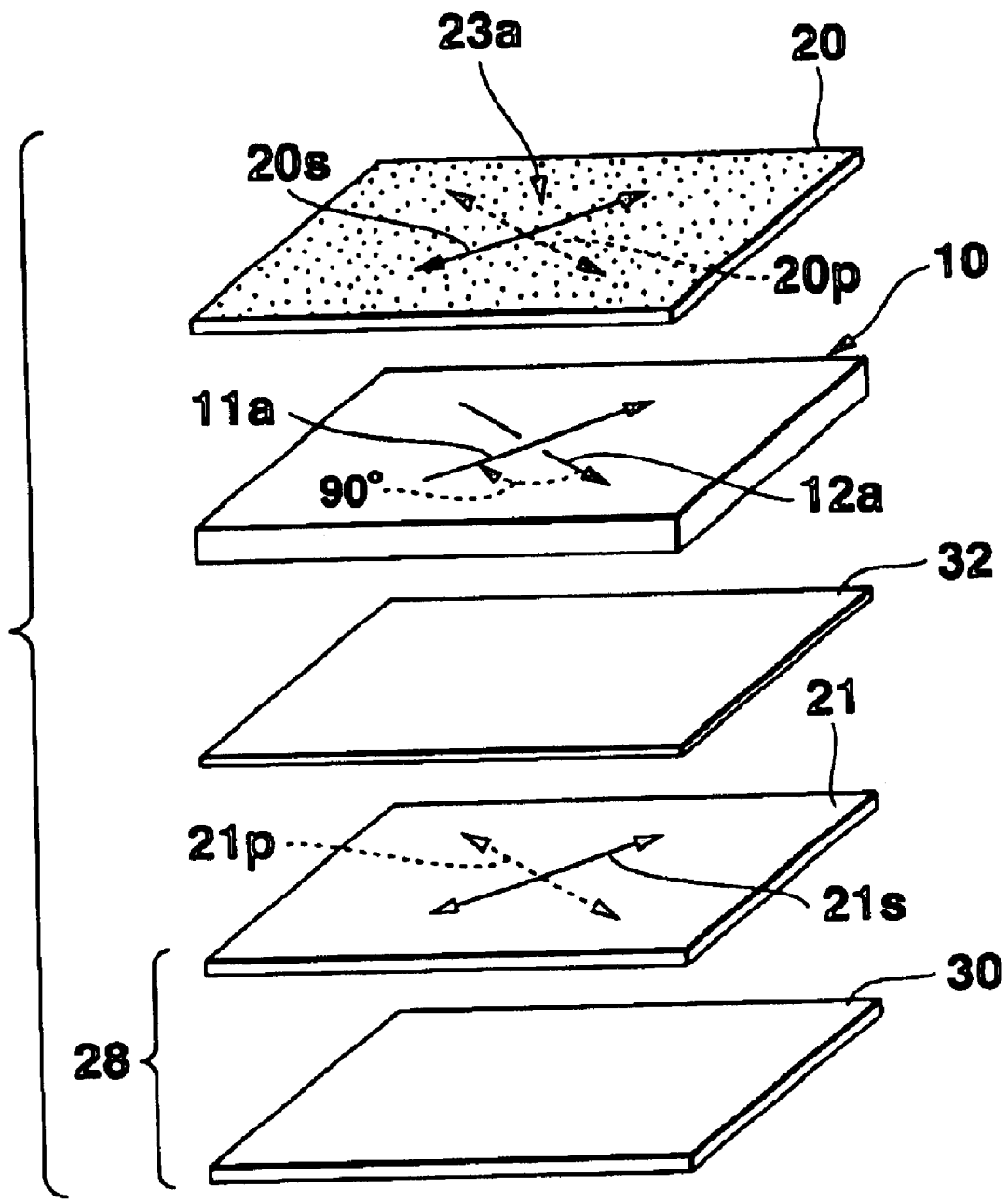
FIG. 10 is an oblique view showing in a dismantled fashion a liquid crystal display apparatus according to a fourth modification of the first embodiment of the present invention.

FIG. 10 is an oblique view showing in a dismantled fashion a liquid crystal display apparatus according to a fourth modification of the first embodiment of the present invention. In the liquid crystal display apparatus according to the fourth modification of the first embodiment, the reflecting polarizing plate 20 is arranged on the front side of the liquid crystal element, and the rear member 28 constructed by the reflection polarizing plate 21 and a light absorbing film 30 formed as a light absorbing means behind the reflection polarizing plate 21 is arranged on the rear side of the liquid crystal element 10. In addition, a diffusion layer 32 diffusing the transmitted light is arranged between the liquid crystal element 20 and the reflection polarizing plate 21 included in the rear member 28.

The liquid crystal display apparatus according to the fourth modification of the first embodiment is equal in construction to the display apparatus according to the second modification of the first embodiment, except that, in the fourth modification, the rear member 28 constructed by the reflection polarizing plate 21 and the light absorption film 30 formed behind the reflection polarizing plate 21 is substituted for the rear member 28 included in the liquid crystal display apparatus according to the second modification, and that the diffusion layer 32 is arranged between the liquid crystal element 10 and the reflection polarizing plate 21 included in the rear member 28. Therefore, the same constituents of the display apparatus are denoted by the same reference numerals so as to avoid an overlapping description.

In the liquid crystal element 10, the liquid crystal molecules are twist-aligned with an twisting angle of substantially 90° as denoted by a broken line in the drawing. In the fourth modification, the reflection polarizing plate 20 on the front side of the liquid crystal element 10 is arranged such that the transmission axis 20*p* is substantially parallel or perpendicular (substantially perpendicular in the drawing) to the aligning direction of the liquid crystal molecules in the vicinity of the front substrate of the liquid crystal element 10, and the reflection polarizing plate 21 included in the rear member 28 is arranged such that the transmission axis 21*p* is substantially parallel to the transmission axis 20*p* of the front reflection polarizing plate 20.

The liquid crystal display apparatus according to the fourth modification of the first embodiment of the present invention is for the reflection display alone utilizing the external light. In the fourth modification, the rear member 28 arranged behind the liquid crystal element 10 is constructed by the reflection polarizing plate 21 and the light absorption film 30 arranged behind the reflection polarizing plate 21. Also, the reflection polarizing plate 21, i.e., the rear reflection polarizing plate, is arranged such that the transmission axis 21*p* is substantially perpendicular to the transmission axis 20*p* of the front reflection polarizing plate 20 arranged in front of the liquid crystal element 20. Therefore, the display is of the normally white mode. To be more specific, when an electric field is not formed between the electrodes of the liquid crystal element 10, i.e., when the aligned state of the liquid crystal molecules is in the initial twisted alignment, the light transmitted through the front reference polarizing plate 20 so as to be incident on the liquid crystal element 10 is optically rotated by substantially 90° by the birefringence function of the liquid crystal layer to form the light of the polarized component along the reflection axis 21a of the rear reflection polarizing plate 21. The light thus formed is emitted to the rear side of the liquid crystal element 10 and, then, reflected by the rear reflection polarized plate 21. Further, the reflected light is transmitted through the liquid crystal element 10 and the front reflection polarizing plate 20 so as to be emitted to the front side and, thus, to achieve a bright display.

When an electric field having an intensity high enough to permit the liquid crystal molecules to rise in a direction substantially perpendicular to the surfaces of the substrates of the liquid crystal element 10 so as to be aligned is applied between the electrodes of the liquid crystal element 10, the birefringence performance of the liquid crystal layer is substantially eliminated. In this case, the light transmitted through the front reflection polarizing plate 20 so as to be incident on the liquid crystal element 10 is emitted to the rear side of the liquid crystal element 10 with the polarized state left substantially unchanged. It follows that the light emitted to the rear side of the liquid crystal element 10 is transmitted through the rear reflection polarizing plate 21 so as to be absorbed by the light absorption film 30 arranged behind the rear reflection polarizing plate 21, thereby achieving a dark display.

In the liquid crystal display apparatus according to the fourth modification of the first embodiment of the present invention, the rear member 28 is constructed by the rear reflection polarizing plate 21 and the light absorption film 30 formed behind the rear reflection polarizing plate 21 so as to make the dark display darker, thereby increasing the contrast.

Further, in the fourth modification, the diffusion layer 32 is arranged between the liquid crystal element 10 and the rear reflection polarizing plate 21 included in the rear member 28. Therefore, the light reflected by the rear reflection polarizing plate 21 so as to be emitted to the front side is diffused double by the diffusion layer 32 and the diffusion 23a on the front surface of the front reflection polarizing plate 20 so as to obtain a display of a more uniform brightness distribution and to eliminate the reflection of the back ground scene on the rear reference polarizing plate 21.

In the fourth modification of the first embodiment, the transmission axis 21p of the rear reflection polarizing plate 21 included in the rear member 28 is substantially perpendicular to the transmission axis 20p of the front reflection polarizing plate 20. However, it is also possible to arrange the rear reflection polarizing plate 21 such that the transmission axis 21p is substantially parallel to the transmission axis 20p of the front reflection polarizing plate 20. In the case of arranging the rear reflection polarizing plate 21 in this fashion, it is possible to perform a display of the normally black mode.

Figure 11:
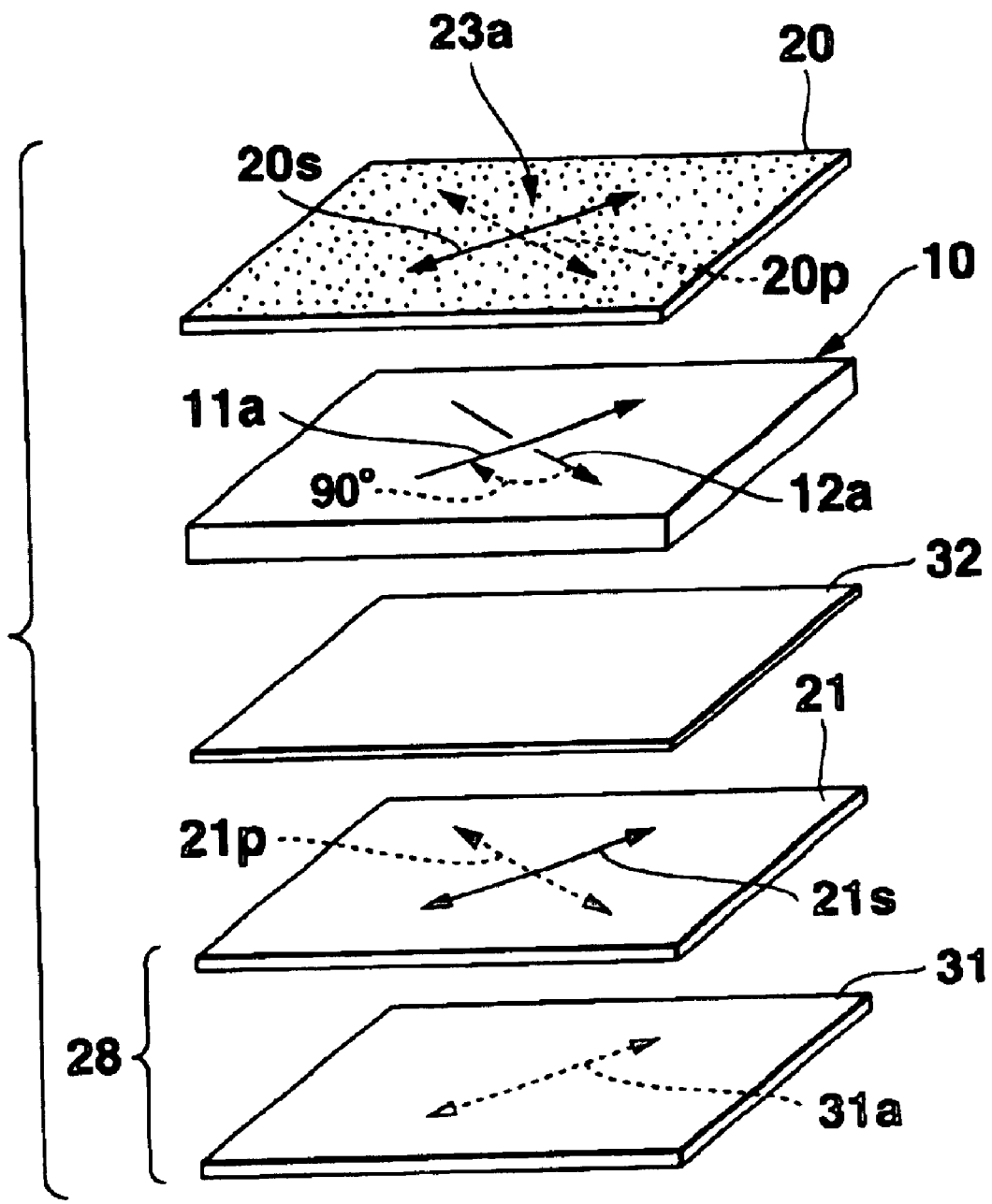
FIG. 11 is an oblique view showing in a dismantled fashion a liquid crystal display apparatus according to a fifth modification of the first embodiment of the present invention.

FIG. 11 is an oblique view showing in a dismantled fashion a liquid crystal display apparatus according to a fifth modification of the first embodiment of the present invention. In the liquid crystal display apparatus according to the fifth modification of the first embodiment, the reflecting polarizing plate 20 is arranged on the front side of the liquid crystal element, and the rear member 28 constructed by the rear reflection polarizing plate 21 and an absorption polarizing plate 31 formed as a light absorbing means behind the reflection polarizing plate 21 is arranged on the rear side of the liquid crystal element 10. In addition, a diffusion layer 32 diffusing the transmitted light is arranged between the liquid crystal element 20 and the reflection polarizing plate 21 included in the rear member 28.

The liquid crystal display apparatus according to the fifth modification of the first embodiment is equal in construction to the display apparatus according to the fourth modification of the first embodiment shown in FIG. 10, except that, in the fifth modification, the rear member 28 constructed by the reflection polarizing plate 21 and the absorption polarizing plate 31 formed behind the reflection polarizing plate 21 is substituted for the rear member 28 included in the liquid crystal display apparatus according to the fourth modification shown in FIG. 10. Therefore, the same constituents of the display apparatus are denoted by the same reference numerals so as to avoid an overlapping description.

In the fifth modification, the absorption polarizing plate 31 is arranged such that the transmission axis 31a is substantially perpendicular to the transmission axis 21p of the rear reflection polarizing plate 21 and, thus, the absorption polarizing plate 31 absorbs the light transmitted through the rear reflection polarizing plate 21 among the light transmitted through the front reflection polarizing plate 20 and the liquid crystal element 10 so as to be incident on the rear member 28. It follows that the dark display can be made darker so as to improve the contrast.

Figure 12:
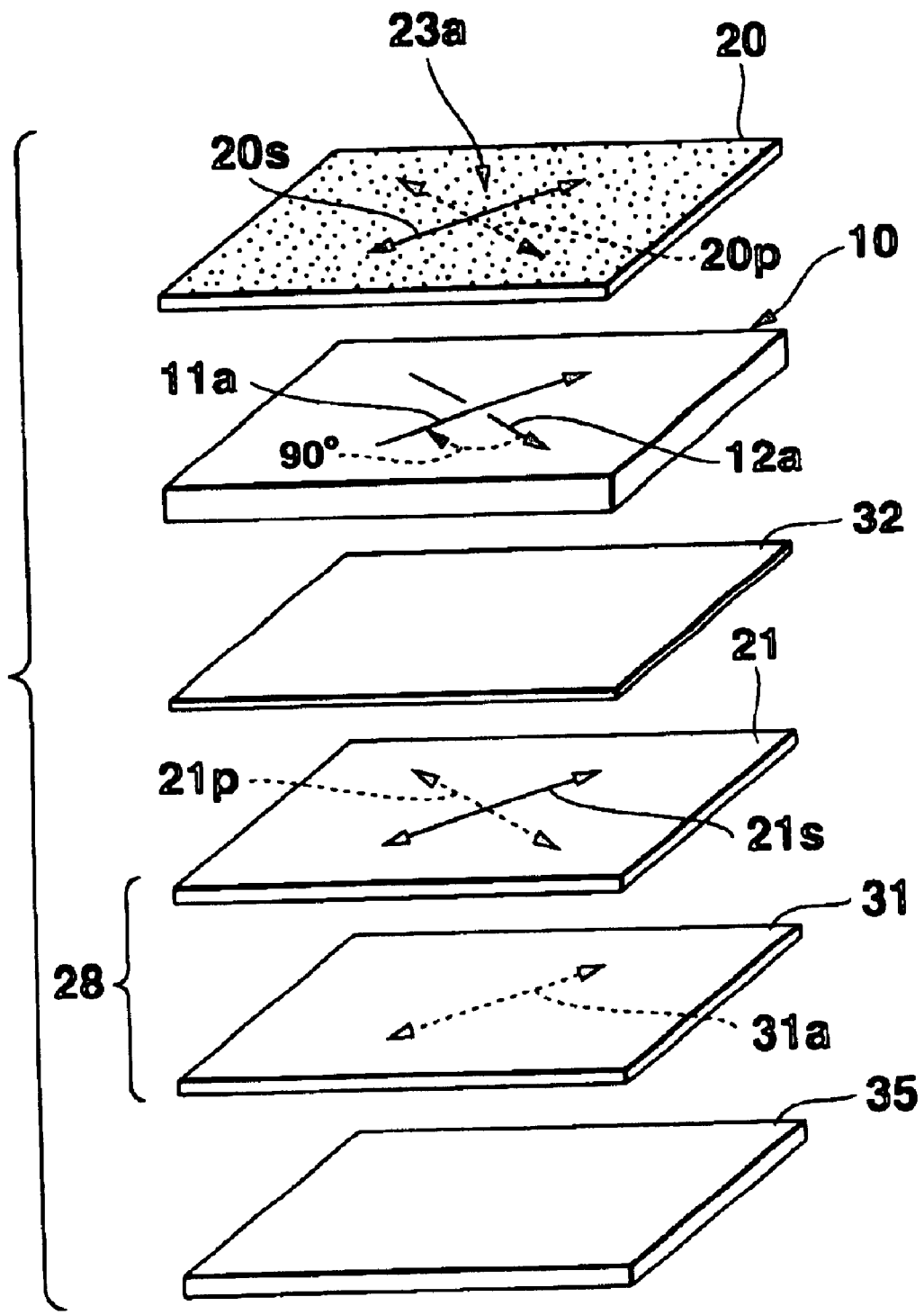
FIG. 12 is an oblique view showing in a dismantled fashion a liquid crystal display apparatus according to a sixth modification of the first embodiment of the present invention.

FIG. 12 is an oblique view showing in a dismantled fashion a liquid crystal display apparatus according to a sixth modification of the first embodiment of the present invention. The liquid crystal display apparatus according to the sixth modification of the first embodiment is equal in construction to the display apparatus according to the fifth modification of the first embodiment shown in FIG. 11, except that the back light 35, which is lit when the liquid crystal display apparatus is used under an environment in which it is impossible to obtain an external of a sufficient bright, is arranged behind the rear member 28 (behind the absorption polarizing plate 31) of the liquid crystal display apparatus according to the fifth modification shown in FIG. 11. Therefore, the same constituents of the display apparatus are denoted by the same reference numerals so as to avoid an overlapping description.

The back light 35, which is a planar light source for emitting an illuminating light having a uniform brightness distribution toward the entire rear surface of the absorption polarizing plate 31 included in the rear member 28, is constructed by a light guide plate for taking in the light from, for example, the edge plane so as to emit the light thus taken in from the entire front surface and a light source such as a fluorescent lamp arranged to face the edge plane of the light guide plate. To be more specific, the rear member 28 is constructed such that the absorption polarizing plate 31 is arranged behind the rear reflection polarizing plate 21 such that the transmission axis 31a is substantially perpendicular to the transmission axis 21p of the rear reflection polarizing plate 21. It should be noted that the degree of polarization of the absorption polarizing plate is about 95% and the rear reflection polarizing plate is low in its degree of polarization. It follows that the illuminating light emitted from the back light is transmitted through these absorption polarizing plate 31 and rear reflection polarizing plate 21 so as to be incident on the liquid crystal element 10. It follows that the liquid crystal display apparatus according to the sixth modification of the first embodiment is capable of performing both the reflection display utilizing the external light and the transmission display utilizing the illuminating light emitted from the back light 35.

Figure 13:
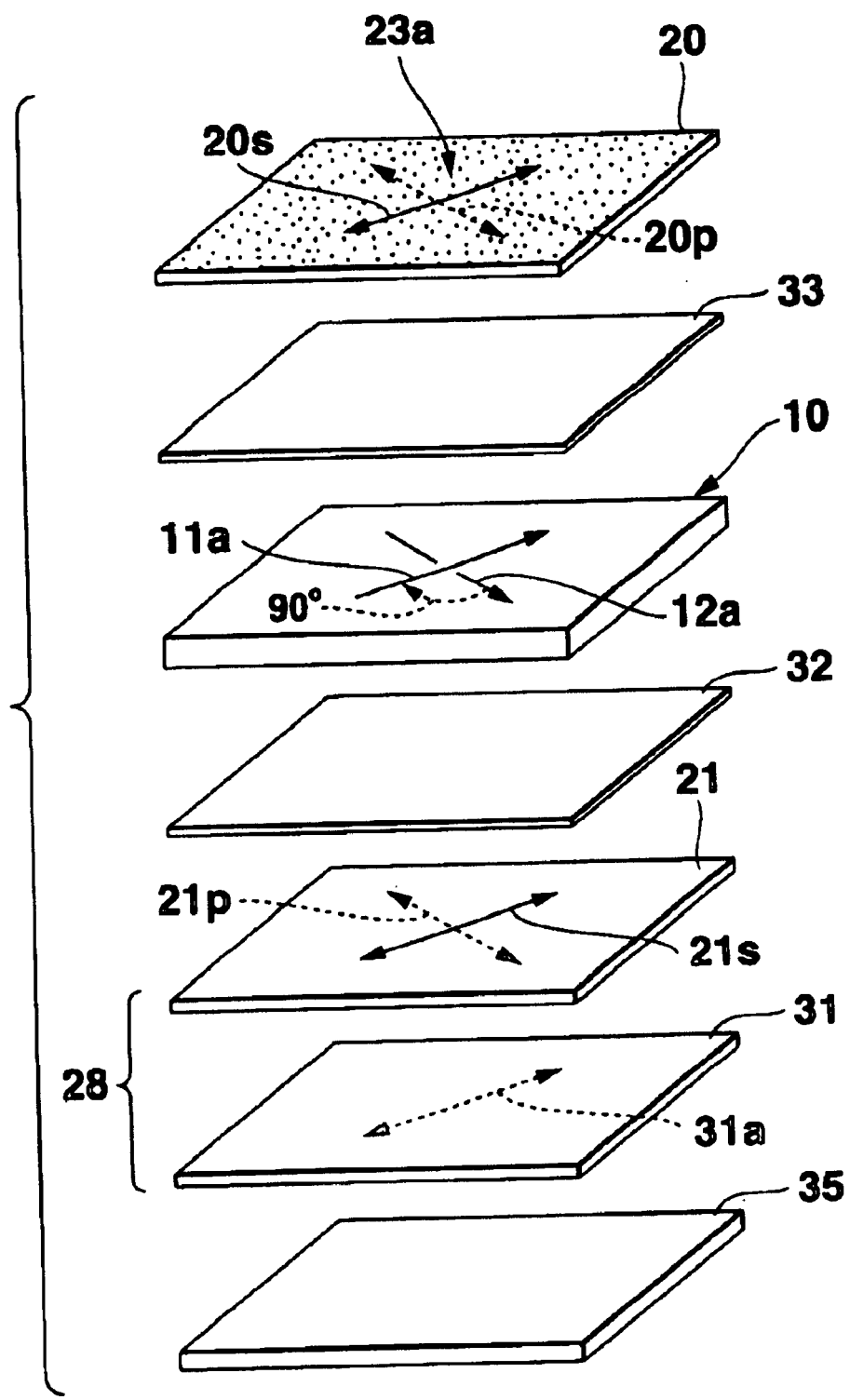
FIG. 13 is an oblique view showing in a dismantled fashion a liquid crystal display apparatus according to a seventh modification of the first embodiment of the present invention.

FIG. 13 is an oblique view showing in a dismantled fashion a liquid crystal display apparatus according to a seventh modification of the first embodiment of the present invention. In the liquid crystal display apparatus of the seventh modification of the first embodiment, a diffusion layer 33 is arranged between the liquid crystal element 10 and the front reflection polarizing plate 20 included in the liquid crystal display apparatus according to the sixth modification shown in FIG. 12.

According to the liquid crystal display apparatus of the seventh modification, the diffusion layer 32 is arranged between the liquid crystal element 10 and the rear reflection polarizing plate 21 included in the rear member 28. In addition, the diffusion layer 33 is arranged between the liquid crystal element 10 and the front reflection polarizing plate 20. It follows that the light reflected by the rear reflection polarizing plate 21 so as to be emitted to the front side is diffused three times, i.e., diffused by the diffusion layers 32, 33 and by the diffusion plane 23a on the front surface of the front reflection polarizing plate 20, making it possible to obtain a display of a more uniform brightness distribution. In addition, it is possible to eliminate completely the reflection of the back ground scene on the rear reflection polarizing plate 21.

The liquid crystal element 10 used in the first embodiment is equipped with the color filters 15R, 15G and 15B corresponding to a plurality of pixel regions. However, it is not absolutely necessary for the liquid crystal element 10 to be equipped with the color filters. Also, the liquid crystal element 10 is not limited to an active matrix type. It is also possible for the liquid crystal element 10 to be of a simple matrix type or of a segment type.

Second Embodiment

Figure 14:
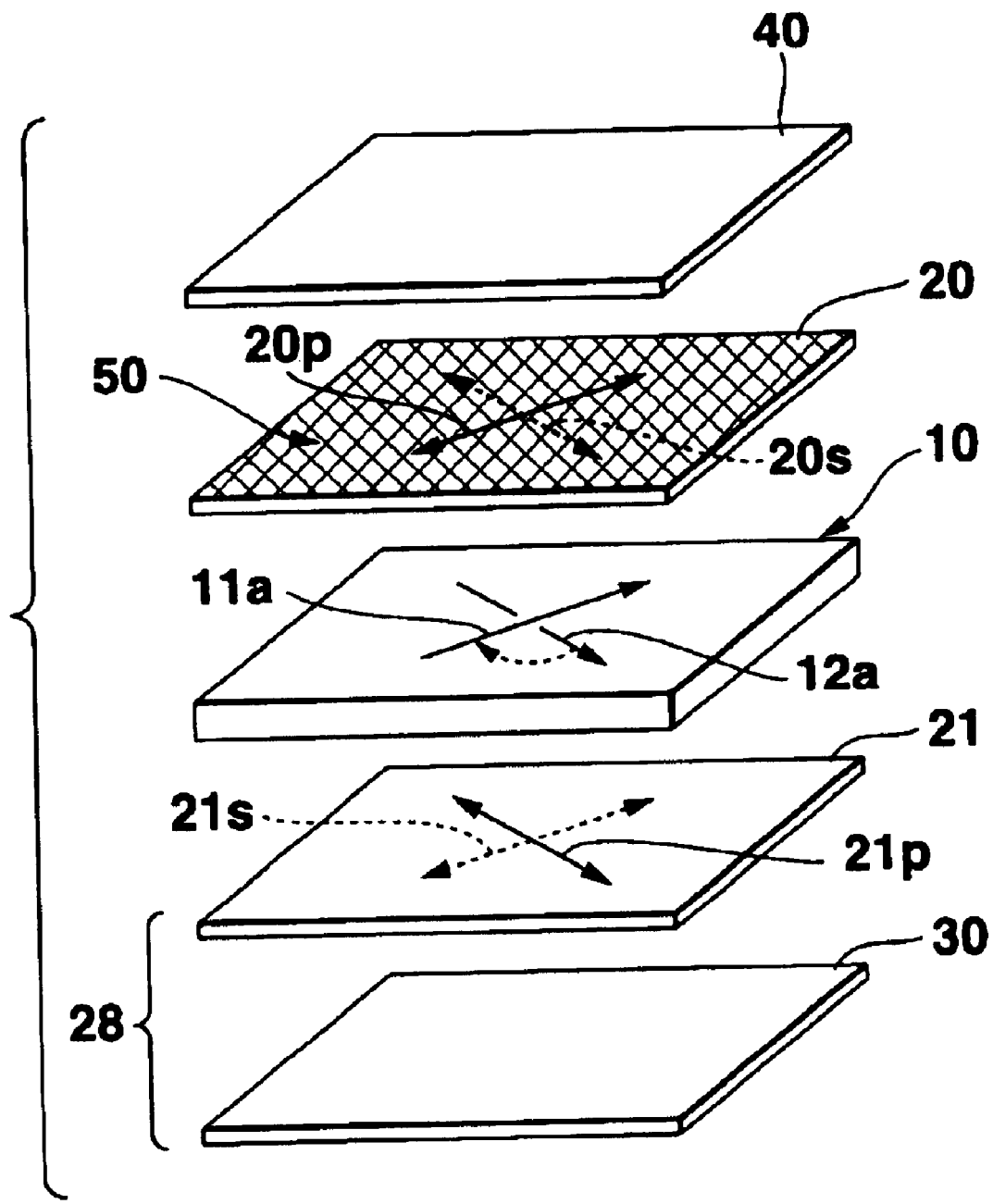
FIG. 14 is an oblique view showing in a dismantled fashion a liquid crystal display apparatus according to a second embodiment of the present invention.

FIG. 14 is an oblique view showing in a dismantled fashion the construction of a liquid crystal display apparatus according to a second embodiment of the present invention.

The liquid crystal display apparatus according to the second embodiment of the present invention comprises the liquid crystal element 10, the reflection polarizing plate 20 arranged on the front side of the liquid crystal element 10, and the rear member 28 arranged on the rear side of the liquid crystal element 10. Further, a transparent film element 40 is arranged on the front side of the reflection polarizing plate 20. The liquid crystal display apparatus according to the second embodiment of the present invention is equal to the display apparatus according to the first embodiment of the present invention in the construction of each of the liquid crystal element 10, the reflection polarizing plate 20 and the rear member 28, except that, in the second embodiment, the transparent film element 40 is arranged on the front side of the reflection polarizing plate 20. Therefore, the same constituents of the display apparatus are denoted by the same reference numerals so as to avoid an overlapping description.

The transparent film element 40 is made of, for example, an acrylic resin. The light incident on the front side is transmitted through the transparent film element 40 so as to be incident on the reflection polarizing plate 20. Also, the light reflected from the reflection polarizing plate 20 is internally reflected by the transparent film element 40 to permit the reflected light to be incident again on the reflection polarizing plate 20. Incidentally, it is possible for the transparent film element 40 to be formed of either an optically isotropic film or an optically anisotropic film.

In the second embodiment of the present invention, the rear member 28 constructed by the rear reflection polarizing plate 21 and the light absorbing layer 30 absorbing the light transmitted through the rear reflection polarizing plate 21 is arranged on the rear side of the liquid crystal element 10. The light absorbing layer 30, which is formed by a black film, is arranged to face the rear surface of the rear reflection polarizing plate 21 or is coated on the entire rear surface of the rear reflection polarizing plate 21.

The liquid crystal display apparatus according to the second embodiment of the present invention is a TN type liquid crystal display apparatus of the normally black mode. The liquid crystal layer 19 of the liquid crystal element 10 consists of nematic liquid crystal molecules having a chiral agent added thereto and having a positive dielectric anisotropy. The liquid crystal molecules are twist-aligned with a twisting angle of about 90° C. between the pair of substrates 11 and 12. Also, the front reflection polarizing plate 20 and the rear reflection polarizing plate 21 are arranged such that the reflection axes 20s and 21s are substantially perpendicular to the transmission axes 20p and 21p, respectively. To be more specific, arrows 11a and 12a shown in FIG. 14 denote the aligning directions of the liquid crystal molecules in the vicinity of the front substrate 11 and the rear substrate 12 of the liquid crystal element 10. The liquid crystal molecules 19a in the liquid crystal layer 19 of the liquid crystal element 10 are aligned in the vicinity of the front substrate 11 and in the vicinity of the rear substrate 12 in directions deviant from each other by about 90° and, thus, are twist-aligned with a twisting angle of about 90°, as denoted by a broken line in the drawing.

As shown in FIG. 14, the front reflection polarizing plate 20 is arranged such that the transmission axis 20p is substantially parallel or substantially perpendicular to the aligning direction 11a of the liquid crystal molecules in the vicinity of the front substrate 11 of the liquid crystal element 10. Also, the rear reflection polarizing plate 21 is arranged such that the reflection axis 21s is substantially perpendicular to the reflection axis 20s of the front reflection polarizing plate 20 and the transmission axis 21p is substantially perpendicular to the transmission axis 20p of the front reflection polarizing plate 20. On the other hand, an optical means 50 is arranged on the front surface of the front reflection polarizing plate 20. The optical means 50 serves to permit the light reflected from the front reflection polarizing plate 20 to be incident on the transparent film means 40 arranged in front of the reflection polarizing plate 20 at an angle of incidence determined by the inner surface reflection of the transparent film means 40. The optical means 50 has a very fine irregular surface formed by applying a surface treatment to the front surface of the front reflection polarizing plate 20.

Figure 15A:
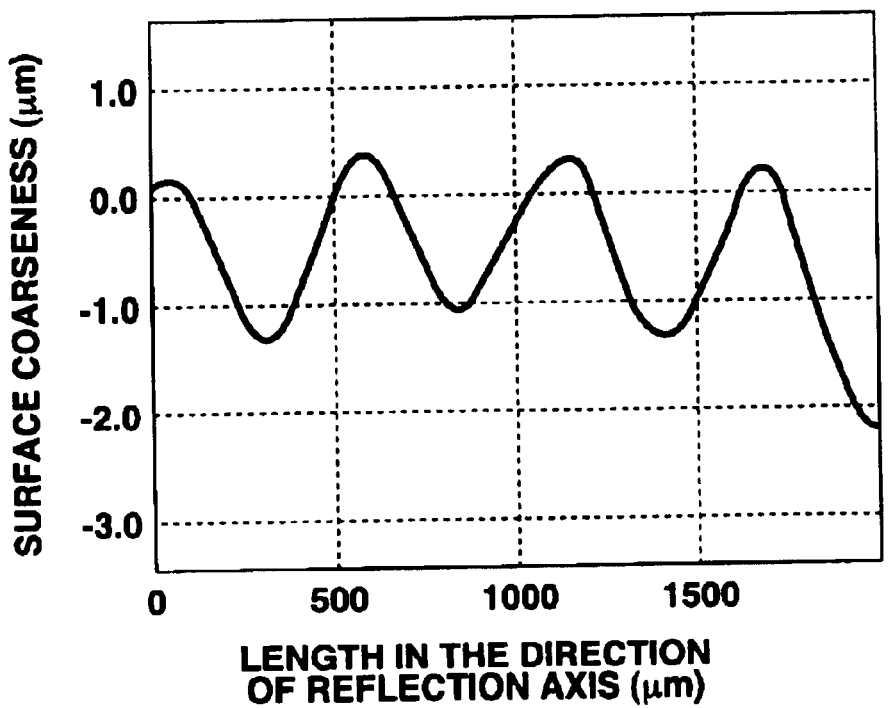
FIGS. 15A and 15B are charts each showing the surface or coarseness roughness in directions perpendicular to each other of a reflection polarizing plate having a surface of a large roughness.
Figure 15B:
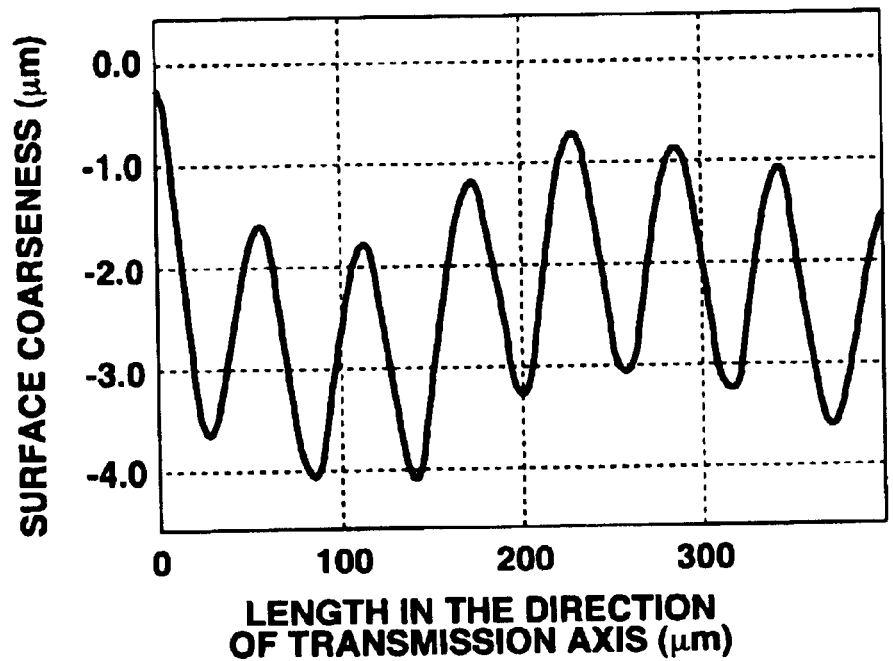
Figure 16A:
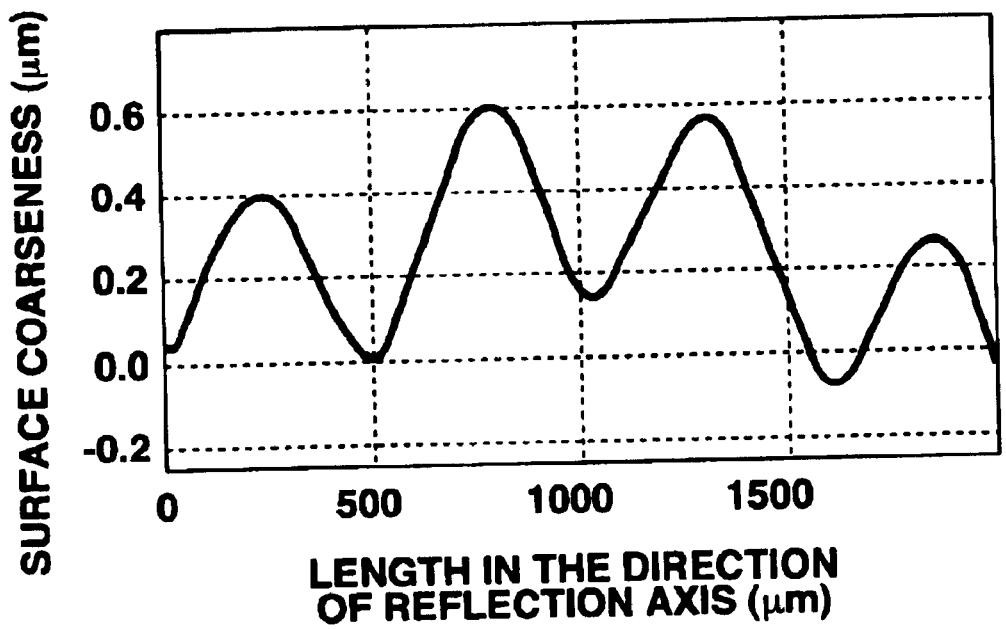
FIGS. 16A and 16B are charts each showing the surface roughness in directions perpendicular to each other of a reflection polarizing plate having a surface of a small roughness.
Figure 16B:
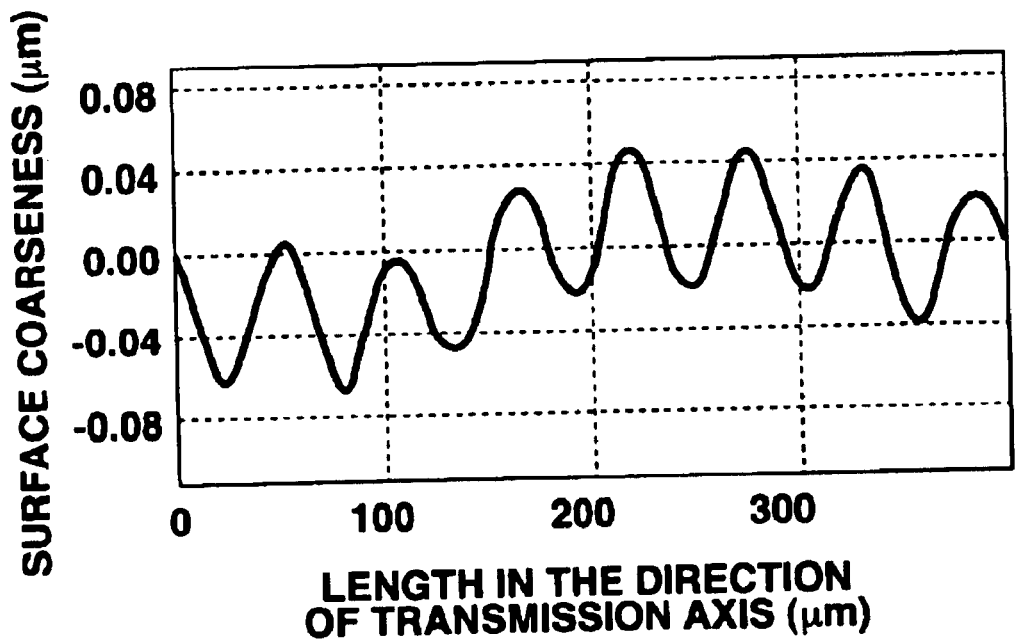
Figure 17A:
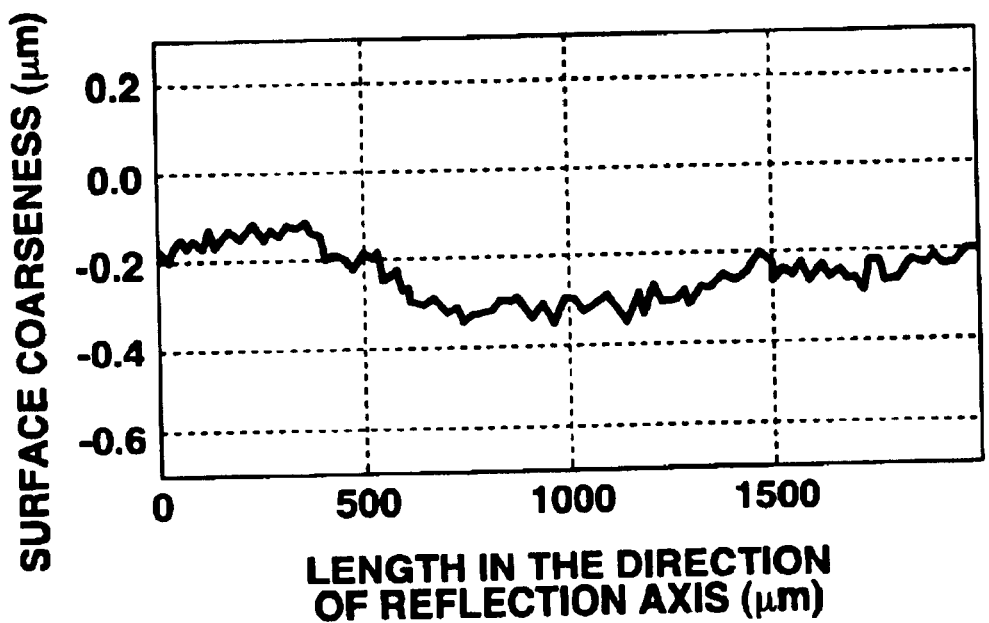
FIGS. 17A and 17B are charts each showing the surface roughness in directions perpendicular to each other of a reflection polarizing plate having a surface to which a surface treatment is not applied.
Figure 17B:
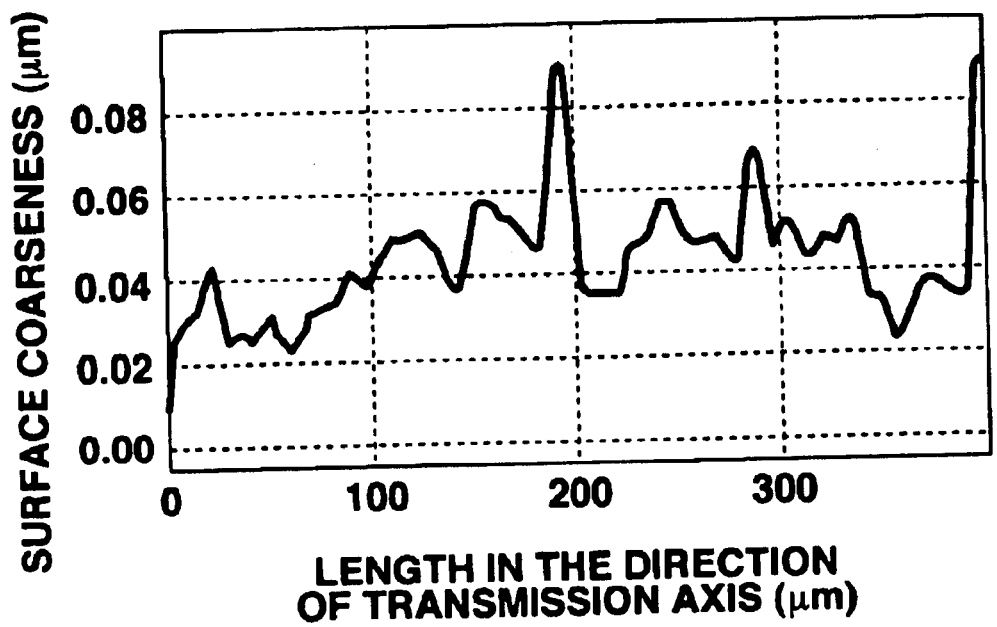

FIGS. 15A to 16B are graphs each showing the surface coarseness (roughness) of the front reflection polarizing plate 20 having a surface treatment applied thereto. On the other hand, FIGS. 17A and 17B are graphs each showing the surface coarseness of the rear reflection polarizing plate 21 having a surface treatment not applied thereto. Each of FIGS. 15A, 16A and 17A is directed to the surface coarseness of the cross section along the reflection axis. On the other hand, each of FIGS. 15B, 16B and 17B is directed to the surface coarseness of the cross section along the transmission axis.

In preparing the graph of each of FIGS. 15A to 17B, an optional region on the front surface of the reflection polarizing plate was scanned by a probing needle at a speed of 1 second/$\mu$m in the direction of each of the reflection axis and the transmission axis so as to measure the displacement of the probing needle in the vertical direction during the scanning. In each of these graphs, the positive value of the surface coarseness plotted on the ordinate of the graph represents the upward displacement relative to the initial height of the probing needle. On the other hand, the negative value represents the downward displacement relative to the initial height of the probing needle.

As shown in FIGS. 15A to 16B, fine irregularities are continuously repeated in the reflection axis and in the transmission axis on the front surface of the front reflection polarizing plate 20. In addition, the period of the irregularities along the reflection axis is much longer than the period of the irregularities along the transmission axis. In other words, grooves extending along the transmission axis 20p are periodically formed in the direction of the reflection axis 20s on the front surface of the front reflection polarizing plate 20. Also, muscle-like grooves extending along the reflection axis 20s are periodically formed on the projecting portions between the grooves extending along the transmission axis 20p. These muscle-like grooves are periodically formed on the surface of the front reflection polarizing plate 20 in the direction of the transmission axis 20p (in the longitudinal direction of the projections noted above) at a pitch much smaller than the pitch of the grooves extending along the transmission axis 20p. In FIG. 14, the irregular surface of the front reflection polarizing plate 20 is denoted by mesh-like lines for the sake of simplicity.

FIGS. 15A and 15B represent the surface coarseness of the front reflection polarized plate 20 having a surface treatment applied thereto to impart large irregularities having a large difference in height between the bottom and the top of the irregularities to the front surface. On the other hand, FIGS. 16A and 16B represent the surface coarseness of the front reflection polarized plate 20 having a surface treatment applied thereto to impart small irregularities having a small difference in height between the bottom and the top of the irregularities to the front surface. In the front reflection polarizing plate 20 having any type of the surface treatment applied thereto, the optical means 50 having the coarse front surface permits the light of one polarized component along the reflection axis 20s to be incident on the transparent film 40 at an angle of incidence at which the incident light is subjected to the total reflection on the front surface of the transparent film 40.

Figure 18A:
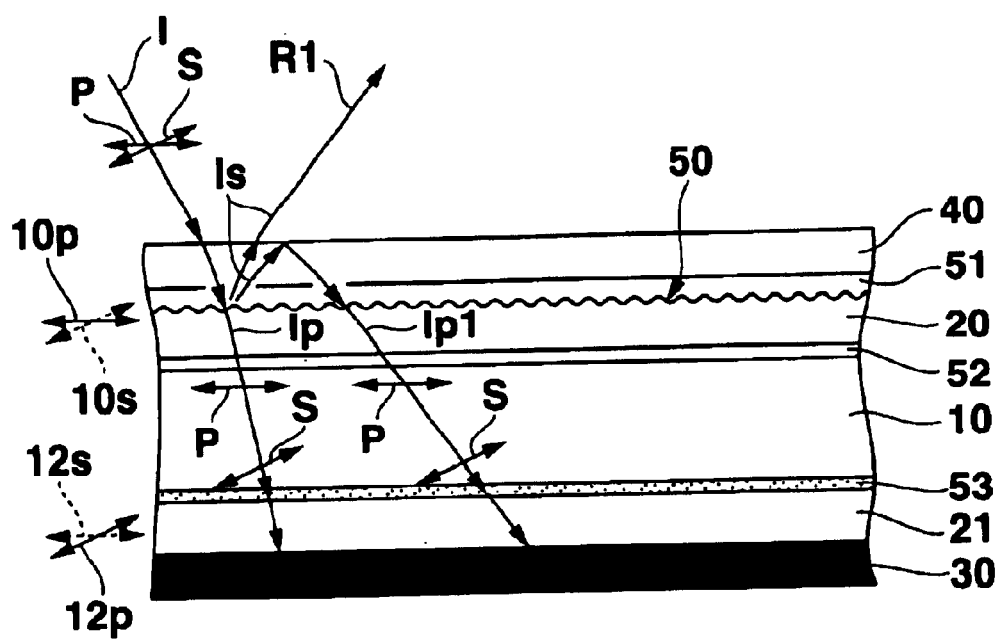
FIGS. 18A and 18B are cross sectional views each showing the cross sectional structure of a liquid crystal display apparatus according to the second embodiment of the present invention as well as the optical function of the liquid crystal display apparatus.

As shown in FIG. 18A, the front reflection polarizing plate 20 is bonded to the front surface (outer surface of the substrate 11) of the liquid crystal element 10 with a transparent adhesive layer 52. Also, the transparent film 40 is bonded to the front surface of the front reflection polarizing plate 20 with a transparent adhesive layer 51. It is desirable for the adhesive layer 51 to be formed of an optical adhesive similar in refractive index to the adhesive layer 52 serving to bond the reflection polarizing plate 20 to the liquid crystal element 10.

The rear reflection polarizing plate 21 includes a reflection polarizing plate to which the surface treatment described above is not applied. As shown in FIGS. 17A and 17B, the surface irregularity of the rear reflection polarizing plate 21 is very small such that the entire surface is substantially flat. As shown in FIG. 18A, the rear reflection polarizing plate 21 is bonded to the rear surface (outer surface of the rear substrate 12) of the liquid crystal element 10 via an adhesive layer 53 made of an adhesive having optical diffusion particles mixed therein.

The liquid crystal display apparatus according to the second embodiment of the present invention is for performing a reflection display utilizing the external light. In this liquid crystal display apparatus, the external light incident on the display apparatus from the observing side of the display is reflected, and the emission of the reflected light is controlled by the electric field applied within the liquid crystal layer of the liquid crystal element 10.

Figure 18B:
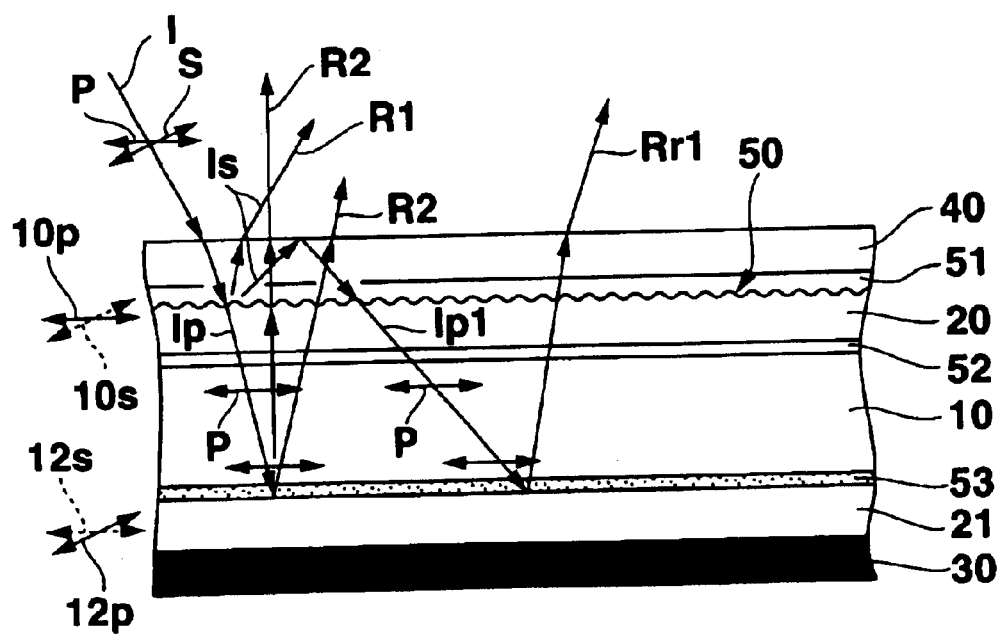

FIGS. 18A and 18B schematically show the transmitting route of the light within the liquid crystal display apparatus.

FIG. 18A covers the case where an electric field is not applied in the liquid crystal layer, with the result that the liquid crystal molecules are in the initial twist-aligned state. On the other hand, FIG. 18B covers the case where an electric field is applied within the liquid crystal layer, with the result that the liquid crystal molecules have risen relative to the substrate surface so as to be aligned.

In the liquid crystal display apparatus according to the second embodiment of the present invention, the external light incident from the front side, i.e., observing side of the display, is transmitted through the transparent film 40 so as to be incident on the front reflection polarizing plate 20, as shown in FIGS. 18A and 18B. Then, among the two polarized components S and P of the incident light I, which are perpendicular to each other, the light $I_s$ of one polarized component S having a vibrating plane along the reflection axis 20s of the front reflection polarizing plate 20 is reflected by the reflection polarizing plate 20, and the light $I_p$ of the other polarized component P having a vibrating plane along the transmission axis 20p of the front reflection polarizing plate 20 is transmitted through the reflection polarizing plate 20 so as to form a linear polarized light that is to be incident on the liquid crystal element 10. It should be noted that the reflection polarizing plate 20, which mainly reflects the light $I_s$ of one polarized component S, also reflects the light $I_p$ of the polarized component P along the transmission axis 20p. It follows that the light reflected from the reflection polarizing plate 20 contains not only the light $I_s$ of one polarized component S along the reflection axis 20s but also the light $I_p$ of the other polarized component P along the transmission axis 20p. The light reflected from the reflection polarizing plate 20 is inner surface reflected by the transparent film 40 as to be incident again on the front reflection polarizing plate 20. Among the light incident on the front reflection polarizing plate 20, the light of one polarized component S along the reflection axis 20s of the front reflection polarizing plate is reflected (not shown), and the light $I_p1$ of the other polarized component along the transmission axis 20p of the front reflection polarizing plate 20 is transmitted through the reflection polarizing plate 20 so as to be incident on the liquid crystal element 10.

The function described above is further repeated. Specifically, the light reflected from the front reflection polarizing plate 20 is subjected to an inner surface reflection of the transparent film 40 so as to be incident again on the front reflection polarizing plate 20. Among the light incident on the front reflection polarizing plate 20, the light of the polarized component P along the transmission axis 20p is transmitted through the front reflection polarizing plate 20 so as to be incident on the liquid crystal element 10. In other words, the liquid crystal display apparatus according to the second embodiment of the present invention is constructed such that, among the two polarized components S and P, which are perpendicular to each other, of the light transmitted through the transparent film 40 so as to be incident from the front side, the light $I_s$ of one polarized component is reflected by the front reflection polarizing plate 20, and the light $I_p$ of the other polarized component is transmitted through the reflection polarizing plate 20 so as to be incident on the liquid crystal element 10. Also, the light reflected from the reflection polarizing plate 20 is subjected to an inner surface reflection of the transparent film 40 so as to be incident again on the reflection polarizing plate 20, with the result that, among the reflected light, the light $I_p1$ of the other polarized component is transmitted through the reflection polarizing plate 20 so as to be incident on the liquid crystal element 10. It follows that it is possible to allow the external light incident from the front side to be incident on the liquid crystal element 10 in a large amount as a linear polarized light of the other polarized component.

Incidentally, the inner surface reflection of the light reflected from the front reflection polarizing plate 20, which is performed by the transparent film 40, is the total reflection at the interface between the front surface of the transparent film 40 and the air layer, which is the outer atmosphere. To be more specific, among the light incident on the transparent film 40 from the front side at various angles of incidence and transmitted through the transparent film 40 so as to be reflected by the reflection polarizing plate 20, the light incident on the interface noted above at the total reflection angle is subjected to the inner surface reflection so as to be incident again on the front reflection polarizing plate 20.

The total reflection critical angle (angle relative to a line normal to the transparent film 40) at the interface between the front surface of the transparent film 40 and the air layer, which is the outer atmosphere, can be obtained by the formula, sin i=1/n, where i represent the total reflection critical angle, n represents the refractive index of the transparent film 40, the refractive index of the air layer is 1. For example, where the transparent film 40 made of an acrylic resin film having a refractive index of 1.6, the total reflection critical angle at the interface is: i=38.7°.

On the other hand, suppose the external light is incident from the front side on the liquid crystal display apparatus at an angle of incidence in which the external has the highest intensity. If the angle of incidence (angle relative to a line normal to the transparent film 40) is supposed to be about 30°, and the transparent film 40 has a refractive index of 1.6, the external light incident at an angle of incidence of 30° is refracted at the interface in the direction in which the angle with the line normal to the transparent film 40 is diminished so as to be incident on the transparent film 40 with an angle of 18.2° with the line normal to the transparent film 40.

If the front surface of the front reflection polarizing plate 20 has a mirror surface, among the light transmitted through the transparent film 40 so as to be incident on the front reflection polarizing plate 20, the light reflected from the reflection polarizing plate 20 is incident on the interface at an angle of incidence of 18.2°, which is smaller than the total reflection critical angle i (38.7°), and is transmitted through the interface so as to be emitted to the front side. In the liquid crystal display apparatus according to the second embodiment of the present invention, however, the optical means 40 having the irregular surface formed by applying a surface treatment to the front surface of the front reflection polarizing plate 20 is formed on the front side of the front reflection polarizing plate. What should be noted is that the optical means 40 permits the light reflected from the reflection polarizing plate 20 to be incident in a large amount on the transparent film 40 at an angle of incidence at which the reflected light is subjected to the inner surface reflection by the transparent film 40, i.e., the angle of incidence larger than the total reflection critical angle at the interface between the front surface of the transparent film 40 and the air layer. As a result, a large amount of the light reflected from the reflection polarizing plate 20 is subjected to the inner surface reflection at the interface between the transparent film 40 and the air layer so as to be incident again on the front reflection polarizing plate 20 and, among the light incident again on the reflection polarizing plate 20, the light $I_p1$ of the polarized component P along the transmission axis 20p of the front reflection polarizing plate 20 is allowed to be incident as a linear polarized light on the liquid crystal element 10.

The external light incident from the front side on the liquid crystal display apparatus is incident at various angles of incidence, and the optical means 40 having an irregular surface permits the light reflected from the front reflection polarizing plate 20 to be diffused in various directions. Therefore, some light is incident on the interface between the front surface of the transparent film 40 and the air layer, which is the outer atmosphere, at an angle of incidence smaller than the total reflection critical angle. The particular light is transmitted through the interface so as to be emitted to the front side and, thus, to constitute a leaking light. However, the amount of the leaking light is small, and almost all the leaking light is emitted in a direction greatly inclined from the line normal to the transparent film 40, failing to fall within the field of view of the observer of the display.

In the second embodiment of the present invention, the optical means 41 that permits the light $I_s$ of one polarized component along the reflection axis 20s of the front reflection polarizing plate 20 to be diffused and also permits the light $I_p$ of the other polarized component along the transmission axis 20p to be transmitted without being diffused is formed by applying a surface treatment to the front surface of the front reflection polarizing plate 20 so as to form a coarsened surface as shown in FIGS. 15A to 16B. Because of the presence of the optical means 41, the light reflected from the front reflection polarizing plate 20 is diffused, and a large amount of the reflected light is allowed to be incident on the transparent film 40 at an angle of incidence at which the light is subjected to the inner reflection. It follows that it is possible to further increase the light subjected to the inner surface reflection by the transparent film 40 so as to permit the light to be incident again on the front reflection polarizing plate 20. Further, among the light allowed to be incident again on the front reflection polarizing plate 20, the light $I_p1$ of the polarized component P along the transmission axis 20p of the front reflection polarizing plate 20 is transmitted through the front reflection polarizing plate 20 so as to be incident on the liquid crystal element 10.

In addition, in the second embodiment of the present invention, the light $I_s$ of the polarized component S along the reflection axis 20s of the front reflection polarizing plate 20, which is reflected by the front reflection polarizing plate 20, is diffused by the optical means 50 so as to increase the polarized component P along the transmission axis 20p of the front reflection polarizing plate 20. As a result, the light subjected to the inner surface reflection by the transparent film 40 so as to be incident again on the front reflection polarizing plate 20 is the light having a large amount of the polarized component along the transmission axis 20p of the front reflection polarizing plate 20. It follows that it is possible to further increase the linear polarized light that is transmitted through the front reflection polarizing plate 20 so as to be incident on the liquid crystal element 10.

It should also be noted that the light incident on the liquid crystal element 10 is emitted to the rear side of the liquid crystal element 10, with the polarized state controlled by the liquid crystal layer 19, and, then, is transmitted through the diffusion layer 53 arranged between the liquid crystal element 10 and the rear reflection polarizing plate 21 so as to be incident on the rear reflection polarizing plate 21. Further, the light reflected from the rear reflection polarizing plate 21 is incident again from the rear side on the liquid crystal element 10 and is transmitted through the liquid crystal element 10, the front reflection polarizing plate 20 and the transparent film 40 so as to be emitted to the front side.

The liquid crystal display apparatus according to the second embodiment of the present invention is operated in a normally black mode. To be more specific, when an electric field is not applied between the electrodes of the liquid crystal element 10, the display in that region is a dark display. When an electric field is applied between the electrodes of the liquid crystal element 10, the light incident from the front side is reflected by the rear reflection polarizing plate 21 so as to be emitted to the front side, with the result that the particular region performs a bright display.

When an electric field is applied between the electrodes of the liquid crystal element 10, the aligned state of the liquid crystal molecules of the liquid crystal element 10 is in the initial twist-aligned state. In this case, the light $I_p$ transmitted through the front reflection polarizing plate 20 so as to be incident on the liquid crystal element 10, i.e., the linear polarized light of the polarized component along the transmission axis 20p of the front reflection polarizing plate 20, is optically rotated by substantially 90° C. by the birefringence function of the liquid crystal layer 19 in which the liquid crystal molecules are twist-aligned so as to form the light of the polarized component substantially perpendicular to the polarized component of the light $I_p$ transmitted through the front reflection polarizing plate 20 so as to be incident on the liquid crystal element 10, i.e., the linear polarized light of the polarized component along the transmission axis 20p of the rear reflection polarizing plate 21, as shown in FIG. 18A. Therefore, when an electric field is not applied between the electrodes of the liquid crystal element 10, the light emitted to the rear side of the liquid crystal element 10 so as to be incident on the rear reflection polarizing plate 21 is transmitted through the rear reflection polarizing plate 21 so as to be absorbed by the absorbing layer 30 arranged behind the rear reflection polarizing plate 21, with the result that the display in that region is a dark display.

As described above, the light incident from the front side on the liquid crystal display apparatus and reflected by the front reflection polarizing plate 20 so as to be incident from the rear side on the transparent film 40 contains the light emitted to the front side of the transparent film 40 so as to form a leaking right R1. However, since the amount of the leaking light is small, the darkness of the dark display is sufficient when an electric field is applied between the electrodes of the liquid crystal element 10.

It should also be noted that the emitting direction of almost all the leaking right R1 is much inclined relative to a line normal to the transparent film 40. On the other hand, the display of the liquid crystal display apparatus is observed in general in the front direction, i.e., along the line substantially normal to the screen. It follows that the leaking right R1 is not emitted to fall within the field of view and, thus, the screen of the liquid crystal display apparatus is not glittered.

On the other hand, when an electric field is applied between the electrodes of the liquid crystal element 10, the liquid crystal molecules 19a of the liquid crystal element 10 are caused to rise relative to the surfaces of the substrates 11 and 12 so as to be aligned in accordance with the electric field formed in the liquid crystal layer 19. As a result, the liquid crystal layer 19 substantially ceases to exhibit the birefringence performance and, thus, the light $I_p$ transmitted through the front reflection polarizing plate 20 so as to be incident on the liquid crystal element 10, i.e., the linear polarized light of the polarized component P along the transmission axis 20p of the front reflection polarizing plate 20, is scarcely subjected to the birefringence function so as to be transmitted through the light crystal layer 19. It follows that the light emitted to the rear side of the front reflection polarizing plate 20 when an electric field is not applied within the liquid crystal layer 19 is the linear polarized light of the polarized component along the reflection axis 21s of the rear reflection polarizing plate 21. Therefore, the light emitted to the rear side of the liquid crystal element 10 when an electric field is applied within the liquid crystal layer 19 is reflected by the rear reflection polarizing plate 21. The reflected light is incident again on the liquid crystal element 10 and is transmitted through the liquid crystal element 10, the front reflection polarizing plate 20 and the transparent film 40 so as to be emitted to the front side. It follows that the display in that region is a bright display.

As described above, in the liquid crystal display apparatus according to the second embodiment of the present invention, among the two polarized components S and P, which are perpendicular to each other, of the external light I incident from the front side, the light $I_p$ of the polarized component P, which is transmitted through the front reflection polarizing plate 20, is incident on the liquid crystal element 10. Also, among the light reflected from the front reflection polarizing plate 20 and subjected to the inner surface reflection by the transparent film 40 so as to be incident again on the front reflection polarizing plate 20, the light $I_p1$ of the polarized component P that is transmitted through the front reflection polarizing plate 20 is transmitted through the front reflection polarizing plate 20 so as to be incident on the liquid crystal element 10. Further, the incident light is transmitted through the liquid crystal element 10 and is reflected by the rear reflection polarizing plate 21 so as to be emitted to the front side. It follows that the bright display is performed with a sufficient brightness. In other words, among the lights $I_p$ and $I_p1$ incident on the liquid crystal element 10, the light $I_p$, i.e., a direct incident light, transmitted through the front reflection polarizing plate 20 without being reflected by the front reflection polarizing plate 20 is incident on the liquid crystal element 10 with a relatively small angle of incidence relative to a line normal to the liquid crystal element 10. Also, the direct incident light $I_p$ transmitted through the liquid crystal element 10 is diffused by the diffusion layer 53 arranged between the liquid crystal element 10 and the rear reflection polarizing plate 21 so as to be incident on the rear reflection polarizing plate 21. Further, the light reflected from the rear reflection polarizing plate 21 is diffused again by the diffusion layer 44 and is transmitted through the liquid crystal element 10, the front reflection polarizing plate 20 and the transparent film 40 so as to be emitted to the front side in the form of light R2 having an intensity distribution such that the light emitted in the front direction, i.e., along the line normal to the screen of the liquid crystal display apparatus, has a high intensity.

On the other hand, the light $I_p1$, i.e., indirect incident light, reflected from the front reflection polarizing plate 20 and subjected to the inner surface reflection by the transparent film 40 so as to be incident again on the front reflection polarizing plate 20 is incident on the liquid crystal element 10 with a small angle of incidence relative to the line normal to the screen of the liquid crystal display apparatus.

The indirect incident light $I_p1$ transmitted through the liquid crystal element 10 is diffused by the diffusion layer 53 so as to be incident on the rear reflection polarizing plate 21. The light reflected from the rear reflection polarizing plate 21 is diffused again by the diffusion layer 53 and is transmitted through the liquid crystal element 10, the front reflection polarizing plate 20 and the transparent film 40 so as to be emitted to the front side in the form of the light Rr1 having an intensity distribution such that the light emitted in the front direction, i.e., substantially along the line normal to the screen, has a high intensity.

It follows that, in the bright display displayed by the reflected light R2 of the direct incident light $I_p$ and the reflected light Rr1 of the indirect incident light $I_p1$, these reflected lights R2 and Rr1 are superposed one upon the other so as to achieve a sufficiently bright display having a high front brightness.

Since the brightness of the bright display is changed in accordance with the change in the birefringence properties of the liquid crystal layer 19 conforming with the rising aligned state of the liquid crystal molecules of the liquid crystal element 10, it is possible to obtain a bright display having a plurality of gradations by controlling step-wise the electric field formed within the liquid crystal layer 19.

As described above, in the liquid crystal display apparatus according to the second embodiment of the present invention, the front reflection polarizing plate 20 serving to reflect one of the two polarized components perpendicular to each other of the incident light and to transmit the light of the other polarized component is arranged on the front side of the liquid crystal element 10. Also, the transparent film 40 transmitting the incident light from the front side so as to permit the incident light to be incident on the front reflection polarizing plate and subjecting the light reflected from the front reflection polarizing plate 20 to the inner surface reflection so as to permit the reflected light to be incident again on the front reflection polarizing plate 20 is arranged on the front side of the front reflection polarizing plate 20. It follows that, among the two polarized components perpendicular to each other of the external light incident from the front side, the light of the other polarized component transmitted through the front reflection polarizing plate 20 and, among the light reflected from the front reflection polarizing plate 20 and, then, subjected to the inner surface reflection by the transparent film 40 so as to be incident again on the front reflection polarizing plate 20, the light of the other polarized component are allowed to be incident on the light crystal element 10. It follows that, in the liquid crystal display apparatus according to the second embodiment of the present invention, it is possible to permit the external light incident from the front side to be incident in a large amount on the liquid crystal element 10 as a linear polarized light of the other polarized component. As a result, the external light incident from the front side can be utilized with a high efficiency so as to obtain a bright display having a sufficiently high brightness.

It should also be noted that, in the liquid crystal display apparatus according to the second embodiment of the present invention, the front reflection polarizing plate 20 reflects to some extent the light of the other polarized component that is transmitted through the reflection polarizing plate 20. The reflected light is subjected to the inner surface reflection by the transparent film 40 so as to be incident again on the front reflection polarizing plate 20. Since, among the light that is incident again on the front reflection polarizing plate 20, the light of the other polarized component is transmitted through the front reflection polarizing plate 20 so as to be incident on the liquid crystal element 10, it is possible to suppress the light leakage that the light reflected from the front reflection polarizing plate 20 is transmitted through the transparent film 40 so as to be emitted to the front side. It follows that it is possible to suppress the floating of the darkness caused by the leaking light during the dark display so as to obtain a good contrast.

In the second embodiment described above, the optical means 50 for allowing the light reflected from the front reflection polarizing plate 20 to be incident on the transparent film 40 at an angle of incidence at which the incident light is subjected to the inner surface reflection by the transparent film 40 is formed on the front surface of the front reflection polarizing plate 20. As a result, the bright display can be performed with a higher brightness by utilizing the external light incident from the front side with a much further efficiency so as to further suppress the light leakage to the front side and, thus, to obtain a further improved contrast.

Further, in the second embodiment of the present invention, the optical means 50 is enabled to diffuse the light of one polarized component and to transmit the light of the other polarized component without diffusing the light. As a result, among the light reflected from the front reflection polarizing plate 20, the light of one polarized component is diffused by the optical means 50 so as to change the state of polarization, and the light of the other polarized component is transmitted through the front reflection polarizing plate 20 so as to be incident on the liquid crystal element 20. It follows that it is possible to further suppress the light leakage to the front side and, thus, to obtain a further improved contrast.

It is desirable for the optical means 50 to be capable of diffusing the light of one polarized component within a predetermined range of the expanding angle. In this case, the light reflected from the front reflection polarizing plate 20 can be diffused and reflected within the predetermined range of the expanding angle so as to permit the light to be incident in a large amount on the transparent film 40 at an angle of incidence at which the light is subjected to the inner surface reflection by the transparent film 40.

Further, it is desirable for the optical means 50 to have a directivity that permits the light to be diffused in a direction inclined from a line normal to the front reflection polarizing plate 20. In this case, the light reflected from the front reflection polarizing plate 20 can be incident in a large amount on the transparent film 40 at an angle of incidence at which the light is subjected to the inner surface reflection by the transparent film 40.

In the liquid crystal display apparatus according to the second embodiment of the present invention, the rear reflection polarizing plate 21 reflecting the light of one polarized component of the two polarized components perpendicular to each other and transmitting the light of the other polarized component is arranged on the rear side of the liquid crystal element 10. As a result, among the light incident on the liquid crystal element 10 from the front side and emitted to the rear side of the liquid crystal element 10 with the polarized state controlled by the liquid crystal layer 19, the light of one polarized component is reflected by the rear reflection polarizing plate 21 so as to obtain a bright display and the light of the other polarized component is transmitted to the rear side of the rear reflection polarizing plate 21 so as to obtain a dark display.

In addition, in the second embodiment of the present invention, the light absorption layer 30 is arranged on the rear side of the rear reflection polarizing plate 21. As a result, the light transmitted through the rear reflection polarizing plate 21 so as to be emitted to the rear side is absorbed by the light absorbing layer 30 so as to obtain a more satisfactory dark display.

What should also be noted is that, in the second embodiment of the present invention, the diffusion layer 53 for diffusing the transmitted light is arranged between the liquid crystal element 10 and the rear reflection polarizing plate 21. As a result, the light reflected from the rear reflection polarizing plate 21 is emitted to the front side as a light having an intensity distribution such that the light emitted in the front direction, i.e., substantially along the line perpendicular to the screen, which is the direction in which the display is observed in general, has a high intensity, making it possible to obtain a display having a high front brightness.

In the second embodiment of the present invention described above, the diffusion means arranged between the liquid crystal element 10 and the rear reflection polarizing plate 21 is formed of the diffusion layer 53 made an adhesive having light diffusing particles mixed therein. It is desirable for the diffusion means to be formed of a diffusion layer having a directivity that the light is diffused in a direction substantially parallel to the line normal to the front reflection polarizing plate 20 arranged on the front side of the liquid crystal element 10 (preferably, to be diffused within an angular range of about 30° about the line normal to the front reflection polarizing plate 20). In this case, it is possible to obtain a display having a higher front brightness.

In the second embodiment of the present invention, a diffusion means is arranged between the liquid crystal element 10 and the rear reflection polarizing plate 21. However, it is also possible to apply a surface treatment to the front surface of the rear reflection polarizing plate 21 like the surface treatment applied to the front surface of the front reflection polarizing plate 20 in place of using the diffusion means noted above. A display having a high front brightness can also be obtained in this case.

Further, in the second embodiment of the present invention, the optical means 50 for permitting the light reflected from the front reflection polarizing plate 20 to be incident on the transparent film 40 at an angle of incidence at which the light is subjected to the inner surface reflection by the transparent film 40 is formed by applying a surface treatment to the front surface of the front reflection polarizing plate 20. However, it is also possible for the optical means to be laminated on the front surface of the front reflection polarizing plate 20. In this case, it is unnecessary to apply a surface treatment to the front reflection polarizing plate 20.

Figure 19:
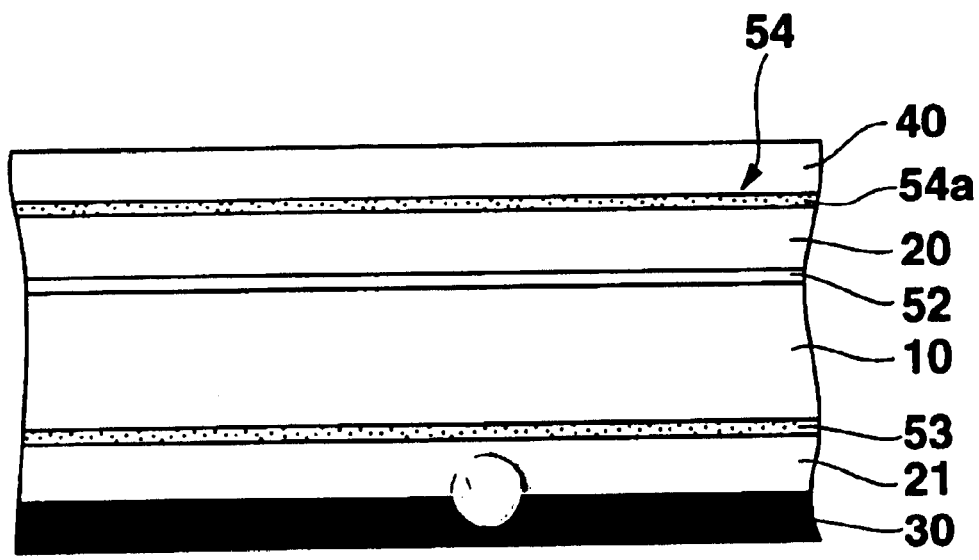
FIG. 19 is a side view showing a part of the liquid crystal display apparatus according to a first modification of the second embodiment of the present invention.

FIG. 19 is a side view showing a part of the liquid crystal display apparatus according to a first modification of the second embodiment of the present invention. In the first modification, an optical means 54 for permitting the light reflected from the front reflection polarizing plate 20 to be incident on the transparent film 40 at an angle of incidence at which the light is subjected to the inner surface reflection by the transparent film 40 is laminated on the front surface of the front reflection polarizing plate 20 in place of applying a surface treatment to the front surface of the front reflection polarizing plate 20.

The liquid crystal display apparatus according to the first modification of the second-embodiment, which is constructed such that the optical member 54 constructed by another member is laminated on the front surface of the front reflection polarizing plate 20 in place of applying a surface treatment to the front surface of the front reflection polarizing plate 20 as described above, is equal in the other construction to the liquid crystal display apparatus according to the second embodiment of the present invention described above. Therefore, the same constituents of the liquid crystal display apparatus are denoted by the same reference numerals so as to avoid an overlapping description.

The optical means 54 is formed of an optical adhesive layer 54a prepared by, for example, adding light diffusion particles to a transparent resin substantially equal in the refractive index to the transparent film. As apparent from the drawing, the front reflection polarizing plate 20 and the transparent film 40 arranged on the front side of the front reflection polarizing plate 20 are bonded to each other by the adhesive layer 54a.

It is desirable for the optical means 54 to be capable of diffusing the light of one polarized component along the reflection axis of the front reflection polarizing plate and transmitting the light of the other polarized component along the transmission axis of the front reflection polarizing plate 20 without diffusing the light noted above. Alternatively, it is desirable for the optical means 54 to be capable of diffusing the transmitted light within a predetermined range of the expanding angle. Where the optical means 54 satisfies the requirements described above, the optical means 54 permits a large amount of the light reflected from the front reflection polarizing plate 20 to be incident on the transparent film 40 at an angle of incidence at which the light is subjected to the inner surface reflection by the transparent film 40.

Where the optical means 54 is enabled to diffuse the transmitted light within a predetermined range of the expanding angle, it is desirable for the optical means 54 to have a directivity that the light is diffused in a direction inclined from a line normal to the front reflection polarizing plate 20. In this case, almost all the light reflected from the front reflection polarizing plate 20 is allowed by the incident on the transparent film 40 at an angle of incidence at which the light is subjected to the total reflection on the front surface of the transparent film 40.

Figure 20:
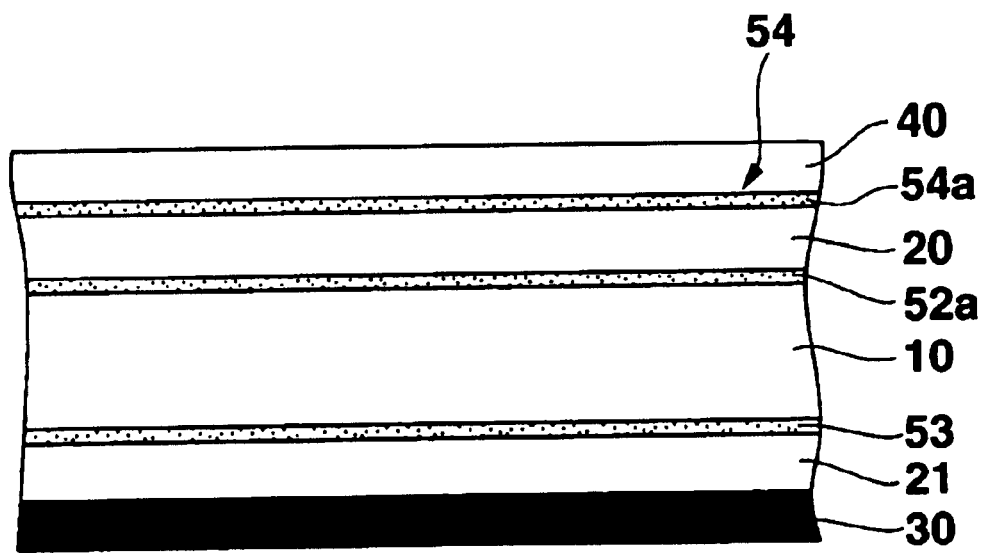
FIG. 20 is a side view showing a part of the liquid crystal display apparatus according to a second modification of the second embodiment of the present invention.

FIG. 20 is a side view showing a part of the liquid crystal display apparatus according to a second modification of the second embodiment of the present invention. The second modification is equal in construction to the first modification, except that, in the second modification, a diffusion means 52a for diffusing the transmitted light and constructed by an adhesive layer having a diffusion capability and prepared by adding light diffusion particles to a transparent adhesive like the adhesive 54a in the first modification is arranged between the liquid crystal element 10 and the front reflection polarizing plate 20 arranged on the front side of the liquid crystal element 10.

In the liquid crystal display apparatus according to the second modification of the second embodiment, the light reflected from the rear reflection polarizing plate 21 is diffused by the diffusion means 52a so as to be emitted to the front side as a light having an intensity distribution that the light emitted in the front direction has a high intensity, making it possible to obtain a display having a high front brightness.

In the second modification of the second embodiment, it is desirable for the diffusion means 52a to be formed of a diffusion layer having a directivity that the light is diffused in the direction substantially parallel to the line normal to the front reflection polarizing plate 20 arranged on the front side of the liquid crystal element 10, preferably in a direction falling within a range of about 30° about the normal line noted above. In this case, it is possible to obtain a display having a high front brightness.

In the second embodiment of the present invention, the optical means 54 for permitting the light reflected from the front reflection polarizing plate 20 to be incident on the transparent film 40 at an angle of incidence at which the light is subjected to the inner surface reflection by the transparent film 40. However, it is possible to permit the light reflected from the front reflection polarizing plate 20 to be incident on the transparent film 40 at an angle of incidence at which the light is subjected to the inner surface reflection by the transparent film 40 even if the optical means 54 is omitted. To be more specific, the surface of an ordinary reflection polarizing plate, unlike the surface of the front reflection polarizing plate 20 to which a surface treatment is applied, has a considerably large irregularity, compared with the wavelength of the light, and, thus, permits the light of one polarized component along the reflection axis to be reflected while diffusing the light to some extent.

Even if the adhesive layer for bonding the front reflection polarizing plate 20 to the transparent film 40 arranged on the front side of the front reflection polarizing plate 20 includes the adhesive layer 54$a$ in which the light diffusion particles are not mixed as in the second embodiment, the refractive index of the adhesive layer 54$a$ differs from the refractive index of each of the front reflection polarizing plate 20 and the transparent film 40 and, thus, optically discontinuous planes are formed at the interfaces on the front and rear surfaces of the adhesive layer 54$a$, with the result that the transmitted light is diffused to some extent at these interfaces. It follows that, even if the optical means 54 is not positively arranged on the front side of the front reflection polarizing plate 20, it is possible to diffuse the light of one polarized component reflected from the front reflection polarizing plate 20 so as to permit the light to be incident on the transparent film 40 at an angle of incidence at which the light is subjected to the total reflection on the front surface of the transparent film 40.

Further, in the second embodiment of the present invention, the reflecting means arranged on the rear side of the liquid crystal element 10 is formed of the reflection polarizing plate 21 that reflects the light of one polarized component of the two polarized components, which are perpendicular to each other, of the incident light and transmits the light of the other polarized component. However, it is possible for the reflecting means to form a reflecting film reflecting all the incident light.

Figure 21:
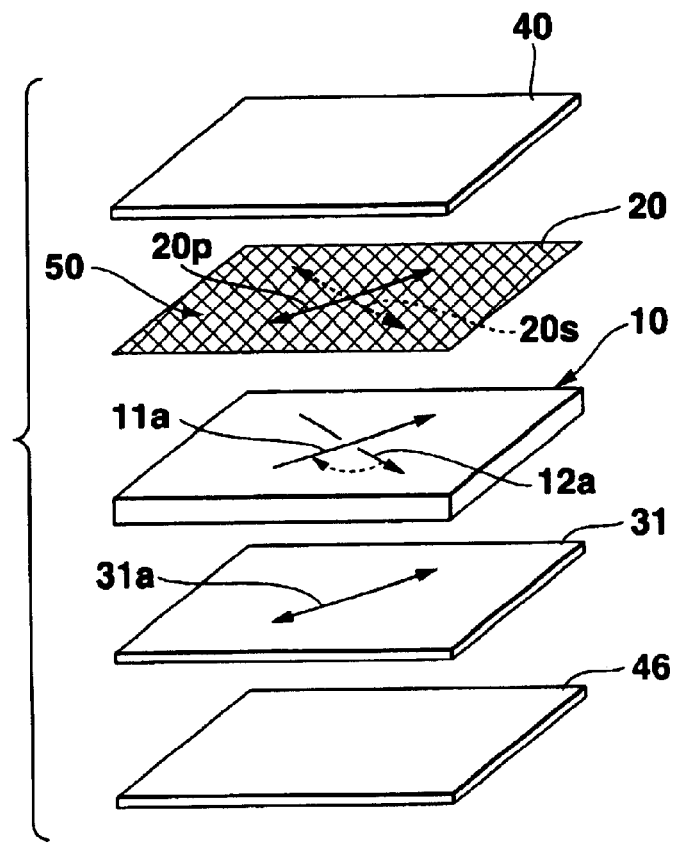
FIG. 21 is an oblique view showing in a dismantled fashion liquid crystal display apparatus according to a third modification of the second embodiment of the present invention.

FIG. 21 is an oblique view showing in a dismantled fashion a liquid crystal display apparatus according to a third modification of the second embodiment of the present invention. In the third modification of the second embodiment, a reflection film 46 reflecting all the incident light is arranged on the rear side of the liquid crystal element 10. Also, an absorption polarizing plate 31 transmitting the light of one polarized component along the transmission axis 31$a$ of the two polarized components, which are perpendicular to each other, of the incident light and absorbing the light of the other polarized component along the absorption axis (not shown) is arranged between the liquid crystal element 10 and the reflection film 46.

The liquid crystal display apparatus according to the third modification of the second embodiment is a TN type liquid crystal display apparatus of a normally black mode. It should be noted that the liquid crystal molecules of the liquid crystal layer 19 in the liquid crystal element 10 are twist-aligned with a twisting angle of substantially 90° between the pair of substrates 11 and 12. Also, the absorption polarizing plate 31 is arranged such that the transmission axis 31$a$ is substantially parallel to the transmission axis 20$p$ of the reflection polarizing plate 20 arranged on the front side of the liquid crystal element 10. The liquid crystal display apparatus according to the third modification of the second embodiment is equal in the other construction to the liquid crystal display apparatus of the first embodiment shown in FIG. 1 and, thus, the same constituents of the display apparatus are denoted by the same reference numerals so as to avoid an overlapping description.

In the liquid crystal display apparatus according to the third modification of the second embodiment, among the light transmitted through the transparent film 40, the front reflection polarizing plate 20 and the liquid crystal element 10 so as to be incident on the absorption polarizing plate 31, the light of one polarized component along the transmission axis 31$a$ of the absorption polarizing plate 31 is transmitted through the absorption polarizing plate 31 and reflected by the reflection plate 46 on the rear side. Also, the light of the other polarized component along the direction perpendicular to the transmission axis 31$a$ of the absorption polarizing plate 31 is absorbed by the absorption polarizing plate 31. It should be noted that, when an electric field is not applied within the liquid crystal layer 19 of the liquid crystal element 10, the display in that region is a dark display. On the other hand, when an electric field is applied within the liquid crystal layer 19, the light incident from the front side is reflected by the reflection film 46 so as to be emitted to the front side. As a result, the display in the particular region is a bright display.

In the liquid crystal display apparatus according to the third modification of the second embodiment, it is possible to arrange the diffusion means used in the second embodiment of the present invention between the liquid crystal element 10 and the reflection means including the reflection film 46 or between the liquid crystal element 10 and the transparent film 40. It is possible for the diffusion means to be formed by using the reflection 46 as a diffusion reflection film or by applying a surface treatment for diffusing the transmitted light to the front surface of the absorption polarizing plate 31.

Figure 22:
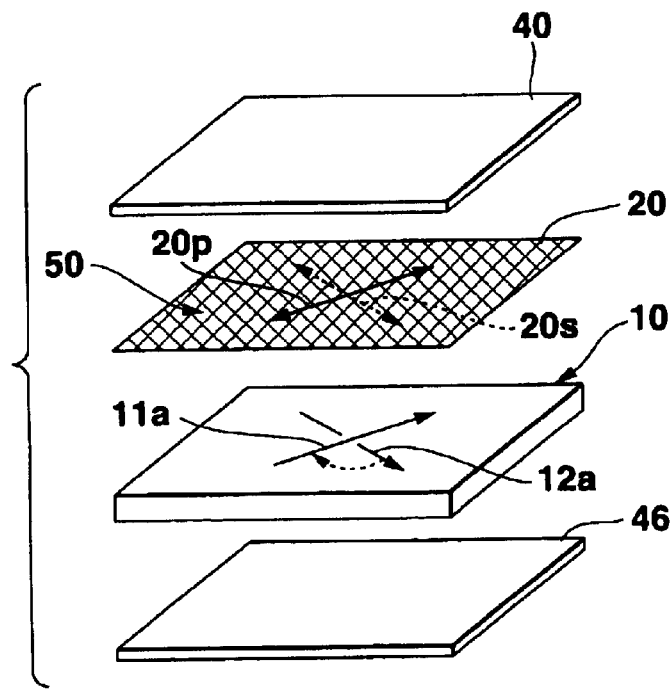
FIG. 22 is an oblique view showing in a dismantled fashion liquid crystal display apparatus according to a fourth modification of the second embodiment of the present invention.

FIG. 22 is an oblique view showing in a dismantled fashion a liquid crystal display apparatus according to a fourth modification of the second embodiment of the present invention. In the fourth modification of the second embodiment, the reflection film 46 is arranged on the rear side of the liquid crystal element 10 so as to perform a single polarizing plate type display, in which the light transmitted through the liquid crystal element 10 is reflected directly by the reflection film 46, and the reflection polarizing plate 20 arranged on the front side of the liquid crystal element 10 is used both as a polarizer and as a light detector.

In the fourth modification of the second embodiment, the reflection film 46 is arranged to face the rear surface of the liquid crystal element 10. However, it is also possible to arrange the reflecting means inside the rear substrate 12 as shown in FIG. 1. In this case, it is desirable for the electrode 14 arranged on the inner surface of the rear substrate 12 to be formed of a metal film having a high reflectivity to permit the electrode 14 to act also as the reflecting means.

Figure 23:
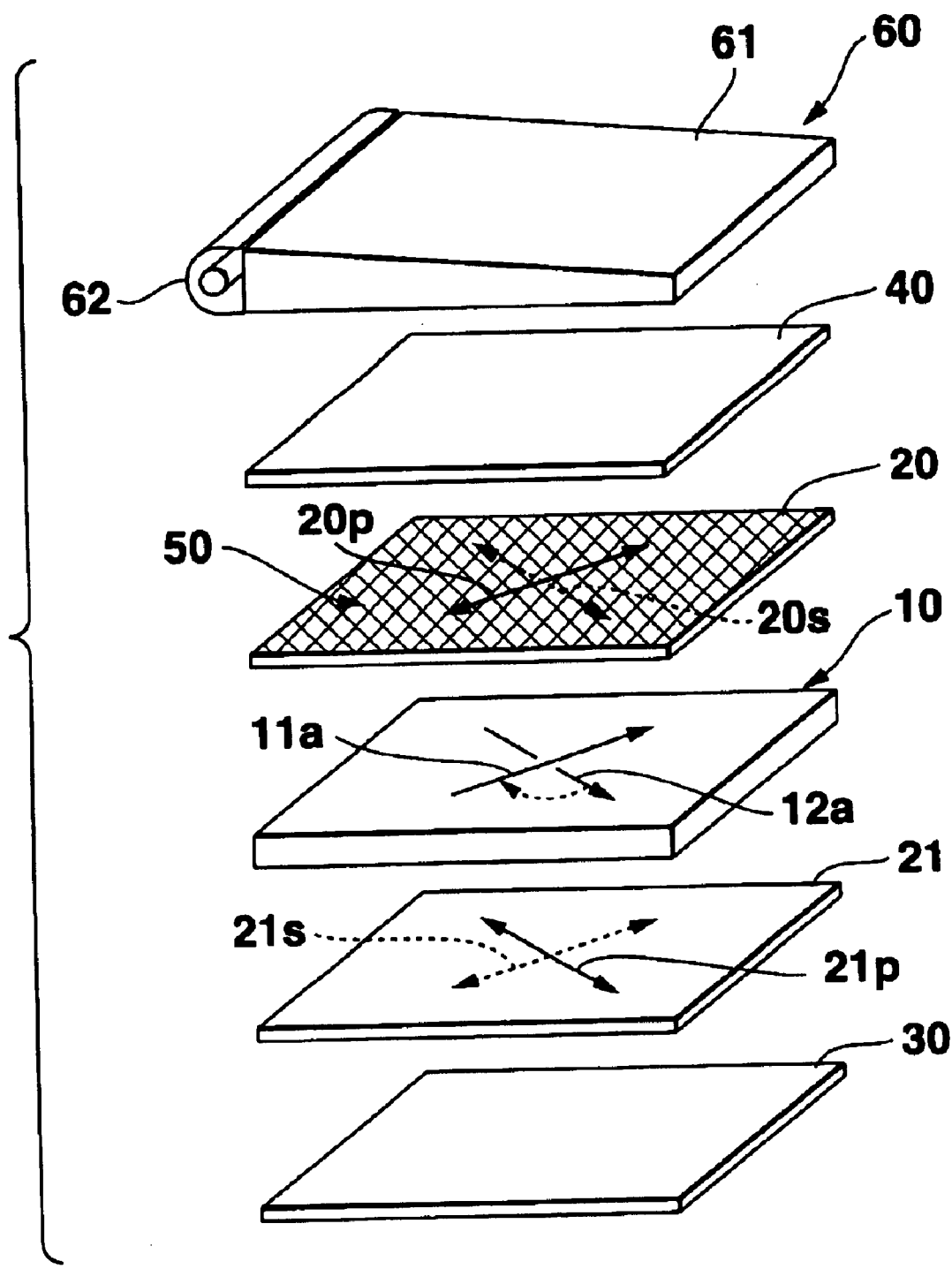
FIG. 23 is an oblique view showing in a dismantled fashion liquid crystal display apparatus according to a fifth modification of the second embodiment of the present invention.

FIG. 23 is an oblique view showing in a dismantled fashion a liquid crystal display apparatus according to a fifth modification of the second embodiment of the present invention. In the fifth modification of the second embodiment, a front light 60, which transmits the incident light from the front side and the rear side and emits the illuminating light toward the rear side, i.e., toward the front surface of the transparent film 40, is arranged on the front side of the liquid crystal display apparatus according to the second embodiment of the present invention shown in FIG. 14.

The front light 60 is constructed by a transparent light guide plate 61 made of, for example, an acrylic resin plate and a light source 62 arranged to face the edge plane of the light guide plate 61. The light emitted from the light source 62 is guided by the light guide plate 61 so as to be emitted from the entire rear surface. The front light 60 is lit when the liquid crystal display apparatus is used under an environment in which it is impossible to obtain an external light having a sufficient brightness.

The liquid crystal display apparatus according to the fifth modification of the second embodiment can be prepared by arranging the front light 60 on the front side of the liquid crystal display apparatus according to the second embodiment of the present invention shown in FIG. 14. Also, the similar effect can be obtained in the case where the front light 60 is arranged on the front side of each of the liquid crystal display apparatus according to the third and fourth modifications of the second embodiment shown in FIGS. 21 and 22, respectively.

Figure 24:
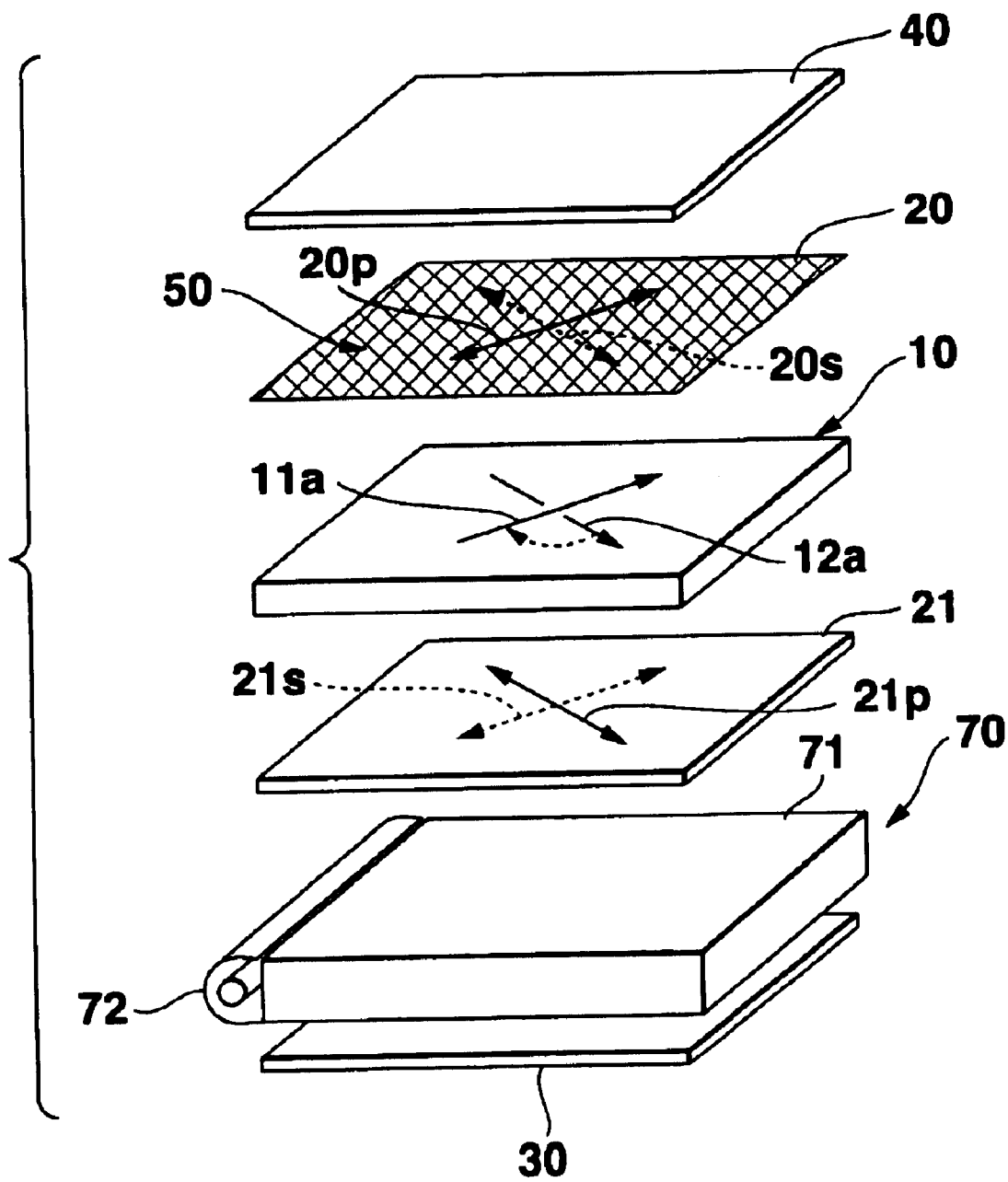
FIG. 24 is an oblique view showing in a dismantled fashion liquid crystal display apparatus according to a sixth modification of the second embodiment of the present invention.

FIG. 24 is an oblique view showing in a dismantled fashion a liquid crystal display apparatus according to a sixth modification of the second embodiment of the present invention. In the sixth modification of the second embodiment, a back light 70 transmitting the incident light from the front side and emitting an illuminating light to the front side, i.e., toward the rear surface of the rear reflection polarizing plate 21, is arranged on the rear side of the rear reflection polarizing plate 21 in place of the rear member 28 of the liquid crystal display apparatus according to the second embodiment shown in FIG. 14. Further, the light absorbing layer 30 is arranged behind the back light 70 in the sixth modification of the second embodiment of the present invention.

The back light 70 is constructed by a transparent light guide plate 71 made of, for example, an acrylic resin plate and a light source 72 arranged to face the edge plane of the light guide plate 71. The light emitted from the light source 72 is guided by the light guide plate 71 so as to be emitted from the entire front surface. The back light 70 is lit when the liquid crystal display apparatus is used under an environment in which it is impossible to obtain an external light having a sufficient brightness.

In the sixth modification of the second embodiment, the light absorption layer 30 is arranged on the rear side of the back light 70. As a result, the light transmitted through the rear reflection polarizing plate 21 and through the back light 70 so as to be emitted to the rear side is absorbed by the light absorption layer 30 so as to make it possible to obtain a dark display of a deeper darkness.

Figure 25:
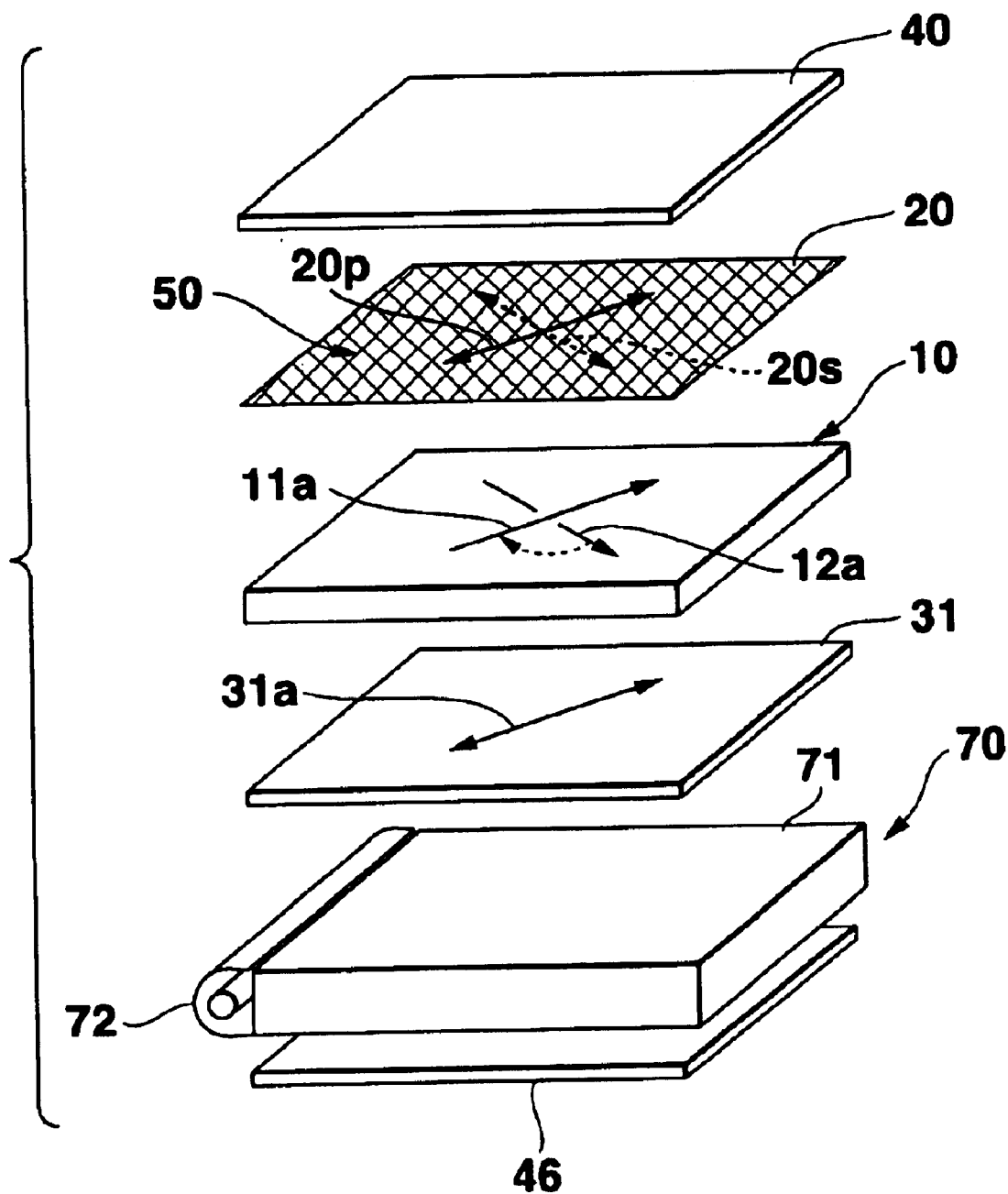
FIG. 25 is an oblique view showing in a dismantled fashion liquid crystal display apparatus according to a seventh modification of the second embodiment of the present invention.

FIG. 25 is an oblique view showing in a dismantled fashion a liquid crystal display apparatus according to a seventh modification of the second embodiment of the present invention. In the seventh modification of the second embodiment, the back light 70 transmitting the incident light from the front side and the light reflected from the reflection film 46 and emitting an illuminating light to the front side, i.e., toward the rear surface of the absorption polarizing plate 31, is arranged between the absorption polarizing plate 31 of the liquid crystal display apparatus according to the third modification of the second embodiment shown in FIG. 21 and the reflection film 46 arranged on the rear side of the absorption polarizing plate 31.

Third Embodiment

Figure 26:
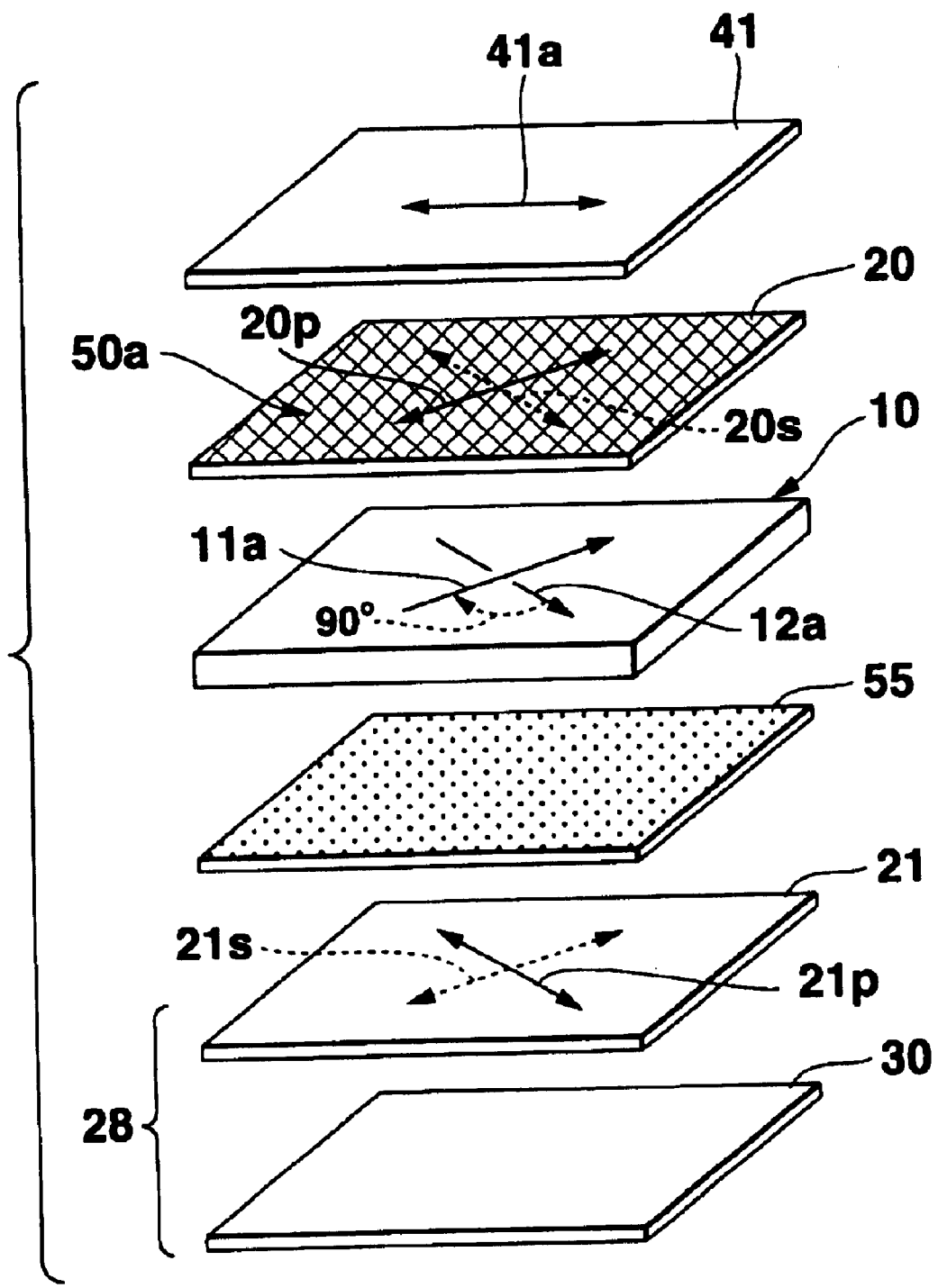
FIG. 26 is an oblique view showing in a dismantled fashion a liquid crystal display apparatus according to a third embodiment of the present invention.

FIG. 26 is an oblique view showing in a dismantled fashion a liquid crystal display apparatus according to a third embodiment of the present invention. The liquid crystal display apparatus according to the third embodiment of the present invention comprises the liquid crystal element 10, the front reflection polarizing plate 20 arranged on the front side of the liquid crystal element 10, an optical element 41 arranged on the front side of the reflection polarizing plate 20, a diffusion means 55 arranged on the rear side of the liquid crystal element 10, and the rear member 28. The third embodiment is equal in construction to each of the first and second embodiments, except that the third embodiment of the present invention differs from any of the first embodiment and the second embodiment in that, in the third embodiment, the optical element 41 is arranged on the front side of the reflection polarizing plate 20, and that the diffusion means 55 is arranged between the liquid crystal element 10 and the rear member 28. Therefore, the same constituents of the display apparatus are denoted by the same reference numerals so as to avoid an overlapping description.

The optical element 41 is a retardation plate serving to impart a phase difference between, for example, the normal light and the abnormal light of the transmitted light so as to change the polarized state of the transmitted light. Among the light of one polarized component reflected from the reflection polarizing plate 20 so as to be incident on the retardation plate 41 from the rear side, the light incident on the interface between the front surface of the retardation plate 41 and the air layer, which is the outer atmosphere, at an angle of the total reflection is subjected to the inner surface reflection by the retardation plate 41 so as to be incident again on the reflection polarizing plate 20 with the polarized state changed to the polarized component perpendicular to said one polarized component.

The retardation plate 41 used in the third embodiment of the present invention is constructed by a λ/4 plate. Specifically, the refractive index of the retardation plate 41 in a direction parallel to the transmission axis 20p of the reflection polarizing plate 20 is substantially equal to the refractive index in the direction of the transmission axis 20p of the reflection polarizing plate 20, or the difference between the refractive index of the retardation plate 41 and the refractive index of the reflection polarizing plate 20 in the direction of the transmission axis 20p is smaller than the value of anisotropy in refraction of the anisotropic thin film of the reflection polarizing plate 20. The retardation plate 41 imparts a phase difference of 1/4 wavelength between the normal light and the abnormal light of the light transmitted in a direction parallel to a line normal to the reflection polarizing plate 20. It should be noted that the linear polarized light incident from the rear side (the light of one polarized component reflected from the reflection polarizing plate 20) is converted into a circular polarized light while the light is transmitted toward the front surface of the retardation plate 41. Further, the light subjected to the inner surface reflection at the interface between the front surface of the retardation plate 41 and the air layer, which is the outer atmosphere, is converted into a linear polarized light of the polarized state having the vibrating plane changed by about 90° relative to the linear polarized light incident from the rear side while the light is transmitted through the retardation plate 41 toward the rear surface. In other words, the retardation plate 41 constructed by the λ/4 plate exhibits an optical function equal to that of a λ/2 plate in respect of the light incident from the rear side and subjected to the inner surface reflection at the interface between the front surface and the air layer, which is the outer atmosphere, so as to be emitted again to the rear surface.

The liquid crystal display apparatus according to the third embodiment of the present invention is a TN (twisted nematic) type liquid crystal display apparatus of a normally black mode like the liquid crystal display apparatus of the second embodiment shown in FIG. 14.

Figure 27:
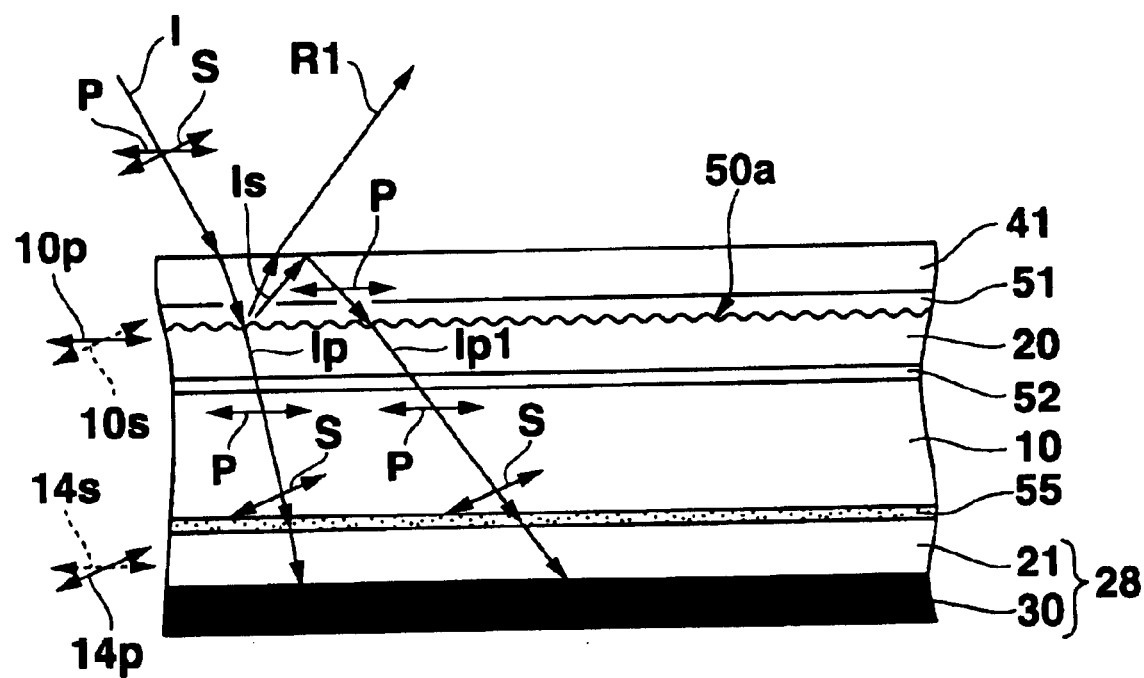
FIG. 27 is a partial cross sectional view showing the construction and the optical function of a liquid crystal display apparatus according to the third embodiment of the present invention.

As shown in FIG. 27, the retardation plate 41 is bonded to the front surface of the front reflection polarizing plate 20 with a transparent adhesive layer 51. The adhesive layer 51 is made an optical adhesive having a refractive index substantially equal to the refractive index of the reflection polarizing plate 20 in the direction of the transmission axis

20p. Alternatively, the difference between the refractive index of the optical adhesive and the refractive index of the reflection polarizing plate 20 in the direction of the transmission axis 20p is smaller than the value of anisotropy in refraction of the anisotropic thin film of the reflection polarizing plate 20. As a result, the irregular plane 50a formed on the front surface of the front reflection polarizing plate 20 permits one polarized component reflected from the reflection polarizing plate 20, i.e., the light of the polarized component along the reflection axis 20s, to be incident on the retardation plate 41 at an angle of incidence at which the light is subjected to the inner surface reflection by the retardation plate 41, and also permits the light of one polarized component along the reflection axis 20s to be diffused and reflected so as to diffuse the light of the other polarized component along the transmission axis 20p.

The diffusion means 55 arranged between the liquid crystal element 10 and the rear reflection polarizing plate 21 included in the rear member 28 includes an adhesive layer having light scattering particles mixed therein, and the rear reflection polarizing plate 21 is bonded to the rear surface of the liquid crystal element 10 (outer surface of the rear substrate 12) by the adhesive layer having particles mixed therein and forming the diffusion means 55.

It is desirable for the diffusion means 55 to have a haze value of about 30 and to have a directivity that the light is diffused in a direction parallel to the line normal to the front reflection polarizing plate 20 arranged on the front side of the liquid crystal element 10. More preferably, it is desirable for the diffusion means 55 to have a directivity that the light is diffused within an angular range of about 30° about the normal line noted above.

In the liquid crystal display apparatus according to the third embodiment of the present invention, the light $I_s$ reflected from the front reflection polarizing plate 20 is incident on the retardation plate 41 from the rear side and is subjected to the inner surface reflection at the interface between the front surface of the retardation plate 41 and the air layer, which is the outer atmosphere, as shown in FIG. 27. Then, the light is incident again on the front reflection polarizing plate 20 with the polarized state changed by the phase difference of the retardation plate 41, and the light $I_p1$ having the polarized state changed into the other polarized component P along the transmission axis 20o of the front reflection polarizing plate 20 is transmitted through the front reflection polarizing plate 20 so as to be incident on the liquid crystal element 10. In other words, in the liquid crystal display apparatus of the third embodiment, among the two polarized components S and P, which are perpendicular to each other, of the external light incident from the front side, both the light $I_p$ of the polarized component P transmitted through the front reflection polarizing plate 20 and the light $I_p1$ of the polarized component P that is incident again on the front reflection polarizing plate 20 with the polarized state changed by the retardation plate 41 are transmitted through the front reflection polarizing plate 20 so as to be incident on the liquid crystal element 10.

In the third embodiment of the present invention, a surface treatment is applied to the front surface of the front reflection polarizing plate 20 so as to form the irregular plane 50 on the front surface, and the light $I_s$ of one polarized component reflected from the reflection polarizing plate 20 is allowed to be incident on the retardation plate 41 at an angle of incidence at which the light is subjected to the inner surface reflection by the retardation plate 41. Because of the particular construction, the light $I_s$ reflected from the front reflection polarizing plate 20 is allowed to be incident in a large amount on the retardation plate 41 at an angle of incidence at which the light is subjected to the inner surface reflection by the retardation plate 41. It follows that it is possible to increase the light that is allowed to be incident again on the front reflection polarizing plate 20 with the polarized state changed by the retardation plate 41.

It should also be noted that the irregular plane on the front surface of the front reflection polarizing plate 20 makes it possible to diffuse and reflect the light $I_s$ of one polarized component along the reflection axis 20s and to transmit the light $I_p$ of the other polarized component along the transmission axis 20p without diffusing the light $I_p$. As a result, the light $I_s$ of one polarized component reflected from the front reflection polarizing plate 20 is diffused and reflected so as to permit the light to be incident in a large amount on the retardation plate 41 at an angle of incidence that permits the light to be subjected to the inner surface reflection by the retardation plate 41, making it possible to increase the light that is allowed to be incident again on the front reflection polarizing plate with the polarized state changed by the retardation plate 41.

In the third embodiment of the present invention, a λ/4 plate imparting a phase difference of 1/4 wavelength between the normal light and the abnormal light of the transmitted light is used as the retardation plate 41. This makes it possible to permit the light, which is reflected from the front reflection polarizing plate 20 so as to be incident on the retardation plate (λ/4 plate) and subjected to the inner surface reflection by the retardation plate 41 so as to be emitted to the rear side, to be converted into the light of polarized state of the polarized component P (polarized component transmitted through the front reflection polarizing plate 20) perpendicular to the component S reflected from the front reflection polarizing plate 20, and almost all the light incident again on the front reflection polarizing plate 20 is transmitted through the front reflection polarizing plate 20 so as to be incident on the liquid crystal element 10.

The effect produced by the use of the retardation plate 41 constructed by the λ/4 plate is rendered most prominent when the retardation plate 41 constructed by the λ/4 plate is arranged such that the retarded phase axis 41a crosses both the reflection axis 20s and the transmission axis 20p at an angle of substantially 45°.

Figure 28:
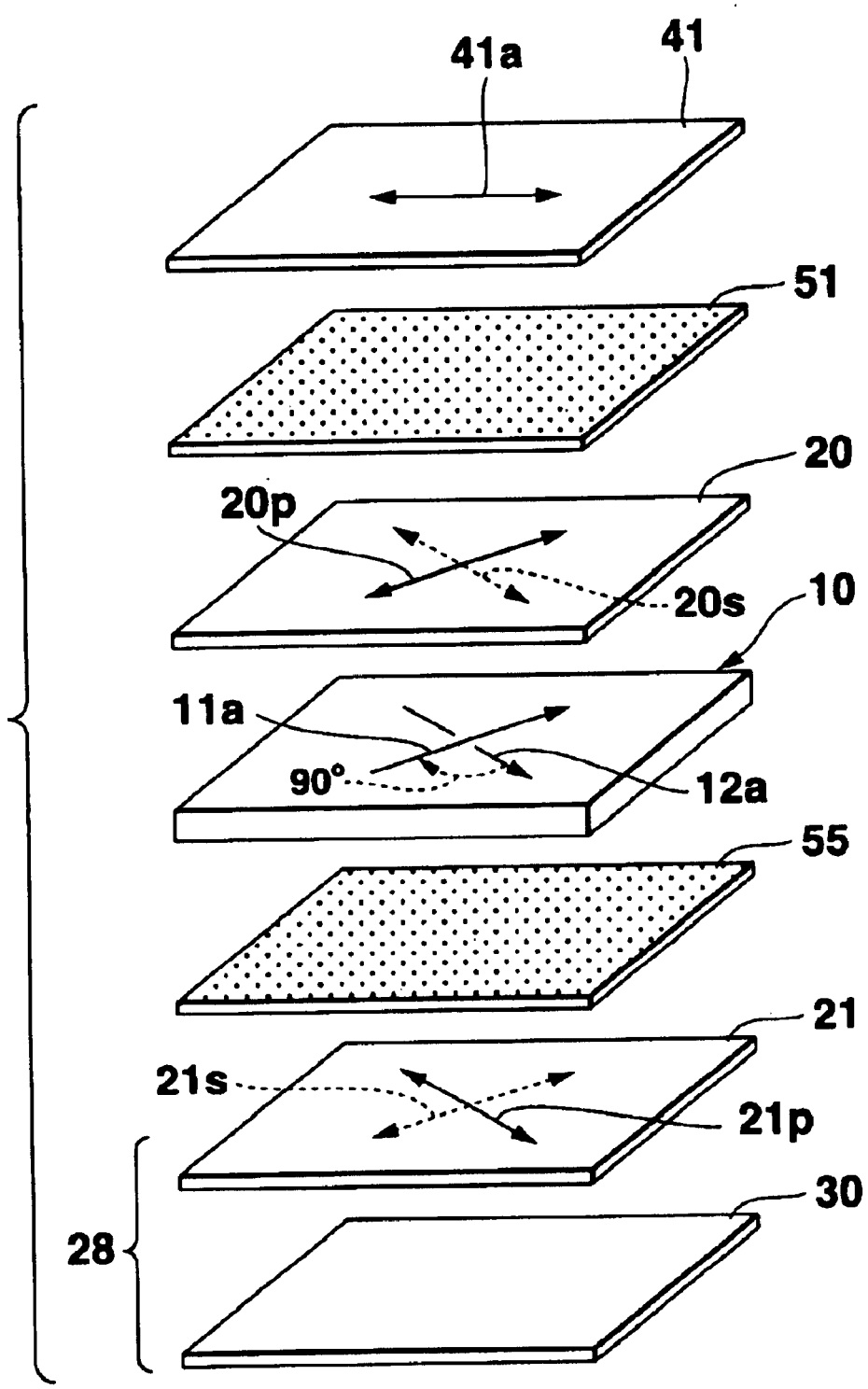
FIG. 28 is an oblique view showing in a dismantled fashion a first modification of the third embodiment of the present invention.

FIG. 28 is an oblique view showing in a dismantled fashion a liquid crystal display apparatus according to a first modification of the third embodiment of the present invention. In the first modification of the third embodiment, an ordinary reflection polarizing plate to which a surface treatment is not applied is used as the front reflection polarizing plate 20, and a diffusion layer 51 is arranged between the front reflection polarizing plate 20 and the retardation plate 41 arranged on the rear side of the front reflection polarizing plate 20.

Figure 29:
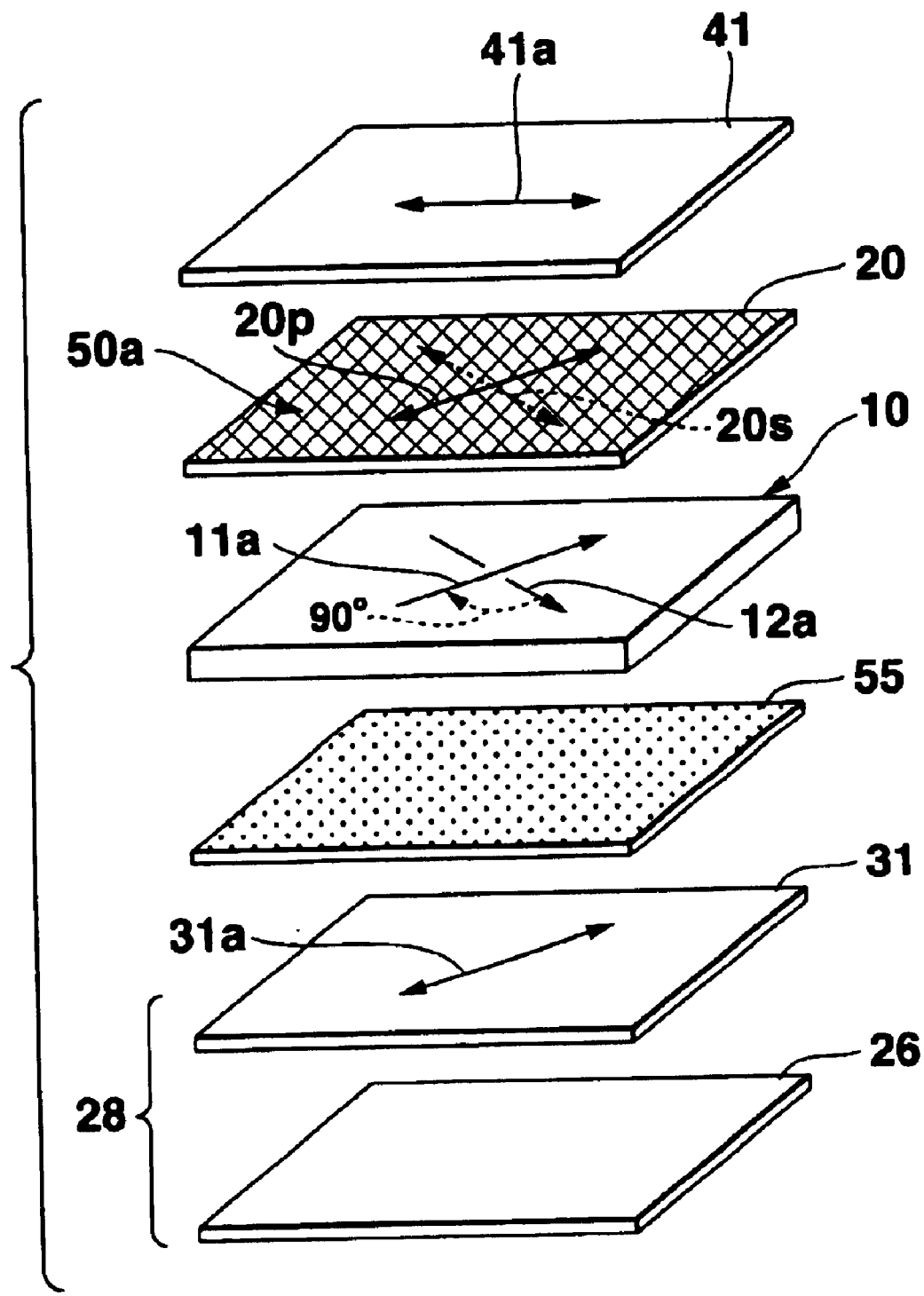
FIG. 29 is an oblique view showing in a dismantled fashion a second modification of the third embodiment of the present invention.

FIG. 29 is an oblique view showing in a dismantled fashion a liquid crystal display apparatus according to a second modification of the third embodiment of the present invention. In the second modification of the third embodiment, the rear member 28 constructed by the absorption polarizing plate 31 and a reflection plate 26 arranged on the rear side of the absorption polarizing plate 31 is arranged on the rear side of the liquid crystal element 10.

The liquid crystal display apparatus according to the second modification of the third embodiment is of a normally black mode. It should be noted that the absorption polarizing plate 31 is arranged such that the transmission axis 31a is substantially parallel to the transmission axis 20p of the reflection polarizing plate 20 arranged on the front side of the liquid crystal element 10.

Figure 30:
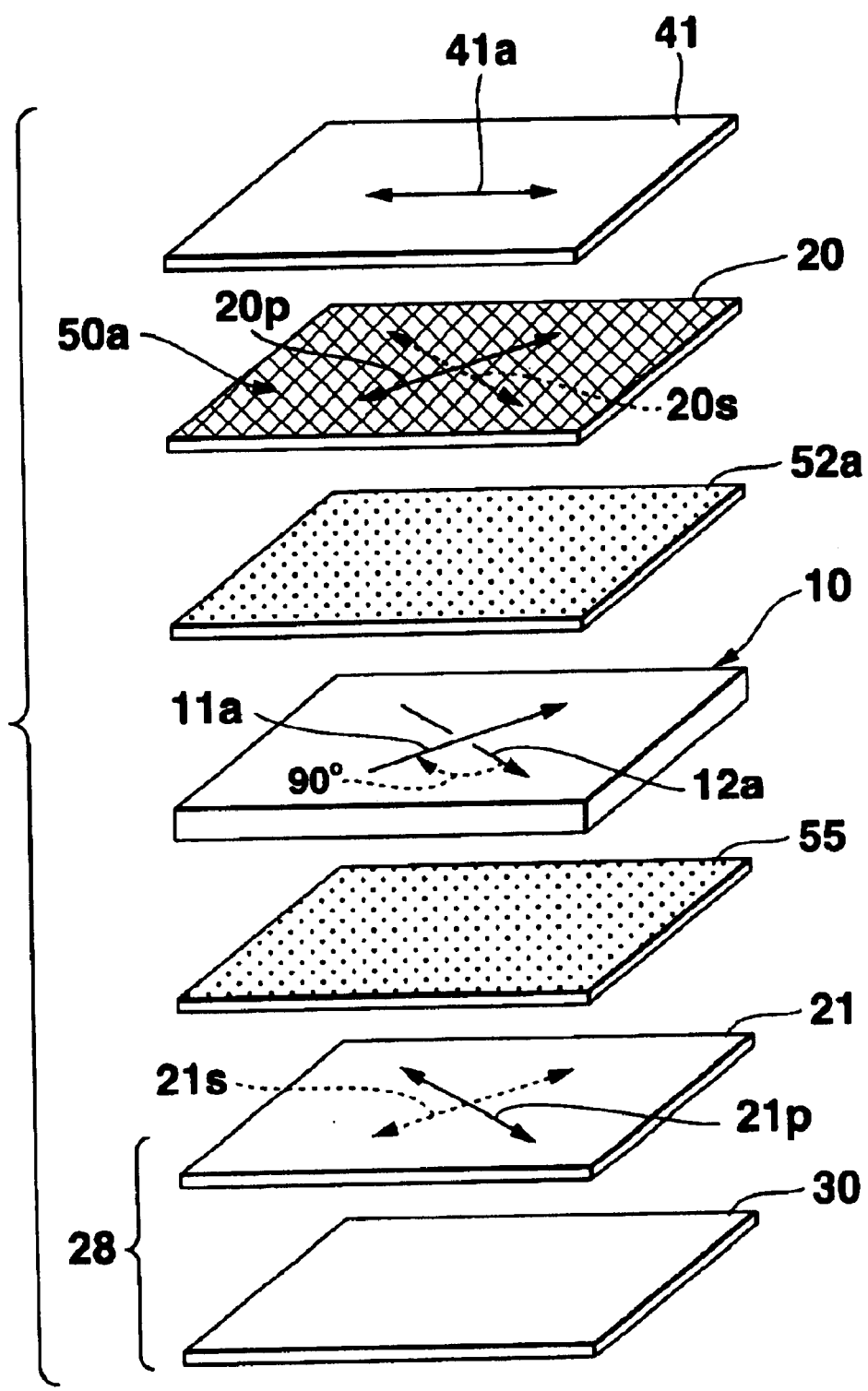
FIG. 30 is an oblique view showing in a dismantled fashion a third modification of the third embodiment of the present invention.

FIG. 30 is an oblique view showing in a dismantled fashion a liquid crystal display apparatus according to a third modification of the third embodiment of the present invention. In the third modification of the third embodiment, a diffusion means 52a is arranged between the liquid crystal element 10 of the liquid crystal display apparatus and the front reflection polarizing plate 20, said liquid crystal display apparatus being provided with the rear member 28 constructed by the reflection polarizing plate 21 and the light absorption layer 30 arranged on the rear side of the reflection polarizing plate 21. The liquid crystal display apparatus according to the third modification of the third embodiment permits obtaining a display having a high front brightness.

The liquid crystal display apparatus according to the third modification of the third embodiment can be used as a liquid crystal display apparatus of a normally white mode by arranging the front reflection polarizing plate 20 arranged on the front side of the liquid crystal element 10 and the rear reflection polarizing plate 21 included in the rear member 28 arranged on the rear side of the liquid crystal element 10 such that the reflection axes 20s and 21s are substantially parallel to the transmission axes 20p and 21p, respectively.

Figure 31:
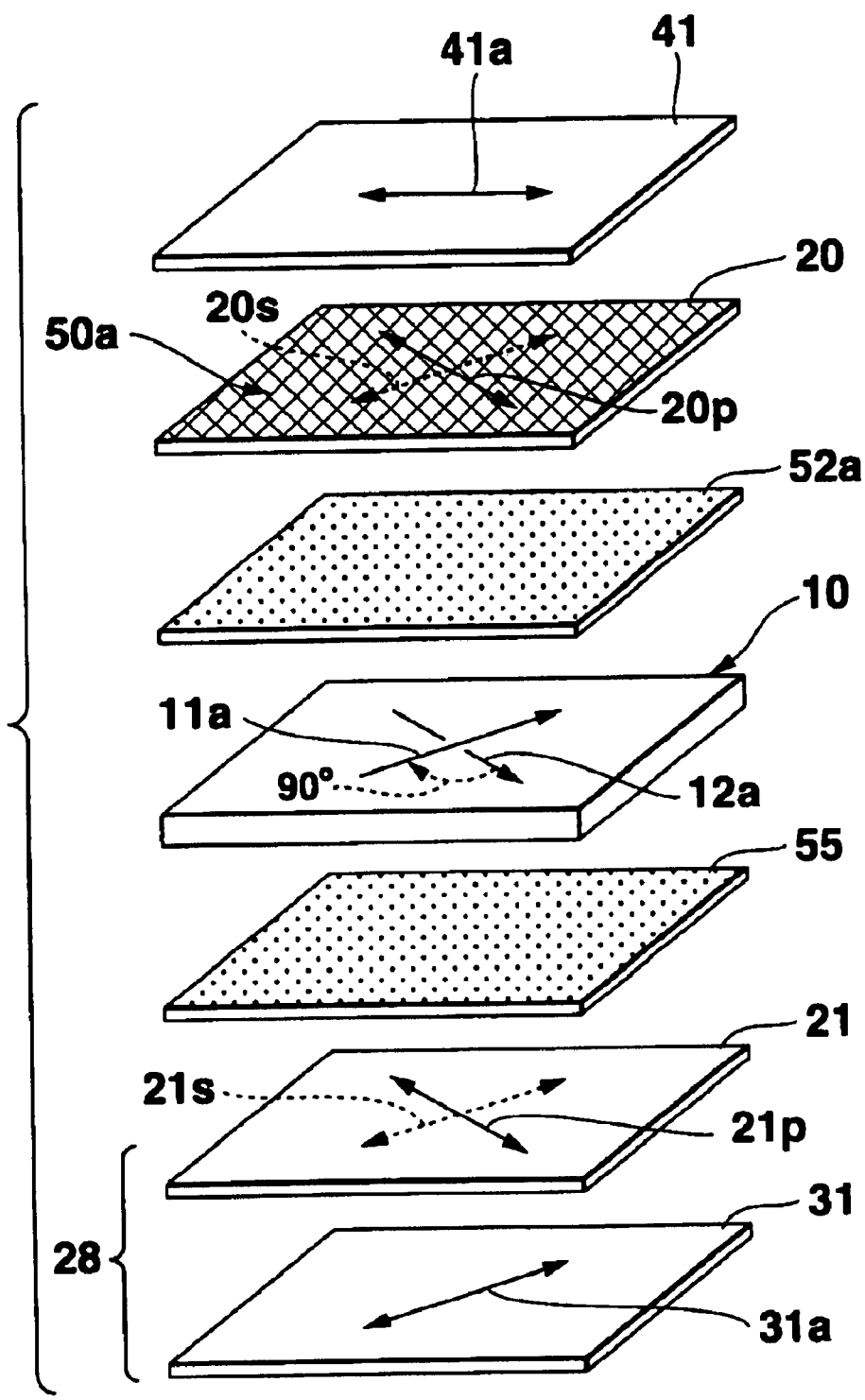
FIG. 31 is an oblique view showing in a dismantled fashion a fourth modification of the third embodiment of the present invention.

FIG. 31 is an oblique view showing in a dismantled fashion a liquid crystal display apparatus according to a fourth modification of the third embodiment of the present invention. In the fourth modification of the third embodiment, the front reflection polarizing plate 20 arranged on the front side of the liquid crystal element 10 and the reflection polarizing plate 21 included in the rear member 28 are arranged such that the reflection axes 20s and 21s are substantially parallel to the transmission axes 20p and 21p, respectively so as to provide a normally white mode. In addition, the rear member 28 constructed by the reflection-polarizing plate 21 and the absorption polarizing plate 31 arranged on the rear side of the reflection polarizing plate 21 is arranged on the rear side of the liquid crystal element 10.

Figure 32:
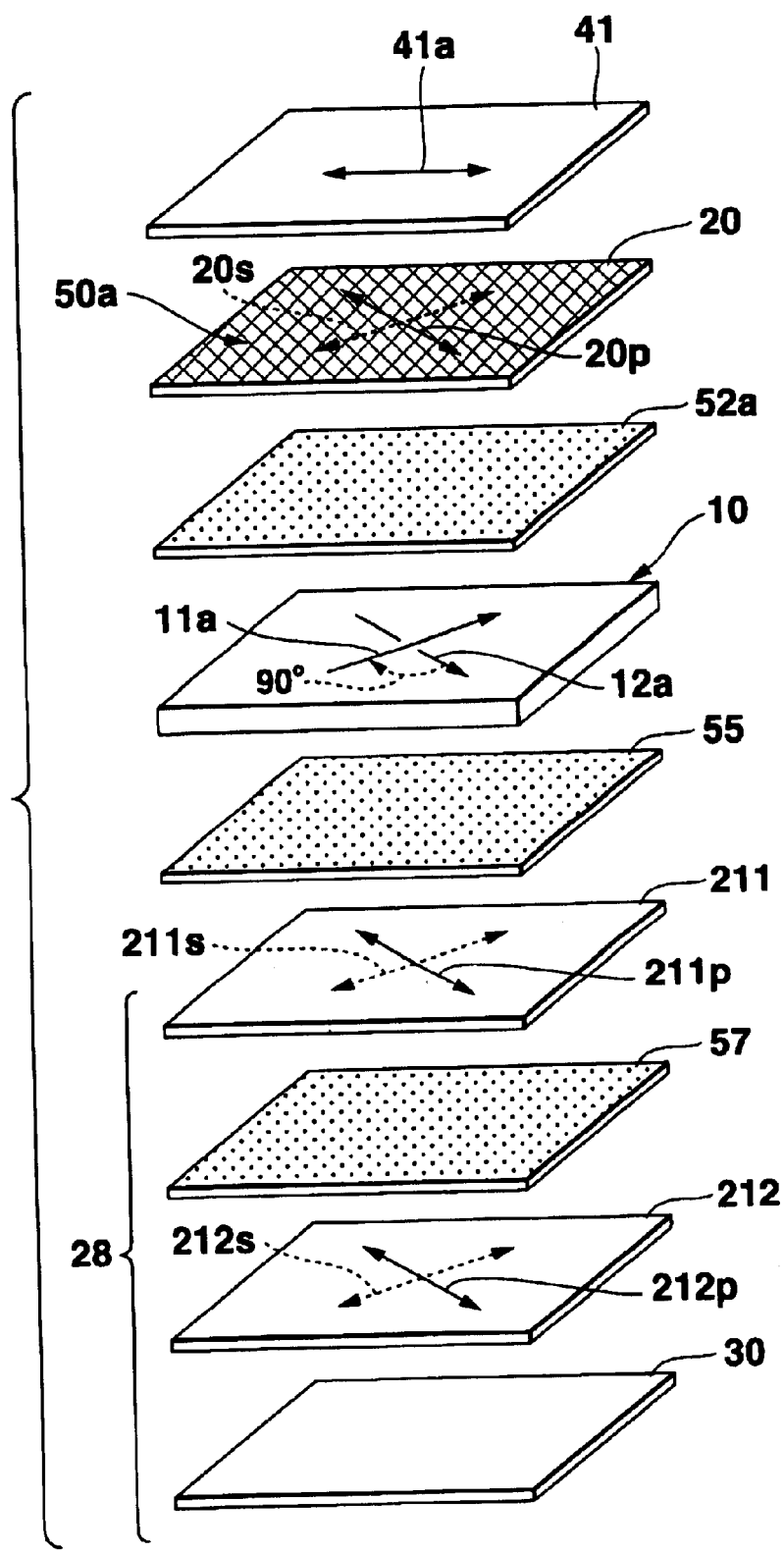
FIG. 32 is an oblique view showing in a dismantled fashion a fifth modification of the third embodiment of the present invention.

FIG. 32 is an oblique view showing in a dismantled fashion a liquid crystal display apparatus according to a fifth modification of the third embodiment of the present invention. In the fifth modification of the third embodiment, the rear member 28 equipped with two reflection polarizing plates 211 and 212 is arranged on the rear side of the liquid crystal element 10.

The rear member 28 used in the fifth modification of the third embodiment is equipped with the first reflection polarizing plate 211 facing the rear surface of the liquid crystal element 10 and the second reflection polarizing plate 212 arranged on the rear side of the first reflection polarizing plate 211. Also, a diffusion layer 57 for diffusing the transmitted light is arranged between the first reflection polarizing plate 211 and the second reflection polarizing plate 212. Further, a light absorbing film (black film) 30 is arranged as a light absorbing means on the rear side of the second reflection polarizing plate 212. It should be noted that the first reflection polarizing plate 211 and the second reflection polarizing plate 212 are arranged such that reflection axes 211s, 212s are substantially parallel to the transmission axes 211p, 212p, respectively.

In the fifth modification, it is possible to use an absorption polarizing plate as the light absorbing means. In this case, the absorption polarizing plate should be arranged such that the transmission axis is substantially perpendicular to the transmission axis 212p of the second reflection polarizing late 212.

According to the liquid crystal display apparatus according to the fifth modification of the third embodiment, it is possible to increase the amount of light reflected from the rear member 28 so as to obtain a display of a higher brightness.

Figure 33:
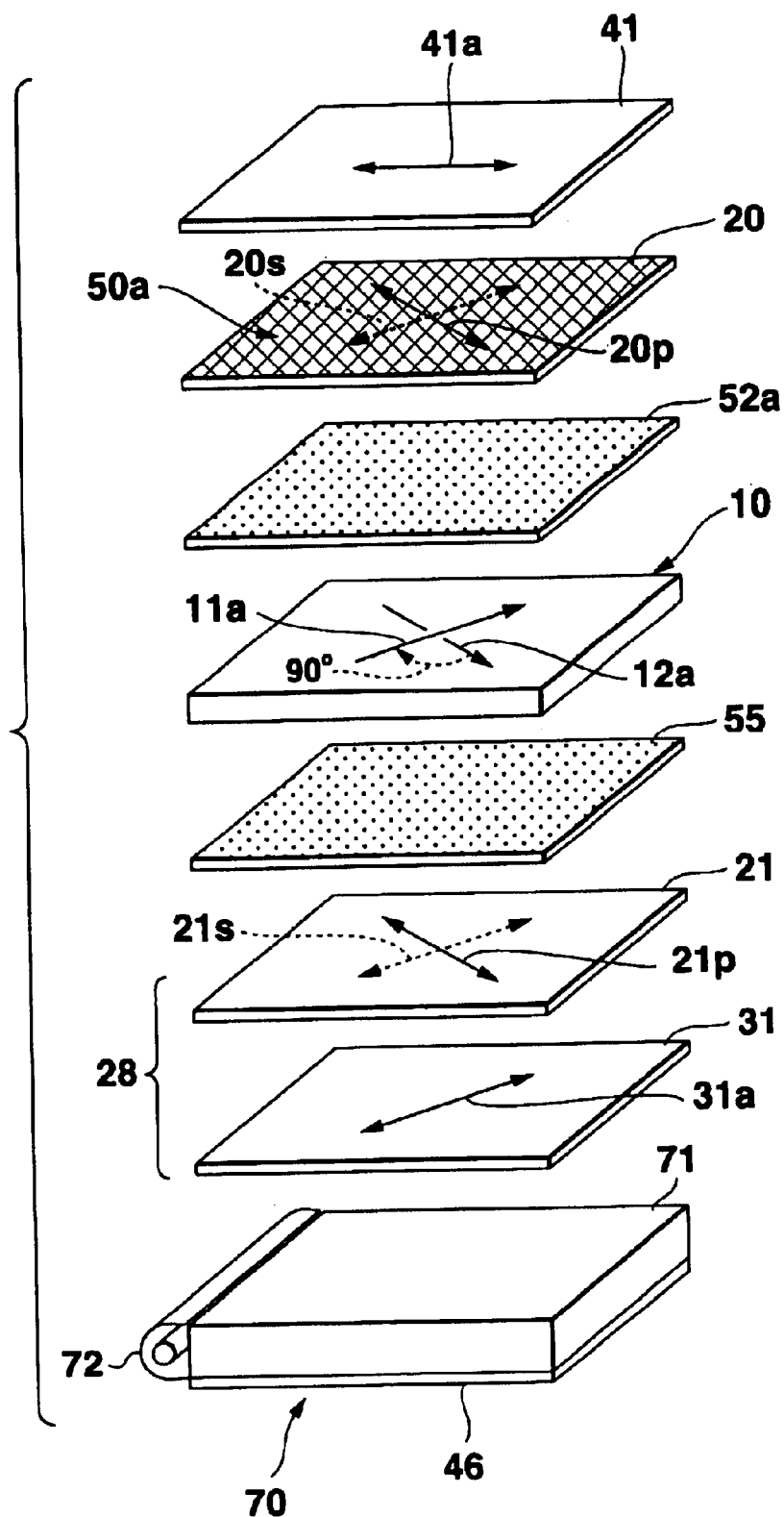
FIG. 33 is an oblique view showing in a dismantled fashion a sixth modification of the third embodiment of the present invention.

FIG. 33 is an oblique view showing in a dismantled fashion a liquid crystal display apparatus according to a sixth modification of the third embodiment of the present invention. In the sixth modification of the third embodiment, the rear member 28 constructed by the reflection polarizing plate 21 and the absorption polarizing plate 31 arranged on the rear side of the reflection polarizing plate 21 is arranged on the rear side of the liquid crystal element 10. In addition, the back light 70 is arranged on the rear side of the rear member 28.

Figure 34:
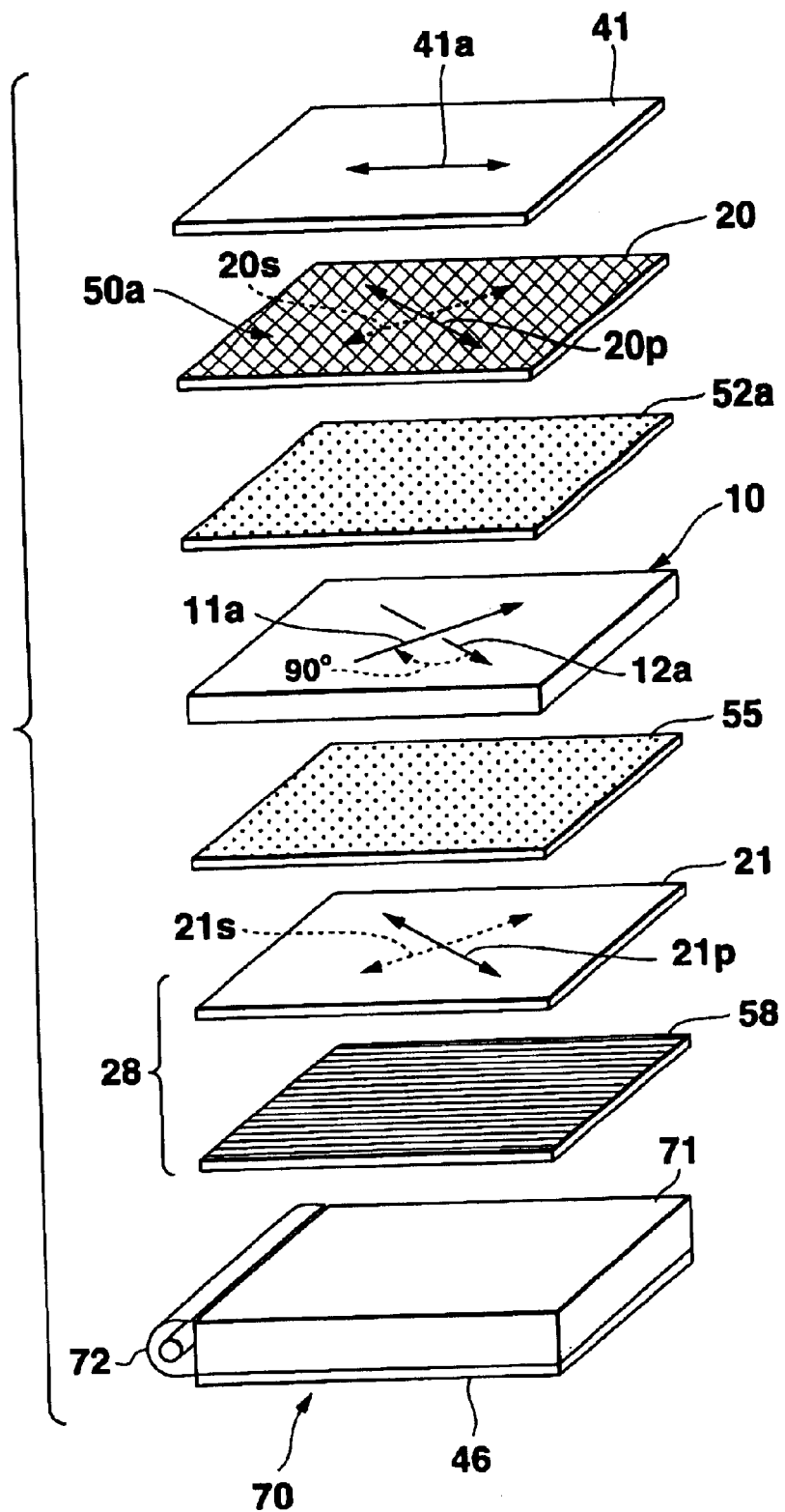
FIG. 34 is an oblique view showing in a dismantled fashion a seventh modification of the third embodiment of the present invention.

FIG. 34 is an oblique view showing in a dismantled fashion a liquid crystal display apparatus according to a seventh modification of the third embodiment of the present invention. In the seventh modification of the third embodiment, the rear member 28 constructed by the reflection polarizing plate 21 and a colored film 57 arranged on the rear side of the reflection polarizing plate 21 as a light absorbing means and capable of absorbing the light of a predetermined wavelength region is arranged on the rear side of the liquid crystal element 10. In addition, the back light 70 is arranged on the rear side of the rear member 28. Incidentally, the colored film 57 is constructed by a color film of a single color.

In the reflection display utilizing the external light, which is performed by the liquid crystal display apparatus according to the seventh modification of the third embodiment, the light incident from the front side is reflected by the reflection polarizing plate 21 of the rear member 28, with the result that the display in that region is a bright display of white, when an electric field is not applied in the liquid crystal layer. On the other hand, when an electric field is applied in the liquid crystal layer, the light incident from the front side is transmitted through the reflection polarizing plate 21 of the rear member 28 so as to be absorbed by the colored film 57, with the result that the display in that region is a dark display of substantially black.

In the transmission display utilizing the illuminating light emitted from the back light 70, the illuminating light emitted from the back light 70 is colored by the colored film 57 and, then, is incident on the liquid crystal element 10 from the rear side.

When an electric field is not applied in the liquid crystal layer of the liquid crystal element 10, the light incident from the rear side is reflected by the front reflection polarizing plate 20, with the result that the display in that region is a dark display of substantially black. On the other hand, when an electric field is formed in the liquid crystal layer, the light incident from the rear side is transmitted through the front reflection polarizing plate 20 so as to be emitted to the front side, with the result that the display in that region is a bright display of the color of the colored film 57.

The color of the colored film 57 can be selected optionally. For example, where the colored film 57 is colored red, the transmission display is made a colored display in which information is displayed by a red color within a white back ground.

In the rear member 28 in the seventh modification of the third embodiment, the colored film 57 arranged on the rear side of the reflection polarizing plate 21 is formed of a color film of a single color. However, it is possible for the colored film 57 to be a colored film of a plurality of colors formed by arranging a plurality of color films in a predetermined pattern. In this case, it is possible to perform a colored display in which the information is displayed by a plurality of colors within a white back ground.

Figure 35:
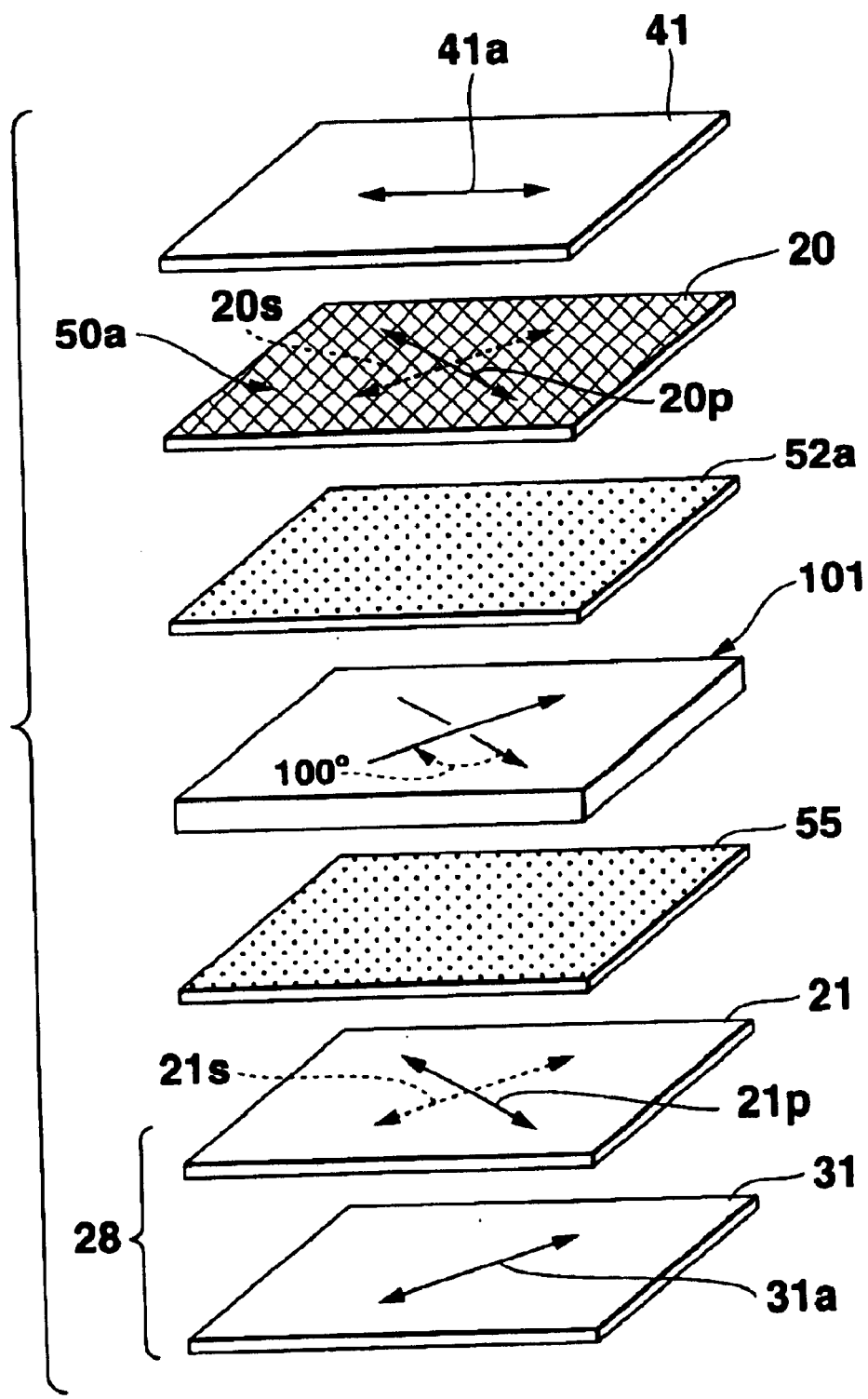
FIG. 35 is an oblique view showing in a dismantled fashion an eighth modification of the third embodiment of the present invention.

FIG. 35 is an oblique view showing in a dismantled fashion a liquid crystal display apparatus according to an eight modification of the third embodiment of the present invention. The liquid crystal display apparatus according to the eighth modification of the third embodiment is a TN type liquid crystal display apparatus using a simple matrix liquid crystal element 101.

The liquid crystal display apparatus according to the eighth modification of the third embodiment is equal to the liquid crystal display apparatus according to the fourth modification of the third embodiment shown in FIG. 31, except that the simple matrix type liquid crystal element 101 is substituted for the liquid crystal element 10 used in the fourth modification.

In the eighth modification, the liquid crystal molecules of the simple matrix liquid crystal element 101 is twist-aligned with a twisting angle of about 100° as denoted by a broken line.

The liquid crystal element 101 used in the liquid crystal display apparatus according to the eighth modification of the third embodiment is a simple matrix liquid crystal element. However, since the liquid crystal molecules are twist-aligned with a twisting angle of about 100°, it is possible to obtain a good response of the liquid crystal molecules to the electric field, compared with the simple matrix liquid crystal element that is twist-aligned with a twisting angle of about 90°. It follows that it is possible to obtain a good contrast.

In the eighth modification of the third embodiment, it is desirable for the twisting angle of the liquid crystal molecules of the simple matrix liquid crystal element 101 to fall within a range of 100°±5°. It is also desirable for the product $\Delta nd$ between the birefringence $\Delta n$ of the liquid crystal of the liquid crystal element 101 and the thickness d of the liquid crystal layer to fall within a range of 115 nm to 130 nm.

Figure 36:
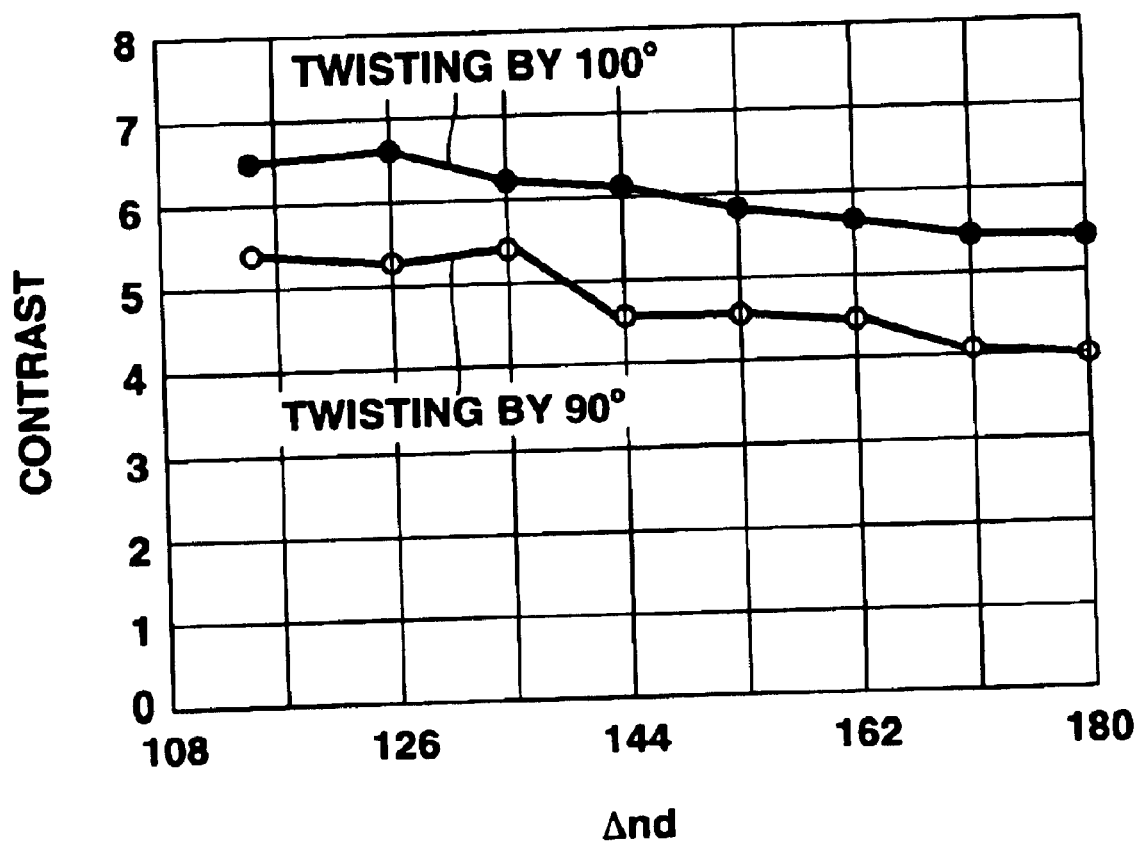
FIG. 36 is a graph showing the relationship among the twisting angle of the liquid crystal molecules of a simple matrix liquid crystal element, the $\Delta$nd value of the liquid crystal element, and the contrast.

FIG. 36 is a graph showing the relationship between the $\Delta nd$ value of the liquid crystal element 101 and the contrast, covering the case where a liquid crystal display apparatus in which the twisting angle of the liquid crystal molecules of the simple matrix liquid crystal element 101 is set at 100°, i.e., 100° twisted liquid crystal display apparatus, and a liquid crystal display apparatus in which the twisting angle of the liquid crystal molecules is set at 90°, i.e., 90° twisted liquid crystal display apparatus, are subjected to a time-divided driving with a 1/5 duty.

As shown in FIG. 36, the best contrast, the contrast value being about 5.3, is obtained in the 90° twisted liquid crystal display apparatus when the $\Delta nd$ value of the liquid crystal element is 115 nm. On the other hand, the contrast value for the $\Delta nd$ of the liquid crystal element 101 for the 100° twisted liquid crystal display apparatus is higher than that for the 90° twisted liquid crystal display apparatus. Also, the contrast value of the 100° twisted liquid crystal display apparatus when the $\Delta nd$ value is about 160 nm or less is higher than the best contrast value, i.e., the contrast value when $\Delta nd=115$ nm, of the 90° twisted liquid crystal display apparatus. In addition, the 100° twisted liquid crystal display apparatus exhibits a sufficiently large contrast value of 6.5 or more when the $\Delta nd$ value falls within a range of between 115 nm and 130 nm, particularly, the display apparatus exhibits the highest contrast value of about 6.7 when the $\Delta nd$ value is 126 nm.

In the liquid crystal display apparatus according to the eighth modification of the third embodiment, the liquid crystal element 101 is formed of a simple matrix liquid crystal element. However, since the liquid crystal molecules are twist-aligned at a twisting angle of about 100°, the liquid crystal molecules exhibit a good response to the electric field, compared with the simple matrix liquid crystal element in which the liquid crystal molecules are twist-aligned at a twisting angle of about 90°.

It follows that, in the liquid crystal display apparatus according to the eighth modification of the third embodiment of the present invention, it is desirable to select the birefringence $\Delta n$ of the liquid crystal and the thickness d of the liquid crystal layer of the simple matrix liquid crystal element 101 such that the value of $\Delta nd$ noted above falls within a range of between 115 nm and 130 nm. More preferably, it is desirable to set the value of $\Delta nd$ at 126 nm. In this case, it is possible to obtain a good contrast.

The liquid crystal display apparatus shown in FIG. 35 can be obtained by substituting the simple matrix type liquid crystal element 101 for the liquid crystal element 10 in the liquid crystal display apparatus according to each of the first and second embodiments of the present invention. In this case, the twisting angle of the liquid crystal molecules should be set at about 100°, and the $\Delta nd$ value of the simple matrix liquid crystal element 1' should be set to fall within a range of between 115 nm and 130 nm (more desirably at 126 nm).

The liquid crystal display apparatus according to any of the first to third embodiments of the present invention is of a TN type. However, it is possible to apply the technical idea of the present invention to any of an homogeneous aligned type liquid crystal display apparatus in which the liquid crystal molecules of the liquid crystal element are homogeneously aligned in one direction, a ferroelectric or antiferroelectric liquid crystal display apparatus, and a lateral electric field driving type liquid crystal display apparatus in which a plurality of segment electrodes and a plurality of common electrodes facing said segment electrodes are arranged on the inner surface of one of the pair of substrates of the liquid crystal element.

Fourth Embodiment

Figure 37:
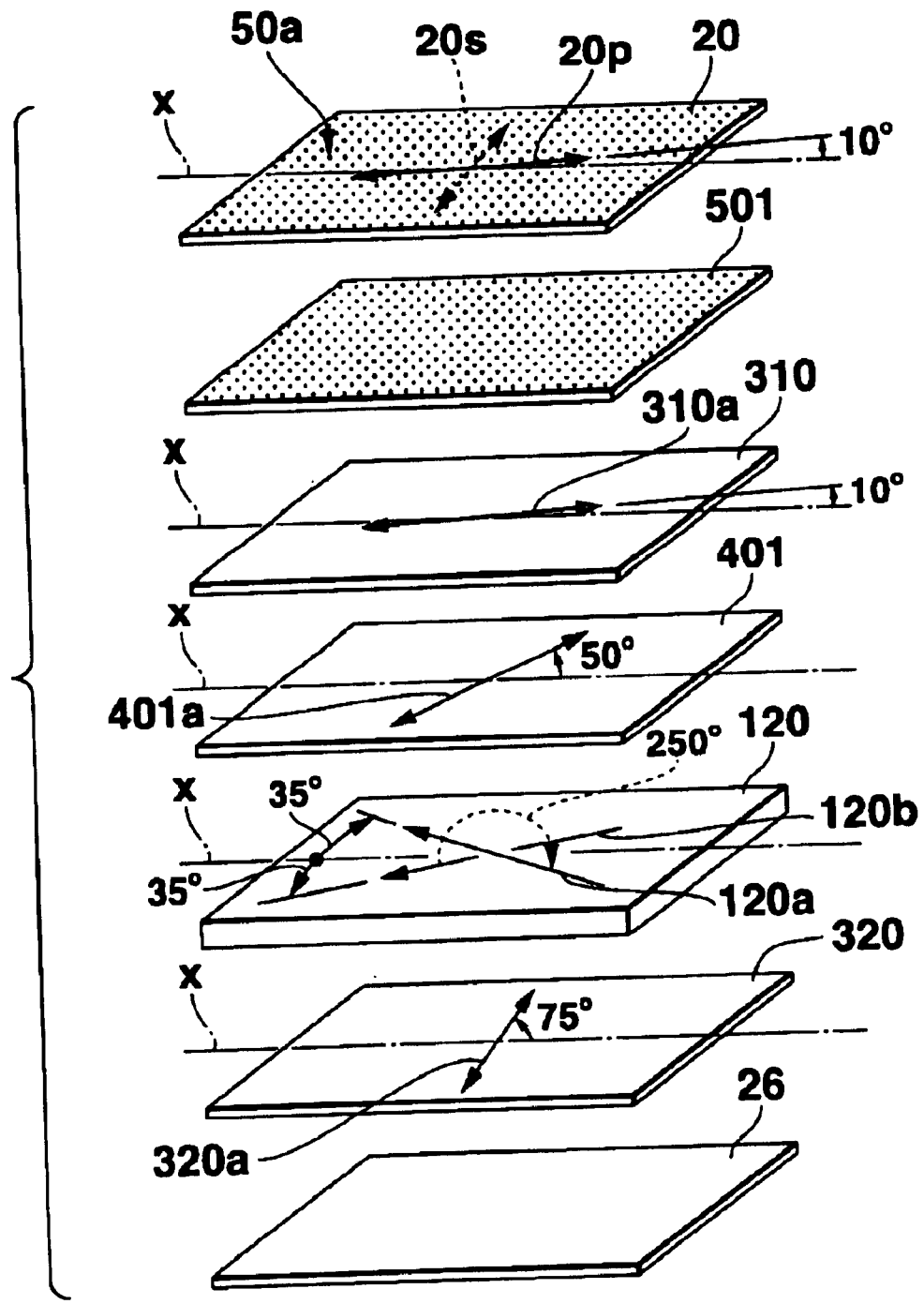
FIG. 37 is an oblique view showing in a dismantled fashion a liquid crystal display apparatus according to a fourth embodiment of the present invention.

FIG. 37 is an oblique showing in a dismantled fashion a liquid crystal display apparatus according to a fourth embodiment of the present invention.

The liquid crystal display apparatus according to the fourth embodiment of the present invention is an STN type liquid crystal display apparatus performing a reflection display by utilizing the external light and comprises an STN type liquid crystal element 120, the reflection polarizing plate 20 arranged on the front side of the STN type liquid crystal element 120, an absorption polarizing plate 310 (front absorption polarizing plate) arranged between the liquid crystal element 120 and the reflection polarizing plate 20, a diffusion layer 501 arranged between the reflection polarizing plate 20 and the absorption polarizing plate 310, a compensation plate 401 arranged between the liquid crystal element 120 and the front absorption polarizing plate 310, the reflection film 26 arranged on the rear side of the liquid crystal element 120 as a reflecting means, and an absorption polarizing plate (rear absorption polarizing plate) 320 arranged between the liquid crystal element 120 and the reflection film 26. The constituents of the display apparatus equal to those of the first to third embodiments are denoted by the same reference numerals so as to avoid an overlapping description.

The aligning directions of the liquid crystal molecules of the STN type liquid crystal element 120 are regulated in the vicinity of the substrates by the aligning films mounted to the inner surfaces of the front substrate and the rear substrate so as to be twist-aligned with a twisting angle of 180° to 270° between the front and rear substrates. It is desirable for the twisting angle of the liquid crystal molecules of the STN type liquid crystal element 120 to fall within a range of between 200° and 250°. In the fourth embodiment of the present invention, the aligning direction 120b of the liquid crystal molecules in the vicinity of the front substrate of the STN type liquid crystal element 120 is deviant by about 35° from the lateral axis x of the screen in the clockwise direction in the drawing, as shown in FIG. 37. Also, the aligning direction 120a of the liquid crystal molecules in the vicinity of the rear substrate is deviant by about 35° from the lateral axis x in the counterclockwise direction. Further, the liquid crystal molecules of the liquid crystal layer included in the STN type liquid crystal element 120 are twist-aligned from the rear substrate toward the front substrate with a twisting angle of about 250° in the clockwise direction in the figure, as denoted by a broken line in the drawing.

The reflection polarizing plate 20 is arranged such that the transmission axis 20p is deviated by about 45° in the counterclockwise direction from the aligning direction 120b of the liquid crystal molecules in the vicinity of the front substrate of the STN type liquid crystal element 120 (or deviated by about 10° in the counterclockwise direction from the lateral axis x of the screen).

The front absorption polarizing plate 310 is arranged such that the transmission axis 310a is substantially parallel to the transmission axis 20p of the reflection polarizing plate 20. On the other hand, the rear absorption polarizing plate 320 is arranged such that the transmission axis 320a is deviated by about 65° in the counterclockwise direction from each of the transmission axis 20p of the reflection polarizing plate 20 and the transmission axis 310a of the front absorption polarizing plate 310 (or deviated by about 75° in the counterclockwise direction from the lateral axis x of the screen).

The compensation plate 401 arranged between the STN type liquid crystal element 120 ad the front absorption polarizing plate 310 serves to suppress the coloring of the display inherent in the STN type liquid crystal display apparatus so as to perform a white display. The compensation plate 401, which is formed by a retardation plate, is arranged such that the retarded phase axis 401a is deviated by about 85° from the aligning direction 120a of the liquid crystal molecules in the vicinity of the front substrate of the STN type liquid crystal element 120 in the counterclockwise direction (or deviated by about 50° from the lateral axis x of the screen in the counterclockwise direction). Incidentally, the product Δnd between the birefringence Δn of the liquid crystal and the thickness d of the liquid crystal layer of the STN type liquid crystal element 120 is about 780 nm, and the retardation of the compensation plate (retardation plate) 401 is about 570 nm.

The STN type liquid crystal element 120 changes the polarized state of the light emitted to the rear side in accordance with the aligned state of the liquid crystal molecules and controls the transmittance of the rear absorption polarizing plate 320 in accordance with the polarized state. It should be noted that the intensity of an electric field applied between the electrodes of the STN typed liquid crystal element 120 is controlled stepwise between the intensity that permits the darkest display and the intensity that permits the brightest display so as to achieve a display of an image having a gradation in the brightness.

In the liquid crystal display apparatus according to the fourth embodiment of the present invention, the light transmitted through each of the pixel regions of the STN type liquid crystal element 120 is colored to conform with the color of the color filter corresponding to the pixel region. For example, the light is colored red, green or blue such that the light emitted from each of the pixel regions is colored red, green or blue. It follows that it is possible to achieve a display of a multi-colored image such as a full color image by changing stepwise the intensity of the emitted light of red, green or blue.

It should also be noted that the liquid crystal display apparatus according to the fourth embodiment of the present invention comprises the compensation plate 401, making it possible to suppress the coloring of the display inherent in the STN type liquid crystal display apparatus and, thus, to achieve a display of a multi-color image of a high color quality.

In the fourth embodiment of the present invention, the absorption polarizing plate 310 is arranged between the STN type liquid crystal element 120 and the reflection polarizing plate 20 arranged on the front side thereof such that the transmission axis 310a is substantially parallel to the transmission axis 20p of the reflection polarizing plate 20. It follows that it is possible for the absorption polarizing plate 310 to allow the light incident from the front side and transmitted through the reflection polarizing plate 20 to be incident on the liquid crystal element of an STN type 120 as a linear polarized light having a high degree of polarization. As a result, it is possible to obtain a display of a good contrast.

It should also be noted that the reflection polarizing plate 20 does not contain a substance that absorbs light, with the result that the incident light can be transmitted through the reflection polarizing plate 20 with a high transmittance so as to obtain a bright display.

In the fourth embodiment of the present invention, the diffusion layer 501 is arranged between the liquid crystal element 120 and the reflection polarizing plate 20 arranged on the front side of the liquid crystal element 120, i.e., between the reflection polarizing plate 20 and the absorption polarizing plate 310. As a result, the light reflected from the reflection film 26 so as to be emitted to the front side is diffused from the diffusion layer 501, making it possible to obtain a display of a uniform brightness distribution.

In the fourth embodiment of the present invention, the diffusion layer 501 is arranged between the reflection polarizing plate 20 and the absorption polarizing plate 310. Alternatively, it is possible to arrange the diffusion layer 501 between the absorption polarizing plate 310 and the compensation plate 401 arranged on the front side of the STN type liquid crystal element 120.

It is also possible to arrange the diffusion layer 501 between the STN type liquid crystal element 120 and the reflection film 26 arranged on the rear side of the STN type liquid crystal element 120, i.e., between the STN type liquid crystal element 120 and the rear absorption polarizing plate 320 or between the rear absorption polarizing plate 320 and the reflection plate 26. Further, it is possible to arrange the diffusion layer 501 both between the STN type liquid crystal element 120 and the reflection polarizing plate 20, and between the STN type liquid crystal element 120 and the reflection plate 26 (two diffusion layers are arranged).

In the liquid crystal display apparatus according to the fourth embodiment of the present invention, the reflection film 26 is arranged on the rear side of the STN type liquid crystal element 120 as a reflecting means. It is possible for the reflecting means arranged on the rear side of the STN type liquid crystal element 120 to form a semi-transmitting reflection film. In the case of using a semi-transmitting reflection film, it is possible to perform a reflection display utilizing an external light when the liquid crystal display apparatus is used under an environment in which an external light of a sufficient brightness can be obtained. It is also possible to perform a transmission display utilizing an illuminating light by lighting the back light when it is impossible to obtain an external light of a sufficient brightness.

Further, in the fourth embodiment of the present invention, the absorption polarizing plate 310 is arranged between the reflection polarizing plate 20 and the compensation plate 401. However, it is possible to construct the liquid crystal display apparatus without arranging the absorption polarizing plate 310 by using the reflection polarizing plate 20 having a sufficiently high degree of polarization. In this case, the light of the polarized component having a vibrating plane along the transmission axis 20p can be transmitted through the reflection polarizing plate 20 because a substance absorbing the light is not contained in the reflection polarizing plate 20 as described previously. It follows that it is possible to increase the light transmitted through the compensation plate 401 so as to be incident on the STN type liquid crystal element 120 among the light incident on the liquid crystal display apparatus.

Figure 38:
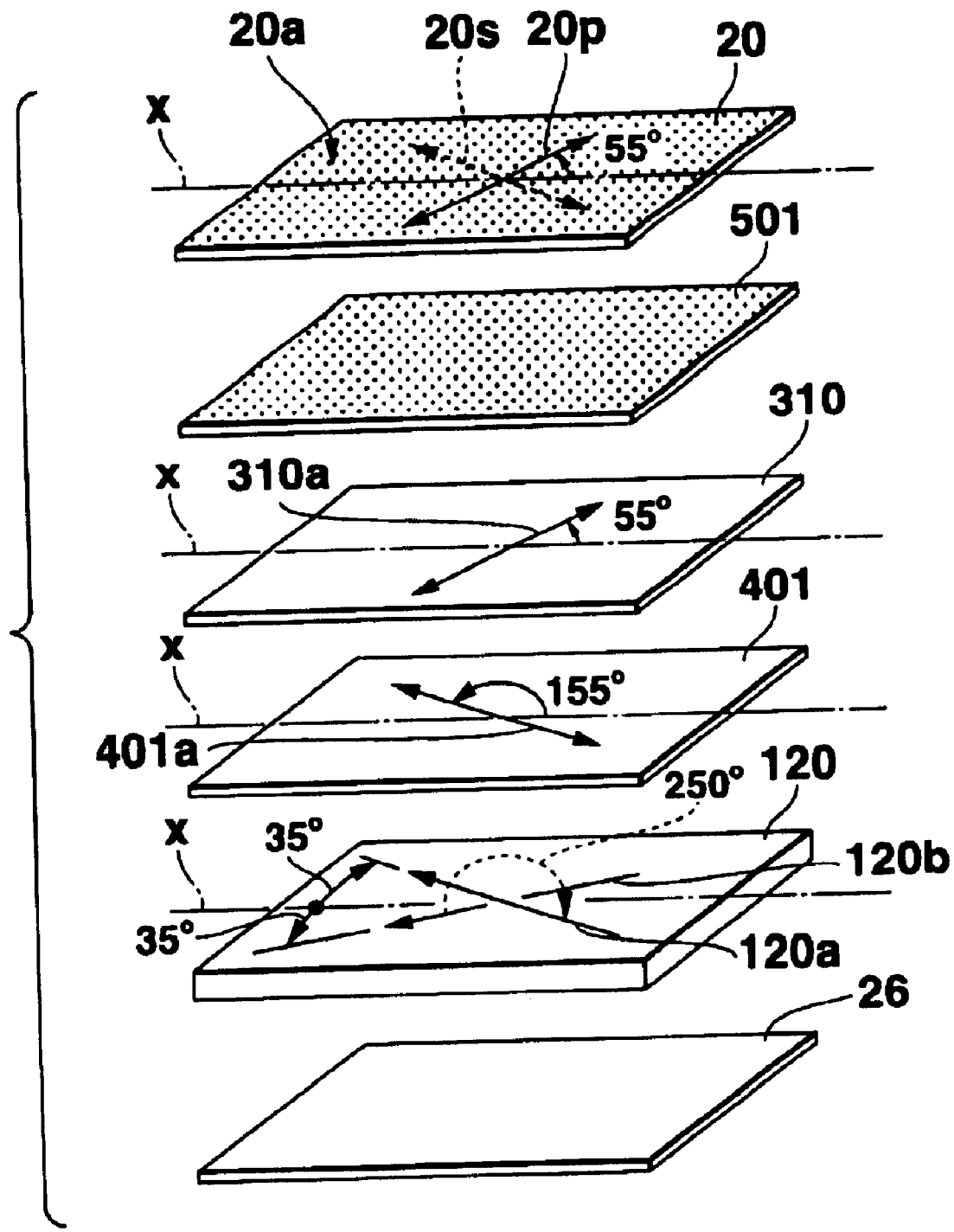
FIG. 38 is an oblique view showing in a dismantled fashion a liquid crystal display apparatus according to a first modification of the fourth embodiment of the present invention.

FIG. 38 is an oblique view showing in a dismantled fashion a liquid crystal display apparatus according to a first modification of the fourth embodiment of the present invention. The liquid crystal display apparatus according to the first modification of the fourth embodiment comprises the STN type liquid crystal element 120, the reflection polarizing plate 20 arranged on the front side of the STN type liquid crystal element 120, the absorption polarizing plate 401 arranged between the STN type liquid crystal element 120 and the reflection polarizing plate 20, the diffusion layer 501 arranged between the reflection polarizing plate 20 and the absorption polarizing plate 401, the compensation plate 401 arranged between the STN type liquid crystal display element 120 and the front absorption polarizing plate 310, and the reflection plate 26 arranged on the rear side of the STN type liquid crystal element 120.

The liquid crystal display apparatus for the first modification differs from the liquid crystal display apparatus according to the fourth embodiment in that rear absorption polarizing plate included in the liquid crystal display apparatus of the fourth embodiment is not included in the liquid crystal display apparatus for the first modification of the fourth embodiment. The first modification of the fourth embodiment also differs from the fourth embodiment shown in FIG. 37 in the senses of the optical axes of the reflection polarizing plate 20, the absorption polarizing plate 310 and the compensation plate 401. Since the first modification shown in FIG. 38 is equal to the fourth embodiment shown in FIG. 37 in the other constituents of the liquid crystal display apparatus such as the STN type liquid crystal element 120, the same constituents of the display apparatus are denoted by the same reference numerals so as to avoid an overlapping description.

In the first modification shown in FIG. 38, the reflection polarizing plate 20 is arranged such that the transmission axis 20p is deviated by about 85° in the counterclockwise direction from the aligning direction 120a of the liquid crystal molecules in the vicinity of the front substrate of the STN type liquid crystal element 120 (deviated by about 55° in the counterclockwise direction from the lateral axis x of the screen). Also, the absorption polarizing plate 310 is arranged such that the transmission axis 310a is substantially parallel to the transmission axis 20p of the reflection polarizing plate 20.

The compensation plate 401, which is formed a retardation plate, is arranged such that the retarded phase axis 401a is deviated by about 10° in the clockwise direction from the aligning direction 120a of the liquid crystal molecules in the vicinity of the front substrate 12 of the STN type liquid crystal element 120 (deviated by about 155° in the counterclockwise direction from the lateral axis x of the screen). Incidentally, the value of Δnd of the STN type liquid crystal element 120 is about 780 nm, and the retardation of the compensation plate (retardation plate) 401 is about 570 nm.

In the liquid crystal display apparatus according to the first modification of the fourth embodiment of the present invention, the reflection polarizing plate 20 arranged on the front side of the STN type liquid crystal element 120 and the absorption polarizing plate 310 are allowed to perform the function of the polarizer for permitting the incident light from the front side to be incident on the STN type liquid crystal element 120 as a linear polarized light and the function of the light detector for controlling the transmission of the light transmitted through the STN type liquid crystal element in accordance with the polarized state of the light. In the first modification shown in FIG. 38, the diffusion layer 501 is arranged between the reflection polarizing plate 20 and the absorption polarizing plate 310. However, it is also possible to arrange the diffusion layer 501 between the absorption polarizing plate 310 and the front compensation plate 401 of the STN type liquid crystal element 120. Further, it is possible to omit the diffusion layer 501.

Figure 39:
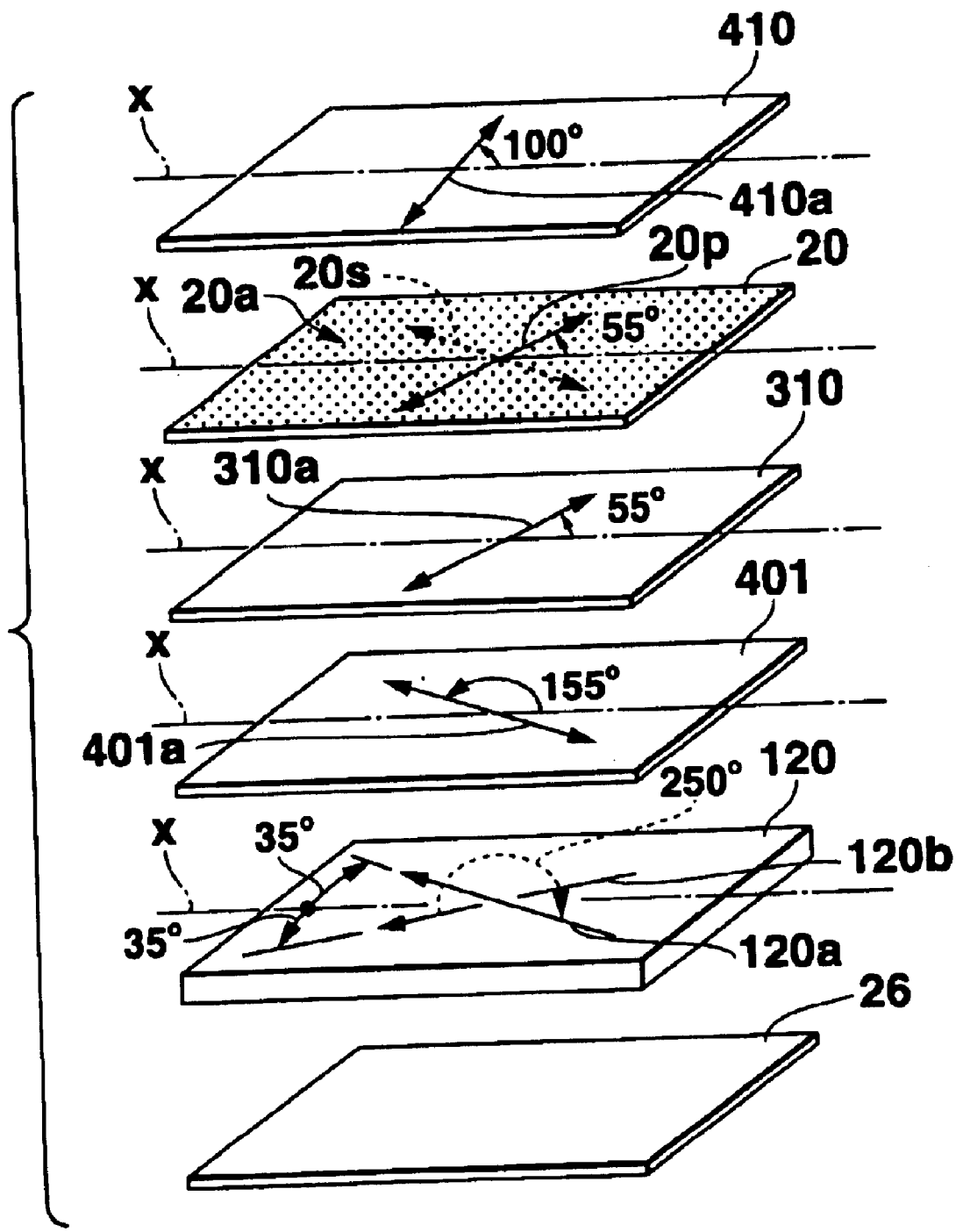
FIG. 39 is an oblique view showing in a dismantled fashion a liquid crystal display apparatus according to a second modification of the fourth embodiment of the present invention.

FIG. 39 is an oblique view showing in a dismantled fashion a liquid crystal display apparatus according to a second modification of the fourth embodiment of the present invention. The liquid crystal display apparatus according to the second modification of the fourth embodiment comprises the STN type liquid crystal element 120, the reflection polarizing plate 20 arranged on the front side of the STN type liquid crystal element 120, the absorption polarizing plate 310 arranged between the STN type liquid crystal element 120 and the reflection polarizing plate 20, the compensation plate 401 arranged between the STN type liquid crystal display element 120 and the front absorption polarizing plate 310, and the reflection plate 26 arranged on the rear side of the STN type liquid crystal element 120. Further, a transparent film 410 for subjecting the light reflected from the reflection polarizing plate 20 to the inner surface reflection so as to be incident again on the reflection polarizing plate 20 is arranged on the front side of the reflection polarizing plate 20.

The second modification shown in FIG. 39 is equal to the first modification shown in FIG. 38 in the senses of the optical axes of the reflection polarizing plate 20, the absorption polarizing plate 310 and the compensation plate (retardation plate) 401 as well as in the value of Δnd of the STN type liquid crystal element 120 and the retardation of the compensation plate 401. Therefore, the same constituents of the display apparatus are denoted by the same reference numerals so as to avoid an overlapping description.

The transparent film 410 is formed by an optical film having optical characteristics of changing the polarized state of the transmitted light, e.g., a retardation plate serving to impart a phase difference between the normal light and the abnormal light of the transmitted light so as to change the polarized state of the transmitted light. In the second modification shown in FIG. 39, a quarter wavelength plate serving to impart a phase difference of 1/4 wavelength between the normal light and the abnormal light of the transmitted light is used as the transparent film (retardation plate) 410. As shown in FIG. 39, the retardation plate 410 is arranged such that the retarded phase axis 410a is deviated by 100° in the counterclockwise direction from the lateral axis x of the screen. In other words, the retarded phase axis 410a of the retardation plate 410 crosses the transmission axis 20p of the reflection polarizing plate 20 arranged on the front side of the STN type liquid crystal element 120 with a crossing angle of about 45°.

In the liquid crystal display apparatus according to the second modification of the fourth embodiment of the present invention, both the light of polarized component transmitted through the reflection polarizing plate 20 of the two polarized components, which are perpendicular to each other, of the external light incident on the front side and the light of the polarized component transmitted through the reflection polarizing plate 20 of the light reflected from the reflection polarizing plate 20 and subjected to the inner surface reflection by the retardation plate 410 so as to be incident again on the reflection polarized plate 20 with the polarized state changed are transmitted through the reflection polarizing plate 20 so as to be incident on the STN liquid crystal element 120.

It should also be noted that, in the second modification of the fourth embodiment shown in FIG. 39, a quarter wavelength plate serving to impart a phase difference of 1/4 wavelength between the normal light and the abnormal light of the transmitted light is used as the retardation plate 410. Therefore, the light reflected from the reflection polarizing plate 20 so as to be incident on the quarter wavelength plate 410 from the rear side and subjected to the inner surface reflection by the quarter wavelength plate 410 so as to be emitted to the rear side is made the light in the polarized state of the polarized component (polarized component transmitted through the reflection polarizing plate 20) perpendicular to the one polarized component reflected from the reflection polarizing plate 20. It follows that substantially all the light incident again on the reflection polarizing plate 20 is transmitted through the reflection polarizing plate 20 so as to be incident on the STN type liquid crystal element 120.

The effect produced by the use of the quarter wavelength plate 410 is rendered most prominent when the quarter wavelength plate 410 is arranged such that the retarded phase axis 410a crosses the transmission axis 20p of the reflection polarizing plate 20 with a crossing angle of about 45° as described previously.

Also, in the second modification shown in FIG. 39, the reflection polarizing plate 20 arranged on the front side of the STN type liquid crystal element 120 and the absorption polarizing plate 310 are allowed to perform the function of the polarizer for permitting the incident light from the front side to be incident on the STN type liquid crystal element 120 as a linear polarized light and the function of the light detector for controlling the transmission of the light transmitted through the STN type liquid crystal element 120 in accordance with the polarized state. It follows that the light is not absorbed by the rear absorption polarizing plate 32, making it possible to obtain a bright screen.

In the second modification of the fourth embodiment described above, the reflection film 26 is used as the reflecting means arranged on the rear side of the STN type liquid crystal element 120, and the reflection film 26 is arranged on the rear side of the STN type liquid crystal element 120. However, it is also possible to use a metal film having a high reflectance for forming the electrode mounted on the inner surface of the rear substrate of the STN type liquid crystal element 120 so as to allow the electrode to perform the function of the reflecting means.

Also, in the liquid crystal display apparatus according to the second modification of the fourth embodiment, the absorption polarizing plate 310 is arranged between the STN type liquid crystal element 120 and the reflection polarizing plate 20 arranged on the front side of the STN type liquid crystal element 120 for allowing a linear polarized light having a higher degree of polarization to be incident on the STN type liquid crystal element 120 such that the transmission axis 310a is substantially parallel to the transmission axis 20p of the reflection polarizing plate 20. However, it is possible to omit the absorption polarizing plate 310.

FIG. 39 is an oblique view showing in a dismantled fashion a liquid crystal display apparatus according to a third modification of the fourth embodiment of the present invention. The liquid crystal display apparatus according to the third modification of the fourth embodiment comprises the STN type liquid crystal element 120, the reflection polarizing plate 20 arranged on the front side of the STN type liquid crystal element 120, the compensation plate 401 arranged between the STN type liquid crystal display element 120 and the reflection polarizing plate 20, and the reflection plate 21 (rear reflection polarizing plate) arranged on the rear side of the STN type liquid crystal element 120 as a reflecting means, which also acts as a light detector. Further, a quarter wavelength plate 410 as a transparent film for subjecting the light reflected from the reflection polarizing plate 20 to the inner surface reflection so as to be incident again on the reflection polarizing plate 20 is arranged on the front side of the reflection polarizing plate (front reflection polarizing plate) 20 arranged on the front side of the STN type liquid crystal element 120. Still further, the absorption polarizing plate 320 acting as a light absorbing means is arranged on the rear side of the rear reflection polarizing plate 21.

The compensation plate 402, which serves to suppress the coloring of the display inherent in the STN type liquid crystal display apparatus, is formed by a twisted retardation plate and, thus, the compensation plate 402 is called a twisted retardation plate herein later.

Figure 40:
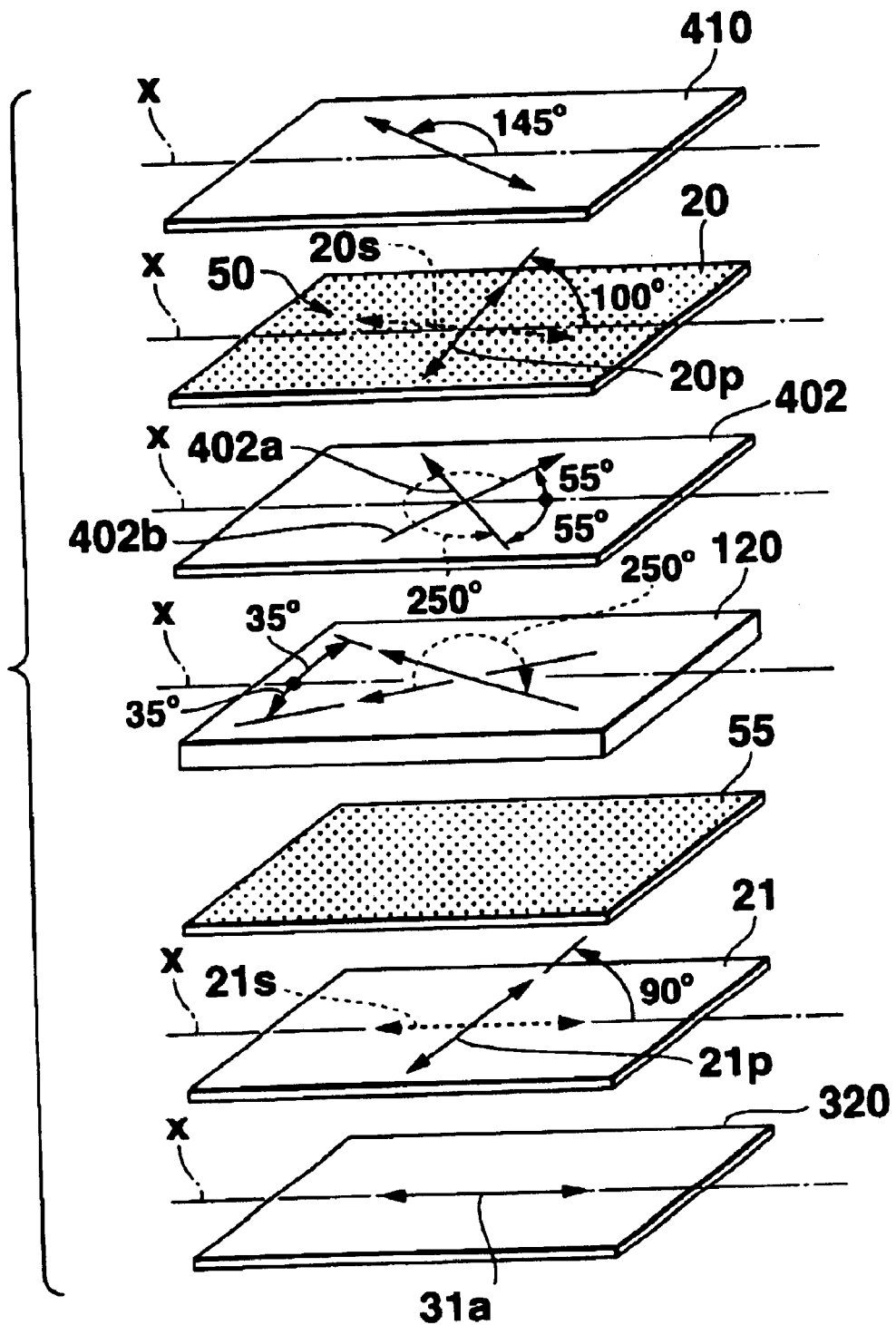
FIG. 40 is an oblique view showing in a dismantled fashion a liquid crystal display apparatus according to a third modification of the fourth embodiment of the present invention.

Reference numerals 402a and 402b shown in FIG. 40 represent the aligning directions of the molecules on the front surface and the rear surface, respectively, of the twisted retardation plate 402. As denoted by an arrow of a broken line, the molecules of the twisted retardation plate 402 are twisted from the rear surface toward the front surface with a twisting angle of about 250° in the counterclockwise direction in the drawing. In other words, the molecule arrangement of the twisted retardation plate 402 is twisted in the direction opposite to the twisting direction of the liquid crystal molecules of the STN type liquid crystal element 120 with a twisting angle substantially equal to that of the liquid crystal molecules of the STN type liquid crystal element 120. The twisted retardation plate 402 has a retardation substantially equal to the value of Δnd of the STN type liquid crystal element 120. In the liquid crystal display apparatus for the third modification shown in FIG. 40, the Δnd value of the STN type liquid crystal element 120 is about 820 nm, and the retardation value of the twisted retardation plate is also about 820 mn. Further, the twisted retardation plate 402 is arranged such that the aligning direction 402a of the molecules on the front surface is deviated by about 55° in the clockwise direction from the lateral axis x of the screen, and that the aligning direction 402b of the molecules on the rear surface is deviated by about 55° in the counterclockwise direction from the lateral axis x of the screen.

The quarter wavelength plate 410 arranged on the front side of the front reflection polarizing plate 20 is arranged such that the retarded phase axis 410a is deviated by about 145° in the counterclockwise direction in the drawing from the lateral axis x of the screen. In other words, the retarded phase axis 410a of the quarter wavelength plate 410 crosses the transmission axis 20p of the front reflection polarizing plate 20 with a crossing angle of about 45°.

The rear reflection polarizing plate 21 is arranged such that the transmission axis 21p crosses the lateral axis x of the screen with a crossing angle of about 90° and that the reflection axis 20s is substantially parallel to the lateral axis x noted above.

The absorption polarizing plate 3320 arranged on the rear side of the rear reflection polarizing plate 21 is arranged such that the transmission axis 320a is substantially parallel to the reflection axis 21s of the rear reflection polarizing plate 21, and the absorption axis (not shown) is substantially perpendicular to the transmission axis 21p of the rear reflection polarizing plate 21.

According to the liquid crystal display apparatus of the modification shown in FIG. 40, it is possible to permit both the light of the polarized component transmitted through the front reflection polarizing plate 20, among the two polarized components perpendicular to each other of the external light incident from the front side, and the light of the polarized component transmitted through the reflection polarizing plate 20, among the light reflected from the front reflection polarizing plate 20 and subjected to the inner surface reflection by the retardation plate 410 so as to be incident again on the reflection polarizing plate 20 with the polarized state changed, to be transmitted through the front reflection polarizing plate 20 so as to be incident on the STN type liquid crystal element 120. It follows that it is possible to utilize the external light incident from the front side with a high efficiency so as to obtain a bright screen.

In the modification shown in FIG. 40, the twisted retardation plate 402 is used as a compensation plate for suppressing the coloring of the display inherent in the STN type liquid crystal display apparatus so as to improve the viewing angle characteristics. It follows that the coloring of the display can be suppressed more effectively so as to widen the viewing angle.

In the modification shown in FIG. 40, the diffusion layer 55 is arranged between the liquid crystal element 120 and the rear reflection polarizing plate 21. Alternatively, it is possible to arrange the diffusion layer 55 between the twisted retardation plate 402 arranged on the front side of the STN type liquid crystal element 120 and the front reflection polarizing plate 20. It is also possible to arrange two diffusion layers such that one diffusion layer 55 is arranged between the STN type liquid crystal element 120 and the rear reflection polarizing plate 21, with the other diffusion layer 55 being arranged between the twisted retardation plate 402 and the front reflection polarizing plate 20.

It should also be noted that, where the diffusion layer 55 is arranged between the STN type liquid crystal element 120 and the rear reflection polarizing plate 21, it is possible to form the diffusion layer 55 by applying a coarsening treatment to the front surface of the rear reflection polarizing plate 21.

Further, according to the modification shown in FIG. 40, the absorption polarizing plate 320 is arranged as a light absorbing means on the rear side of the rear reflection polarizing plate 21 arranged on the rear side of the STN liquid crystal element 120. However, it is possible for the light absorbing means arranged on the rear side of the rear reflection polarizing plate 21 to be formed of a black absorption film. Also, in the case of using the STN type liquid crystal element 120, which is not equipped with a color filter, it is possible to use a color filter of an optional color as the light absorbing means. Further, it is possible to omit the light absorbing means.

In the modifications shown in FIGS. 39 and 40, the diffusion plane 50a is formed on the front surface of the reflection polarizing plate 20 arranged on the front side of the STN type liquid crystal element 120. However, in place of using the diffusion plane 50a, it is possible to arrange a diffusion layer made of a coarsened film or a film having light scattering particles mixed therein on the front side of the reflection polarizing plate 20, i.e., between the reflection polarizing plate 20 and the retardation plate 410, so as to permit the light reflected from the reflection polarizing plate 20 to be diffused by the diffusion layer.

Also, in the modifications shown in FIGS. 39 and 40, the quarter wavelength plate 410 is arranged as the transparent film for subjecting the light reflected from the reflection polarizing plate 20 to the inner surface reflection so as to be incident again on the front reflection polarizing plate 20 on the front side of the reflection polarizing plate 20 arranged on the front side of the STN type liquid crystal element 120. However, the transparent film arranged on the front side of the reflection polarizing plate 20 is not limited to the quarter wavelength plate. For example, it is also possible to use an optically isotropic film or the like in place of the quarter wavelength plate.

In each of the first to fourth embodiments described above, it is possible for the diffusion layer to form any of a transparent film having the surface subjected to a coarsening treatment, a transparent film having light scattering particles dispersed therein and a lens film having micro lenses formed on one surface. In the case of using a film having a coarsening treatment applied thereto or having light scattering particles dispersed therein, it is desirable for the film to have a haze value of about 30 to 32. It is possible to obtain a display having a further improved front brightness in the case of using the film having a coarsening treatment applied thereto or having light scattering particles dispersed therein.

It is more desirable for the diffusion layer to be formed of the lens film noted above. In the case of using the lens film, it is possible to obtain a higher front brightness. In addition, since the lens film does not change the polarized state of the transmitted light, it is possible to increase the emission rate of the incident light for any of the reflection display and the transmission display so as to obtain a display having a higher brightness and an improved contrast.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus, comprising:
   a liquid crystal element including a front substrate positioned on the side of an observer and having a first electrode mounted to one surface, a rear substrate having a second electrode arranged to face said first electrode, and a liquid crystal layer interposed between the front and rear substrates, said liquid crystal layer controlling a polarized state of transmitted light in accordance with an electric field applied between the first and the second electrodes;
   a first reflection polarizing plate disposed on a front side of the liquid crystal element and reflecting light of one of two polarized components of incident light, said two polarized components being perpendicular to each other, the first reflection polarizing plate transmitting the light of the other of the two polarized components; and a rear member disposed behind the liquid crystal element and reflecting at least a part of light transmitted through the liquid crystal element.

2. The liquid crystal display apparatus according to claim 1, further comprising diffusion means arranged on the front surface of said reflection polarizing plate for diffusing the light reflected from said reflection polarizing plate.

3. The liquid crystal display apparatus according to claim 1, further comprising a diffusion layer arranged between said liquid crystal element and said reflection polarizing plate arranged on the front side of said liquid crystal element and/or between said liquid crystal element and a rear member arranged on the rear side of the liquid crystal element.

4. The liquid crystal display apparatus according to claim 3, wherein said diffusion layer includes a lens film having micro lenses arranged on one surface.

5. The liquid crystal display apparatus according to claim 1, wherein said rear member includes at least one second reflection polarizing plate.

6. The liquid crystal display apparatus according to claim 5, wherein:

said liquid crystal element has an initial aligning state of the liquid crystal molecules which are aligned in a twist-alignment with a twisting angle of about 90°;

said first reflection polarizing plate is disposed such that a transmission axis thereof is substantially parallel or substantially perpendicular to the initial aligning state of the liquid crystal molecules in the vicinity of the front substrate of said liquid crystal element; and said at least one second reflection polarizing plate is disposed such that a transmission axis thereof is substantially parallel or substantially perpendicular to the transmission axis of said first reflection polarizing plate.

7. The liquid crystal display apparatus according to claim 5, further comprising a back light disposed on a rear side of said rear member for emitting an illuminating light.

8. The liquid crystal display apparatus according to claim 1, wherein said rear member comprises a second reflection polarizing plate that reflects the light one of the two polarized components, which are perpendicular to each other, of the incident light and transmits the light of the other polarized component, and light absorption means arranged on the rear side of said second reflection polarizing plate.

9. The liquid crystal display apparatus according to claim 8, wherein said light absorbing means has a light absorbing film.

10. The liquid crystal display apparatus according to claim 8, wherein said light absorption means has an absorption polarizing plate that absorbs the light of one of the two polarized components, which are perpendicular to each other, of the incident light, and transmits the light of the other polarized component.

11. The liquid crystal display apparatus according to claim 1, wherein said rear member has an absorption polarizing plate absorbing the light of one of the two polarized components, which are perpendicular to each other, of the incident light and transmitting the light of the other polarized component, and a reflection plate arranged on the rear side of the absorption polarizing plate.

12. The liquid crystal display apparatus according to claim 1, further comprising an optical element disposed on the front side of said first reflection polarizing plate for permitting the light incident on the front side to be transmitted therethrough so as to be incident on said reflection polarizing plate and also permitting the light of the one polarized component reflected from said reflection polarizing plate to be incident again on said reflection polarizing plate with the polarized state changed.

13. The liquid crystal display apparatus according to claim 12, wherein said optical element comprises a transparent film transmitting the incident light from the front side to be incident on the first reflection polarizing plate and subjecting the light reflected front said reflection polarizing plate to the inner surface reflection so as to permit the light to be incident again on said reflection polarizing plate.

14. The liquid crystal display apparatus according to claim 12, wherein said optical element has a retardation plate imparting a phase difference between the normal light and the abnormal light of the transmitted light so as to change the polarized state of the transmitted light.

15. The liquid crystal display apparatus according to claim 14, wherein said retardation plate has a quarter wavelength plate imparting a phase difference of 1/4 wavelength between the normal light and the abnormal light of the transmitted light.

16. The liquid crystal display apparatus according to claim 15, wherein said quarter wavelength plate is arranged such that the retarded phase axis thereof crosses the reflection axis and the transmission axis of the reflection polarizing plate arranged on the front side of the liquid crystal element with a crossing angle of about 45°.

17. The liquid crystal display apparatus according to claim 12, wherein a surface treatment is applied to the front surface of said first reflection polarizing plate to permit the light of the one polarized component to be incident on the optical element arranged on the front side of the reflection polarizing plate at an angle of incidence at which the light is subjected to inner surface reflection by the optical element.

18. The liquid crystal display apparatus according to claim 12, wherein a surface treatment is applied to the front surface of said first reflection polarizing plate to permit the light of one polarized component to be diffused and to permit the light of tie other polarized component to be transmitted without being diffused.

19. The liquid crystal display apparatus according to claim 12, further comprising a diffusion layer arranged between the first reflection polarizing plate and the optical element arranged on the front side of the reflection polarizing plate so as to diffuse the transmitted light within a predetermined expanding angular range.

20. The liquid crystal display apparatus according to claim 19, wherein said diffusion layer has a directivity in a direction inclined from a line normal to the first reflection polarizing plate.

21. The liquid crystal display apparatus according to claim 12, further comprising diffusing means arranged between the liquid crystal element and the first reflection polarizing plate arranged on the front side of the liquid crystal element for diffusing the transmitted light.

22. The liquid crystal display apparatus according to claim 12, wherein said rear member includes a second reflection polarizing plate reflecting one of the two polarized components, which are perpendicular to each other, of the incident light and transmitting the light or the other of the two polarized components.

23. The liquid crystal display apparatus according to claim 22, further comprising a back light arranged on the rear side of said rear member, the back light transmitting the incident light from the front side, and emitting an illuminating light toward the front side.

24. The liquid crystal display apparatus according to claim 12, wherein said rear member has means for reflecting the light of one of the two polarized components, which are perpendicular to each other, of the incident light and absorbing the light of the other polarized component.

25. The liquid crystal display apparatus according to claim 24, wherein said rear member comprises a second reflection polarizing plate reflecting the light of one of the two polarized components, which are perpendicular to each other, of the incident light and transmitting the light of the other polarized component, and light absorption means arranged on the rear side of said second reflection polarizing plate.

26. The liquid crystal display apparatus according to claim 25, wherein said light absorption means has an absorption polarizing plate transmitting the light of one of the two polarized components, which are perpendicular to each other, of the incident light and absorbing the light of the other polarized component.

27. The liquid crystal display apparatus according to claim 25, wherein said light absorption means has a colored film absorbing the light having a predetermined wavelength band.

28. The liquid crystal display apparatus according to claim 12, wherein said rear member comprises a reflection film.

29. The liquid crystal display apparatus according to claim 12, wherein said rear member has an absorption polarizing plate transmitting the light of one of the two polarized components, which are perpendicular to each other, of the incident light and absorbing the light of the other polarized component, and a reflection plate arranged on the rear side of the absorption polarizing plate.

30. The liquid crystal display apparatus according to claim 29, wherein said rear member has a back light arranged between said absorption polarizing plate and said reflection means, transmitting the incident light from the front side and the reflected light from the reflection film, and emitting an illuminating light toward the front side.

31. The liquid crystal display apparatus according to claim 12, wherein said rear member has a second reflection polarizing plate arranged on the rear side of the liquid crystal element, a third reflection polarizing plate arranged on the rear side of said second reflection polarizing plate, a diffusion layer arranged between said second and third reflection polarizing plates and diffusing the transmitted light, and light absorbing means arranged on the rear side of said third reflection polarizing plate.

32. The liquid crystal display apparatus according to claim 12, further comprising diffusion means disposed between the liquid crystal element and said rear member for diffusing the transmitted light.

33. The liquid crystal display apparatus according to claim 32, wherein said diffusion means has a directivity in a direction parallel to a line normal to the reflection polarizing plate disposed on the front side of the liquid crystal element.

34. The liquid crystal display apparatus according to claim 33, wherein said diffusion means comprises a lens film having micro lenses disposed on one surface.

35. The liquid crystal display apparatus according to claim 12, wherein said rear member has diffusion-reflection properties.

36. The liquid crystal display apparatus according to claim 12, wherein said liquid crystal element is a simple matrix liquid crystal element in which liquid crystal molecules are twist-aligned with a twisting angle of about 100°.

37. The liquid crystal display apparatus according to claim 36, wherein said liquid crystal element has a liquid crystal layer in which the product $\Delta nd$ between the refractive index anisotropy $\Delta n$ of the liquid crystal and the thickness d of the liquid crystal layer falls within a range of between 115 nm and 130 nm.

38. The liquid crystal display apparatus according to claim 1, wherein said liquid crystal element has a liquid crystal layer in which liquid crystal molecules are twist-aligned with a twisting angle of 180° to 270° between the front and rear substrates.

39. The liquid crystal display apparatus according to claim 38, further comprising a transparent film arranged on the front side of said first reflection polarizing plate for subjecting the light reflected from the first reflection polarizing film to the inner surface reflection so as to be incident again on said reflection polarizing plate.

40. The liquid crystal display apparatus according to claim 38, wherein said transparent film exhibits optical characteristics of changing the polarized state of the transmitted light.

41. The liquid crystal display apparatus according to claim 40, wherein said transparent film includes a quarter wavelength plate imparting a phase difference of 1/4 wavelength between the normal light and the abnormal light of the transmitted light.

42. The liquid crystal display apparatus according to claim 41, wherein said quarter wavelength plate is arranged such that the retarded phase axis thereof crosses the transmission axis of the collection polarizing plate arranged on the front side of the liquid crystal element with a crossing angle of about 45°.

43. The liquid crystal display apparatus according to claim 40, further comprising diffusion means arranged on the front side of the first reflection polarizing plate for diffusing the light reflected from the reflection polarizing plate.

44. The liquid crystal display apparatus according to claim 38, further comprising an absorption polarizing plate arranged between the liquid crystal element and the first reflection polarizing plate such that the transmission axis of said absorption polarizing plate is substantially parallel to the transmission axis of the reflection polarizing plate, and having a transmission axis transmitting one of the two polarized components, which are perpendicular to each other, of the incident light and an absorption axis absorbing the light of the other polarized component.

45. The liquid crystal display apparatus according to claim 38, further comprising a diffusion layer arranged between the liquid crystal element and the first reflection polarizing plate and/or between the liquid crystal element and the reflection means arranged on the rear side of the liquid crystal element.

46. The liquid crystal display apparatus according to claim 38, wherein said rear member includes a second reflection polarizing plate reflecting the light of one of two polarized components, which are perpendicular to each other, of the incident light and transmitting the light of the other polarized component.

47. The liquid crystal display apparatus according to claim 38, wherein said rear member includes an absorption polarizing plate absorbing the light of one of two polarized components, which are perpendicular to each other, of the incident light and transmitting the light of the other polarized component.

48. The liquid crystal display apparatus according to claim 38, wherein said rear member includes a reflection film.

* * * * *